United States Patent
Kim et al.

(10) Patent No.: US 12,549,926 B2
(45) Date of Patent: Feb. 10, 2026

(54) DATA PROCESSING METHOD AND APPARATUS OF PACKET DATA CONVERGENCE PROTOCOL (PDCP) LAYER SUPPORTING MULTICAST AND BROADCAST SERVICE (MBS) IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 17/709,354

(22) Filed: Mar. 30, 2022

(65) Prior Publication Data

US 2022/0329982 A1    Oct. 13, 2022

(30) Foreign Application Priority Data

Mar. 30, 2021 (KR) ................. 10-2021-0041408

(51) Int. Cl.
*H04W 4/06* (2009.01)
*H04L 1/08* (2006.01)
*H04W 76/19* (2018.01)
*H04W 76/20* (2018.01)

(52) U.S. Cl.
CPC .............. *H04W 4/06* (2013.01); *H04L 1/08* (2013.01); *H04W 76/19* (2018.02); *H04W 76/20* (2018.02)

(58) Field of Classification Search
CPC ....... H04W 4/06; H04W 76/19; H04W 76/20; H04W 80/02; H04W 76/40; H04L 1/08; H04L 1/1822; H04L 1/1861; H04L 1/1832; H04L 2001/0093
See application file for complete search history.

(56) References Cited

U.S. PATENT DOCUMENTS

| | | | |
|---|---|---|---|
| 10,893,558 B2 | 1/2021 | Yi et al. | |
| 2019/0053099 A1* | 2/2019 | Kim | H04L 1/1841 |
| 2019/0350022 A1* | 11/2019 | Yi | H04W 76/14 |
| 2020/0196189 A1 | 6/2020 | Jo et al. | |
| 2021/0006322 A1 | 1/2021 | Agiwal et al. | |
| 2023/0199437 A1* | 6/2023 | Zhu | H04L 1/1812 370/329 |
| 2023/0396367 A1* | 12/2023 | Hori | H04W 72/30 |

OTHER PUBLICATIONS

Supplementary European Search Report dated Oct. 18, 2023, in connection with European Application No. 22781596.6, 4 pages.

(Continued)

*Primary Examiner* — Jung H Park

(57) ABSTRACT

The disclosure relates to a communication technique for fusing a 5G communication system with IoT technology to support higher data rate after the 4G system and a system thereof. The disclosure may be applied to an intelligent service (e.g., smart home, smart building, smart city, smart or connected car, healthcare, digital education, retail, security and safety related services, etc.) based on 5G communication technology and IoT-related technology. The disclosure discloses a method for allowing a UE to normally receive a MBS service in various scenarios.

12 Claims, 25 Drawing Sheets

(56) References Cited

OTHER PUBLICATIONS

3GPP TS 36.213 V16.4.0 (Dec. 2020), Technical Specification, 3rd Generation Partnership Project; Technical Specification Group Radio Access Network; Evolved Universal Terrestrial Radio Access (E-UTRA); Physical layer procedures (Release 16), Dec. 2020, 575 pages.
3GPP TS 36.331 V16.3.0 (Dec. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Dec. 2020, 1084 pages.
3GPP TS 38.101-3 V17.0.0 (Dec. 2020), Technical Specification, 3rd Generation Partnership Project; Technical Specification Group Radio Access Network; NR; User Equipment (UE) radio transmission and reception; Part 3: Range 1 and Range 2 Interworking operation with other radios (Release 17), Dec. 2020, 667 pages.
3GPP TS 38.133 V17.0.0 (Dec. 2020), Technical Specification, 3rd Generation Partnership Project; Technical Specification Group Radio Access Network; NR; Requirements for support of radio resource management (Release 17), Dec. 2020, 1812 pages.
3GPP TS 38.213 V16.4.0 (Dec. 2020), Technical Specification, 3rd Generation Partnership Project; Technical Specification Group Radio Access Network; NR; Physical layer procedures for control (Release 16), Dec. 2020, 181 pages.
3GPP TS 38.304 V16.4.0 (Mar. 2021), Technical Specification, 3rd Generation Partnership Project; Technical Specification Group Radio Access Network; NR; User Equipment (UE) procedures in Idle mode and RRC Inactive state (Release 16), Mar. 2021, 39 pages.
3GPP TS 38.306 V16.4.0 (Mar. 2021), Technical Specification, 3rd Generation Partnership Project; Technical Specification Group Radio Access Network; NR; User Equipment (UE) radio access capabilities (Release 16), Mar. 2021, 151 pages.
3GPP TS 38.321 V16.4.0 (Mar. 2021), Technical Specification, 3rd Generation Partnership Project; Technical Specification Group Radio Access Network; NR; Medium Access Control (MAC) protocol specification (Release 16), Mar. 2021, 157 pages.
3GPP TS 38.322 V16.2.0 (Dec. 2020), Technical Specification, 3rd Generation Partnership Project; Technical Specification Group Radio Access Network; NR; Radio Link Control (RLC) protocol specification (Release 16), Dec. 2020, 33 pages.
3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 2021, 932 pages.
Nokia et al., "MBS split bearer configuration and PTP/PTM switching", 3GPP TSG-RAN WG2 Meeting #113, Jan. 25-Feb. 5, 2021, R2-2100643, 3 pages.
Samsung, "MBS Radio Bearer (MRB) Type", 3GPP TSG RAN WG2 Meeting #112-e, Jan. 25-Feb. 5, 2021, R2-2101007, 3 pages.
Nokia et al., "PDCP Operation for MBS", 3GPP TSG-RAN WG2 Meeting #113, Jan. 25-Feb. 5, 2021, R2-2100370, 4 pages.
International Search Report dated Jun. 22, 2022 in connection with International Patent Application No. PCT/KR2022/004483, 4 pages.
Written Opinion of the International Searching Authority dated Jun. 22, 2022 in connection with International Patent Application No. PCT/KR2022/004483, 3 pages.
Communication pursuant to Article 94)3) EPC dated Jul. 8, 2024, in connection with European Application No. 22781596.6, 5 pages.

* cited by examiner

DATA PROCESSING METHOD AND APPARATUS OF PACKET DATA CONVERGENCE PROTOCOL (PDCP) LAYER SUPPORTING MULTICAST AND BROADCAST SERVICE (MBS) IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2021-0041408, filed on Mar. 30, 2021, in the Korean Intellectual Property Office, the disclosure of which is herein incorporated by reference in its entirety.

BACKGROUND

1. Field

The disclosure relates to operations of a UE and a base station of a mobile communication system. More particularly, the disclosure relates to a method and an apparatus for processing data by a packet data convergence protocol (PDCP) layer device configured to support a multicast and broadcast service (MBS) service in a next-generation mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources. According to various embodiments, there is a need for a scheme for enabling a UE to normally receive an MBS service.

SUMMARY

The disclosure provides a structure of a multicast bearer or a unicast bearer configured to support an MBS service in order to support the MBS service in a next-generation mobile communication system, or a method for configuring the structure, and a data processing method of a PHY layer device, MAC layer device, RLC layer device, or PDCP layer device configured to receive MBS data and to process the MBS data.

In addition, the disclosure provides a signaling procedure or an operation of a UE for continuously supporting the MBS service in a RRC Connected mode, RRC IDLE mode, or RRC INACTIVE mode, or when switching between the modes.

In addition, the disclosure provides a method for reconfiguring (or switching) from a multicast bearer to a unicast bearer to support an MBS service having no or less data loss according to handover between base stations or networks supporting the MBS service or mobility of a UE, or reconfiguring (or switching) from the unicast bearer to the multicast bearer, and provides operations of each protocol layer device (PHY layer device, MAC layer device, RLC layer device, or PDCP layer device) such that the MBS service is supported.

In accordance with an aspect of the disclosure, a method performed by a terminal in a wireless communication system, the method comprising identifying that a packet data convergence protocol (PDCP) re-establishment is performed for a terminal configured a multicast and broadcast service (MBS) bearer, in case that the MBS bearer is associated with a radio link control (RLC) acknowledged mode (AM), determining to maintain a state variable and keep at least one stored service data unit (SDU) without an uplink retransmission and in case that the MBS bearer is associated with an RLC unacknowledged mode (UM), determining to initialize a state variable as a sequence number of a first received PDCP protocol data unit (PDU) plus one.

In accordance with another aspect of the disclosure, a terminal in a wireless communication system, the terminal comprising a transceiver and at least one processor is configured to identify that a packet data convergence protocol (PDCP) re-establishment is performed for a terminal configured a multicast and broadcast service (MBS) bearer, in case that the MBS bearer is associated with a radio link control (RLC) acknowledged mode (AM), determine to maintain a state variable and keep at least one stored service data unit (SDU) without an uplink retransmission, and in case that the MBS bearer is associated with an RLC unacknowledged mode (UM), determine to initialize a state variable as a sequence number of a first received PDCP protocol data unit (PDU) plus one.

An embodiment of the disclosure may be advantageous in that a UE may normally receive an MBS service in various scenarios.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
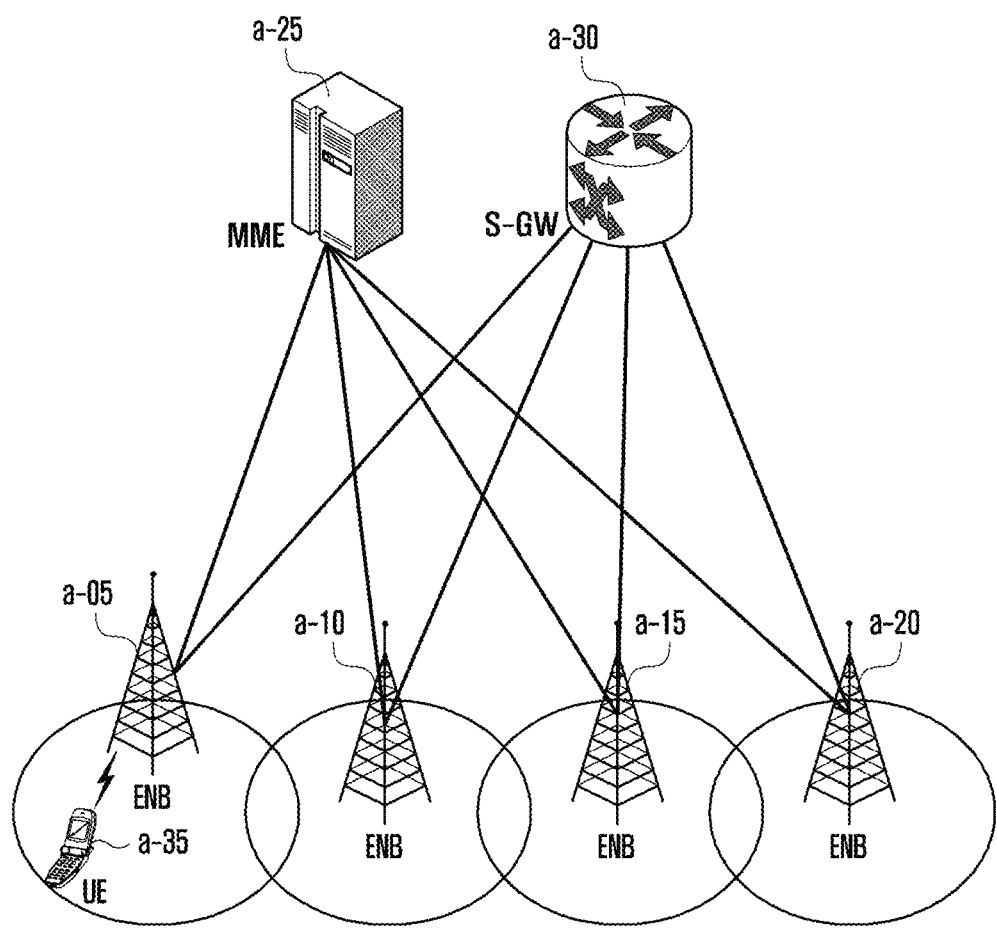
FIG. 1 is a diagram illustrating a structure of an LTE system according to various embodiments of the present disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it is determined that the description may make the subject matter of the disclosure unnecessarily unclear. Hereinafter embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. For example, a base station described as "eNB" may indicate "gNB."

In the next-generation mobile communication system, the MBS service (multicast or broadcast service, multimedia broadcast and multicast service (MBMS), or multicast and broadcast service (MBS)) may be supported to support a service such as a broadcast/multicast service, a mission critical service, or a public safety net service. The MBS service may be provided to the UE through a multicast bearer or a unicast bearer. In the disclosure, the multicast bearer may refer to a bearer serving a multicast service or a broadcast service, and may indicate a broadcast bearer. In the above, the multicast service may indicate a service provided only to UEs registered or permitted in the network, or the broadcast service may indicate a service provided to unspecified number of UEs, unregistered UE, or unauthorized UE. In the disclosure, for convenience of description, a bearer supporting the multicast service or the broadcast service may be referred to as a multicast bearer. Alternatively, the multicast service may indicate a service in which the UE receives the MBS service through a bearer (bearer for point to point service or bearer for point to multicast service) using RLC UM mode or a bearer (bearer for point to point service or bearer for point to multicast service) using RLC AM mode in RRC connected mode or RRC inactive mode, and the broadcast service may indicate a service in which the UE receives the MBS service through a bearer (bearer for point to multicast service) using the RLC UM mode in the RRC inactive mode or RRC idle mode.

In order to support the MBS service, a structure or configuration method of the multicast bearer or the unicast bearer supporting the MBS service, and a data processing method of a PHY layer, a MAC layer, an RLC layer, or a PDCP layer receiving MBS data and processing the MBS data are required.

In addition, when the MBS service is switched in RRC connected mode, RRC idle mode, RRC inactive mode, or between the modes, a signaling procedure or a UE operation to continue supporting the MBS service may be specified.

In addition, in order to support MBS service with no data loss or less data loss depending on handover between base stations or networks supporting the MBS service or the mobility of the UE, a method of reconfiguring (or switching) from a multicast bearer to a unicast bearer or reconfiguring (or switching) from a unicast bearer to a multicast bearer may be required.

The disclosure provides methods for the UE to normally receive the MBS service in the various scenarios as described above.

FIG. 1 is a diagram illustrating a structure of an LTE system according to various embodiments of the present disclosure.

Referring to FIG. 1, as illustrated, the radio access network of the LTE system includes a next-generation base station (Evolved Node B, hereinafter ENB, Node B or base station) a-05, a-10, a-15, and a-20, a mobility management entity (MME) a-25, and a serving-gateway (S-GW) a-30. The user equipment (hereinafter UE or UE) a-35 accesses the external network through the ENB a-05 to a-20 and the S-GW a-30.

In FIG. 1, the ENBs a-05 to a-20 correspond to the existing Node B of the UMTS system. The ENBs are connected to the UE a-35 through a radio channel and perform a more complex role than the existing node B. In the LTE system, because all user traffic, including real-time services such as voice over IP (VoIP) through Internet protocol, are serviced through shared channels, a device for scheduling by collecting status information such as buffer status, available transmission power status, and channel status of the UEs 1A-35 is required, and the ENB a-05 to a-20 is responsible for this. One ENB typically controls multiple cells. For example, in order to implement a transmission rate of 100 Mbps, the LTE system uses, for example, orthogonal frequency division multiplexing (hereinafter referred to as OFDM) in a 20 MHz bandwidth as a radio access technology. In addition, an adaptive modulation & coding (AMC) method determining a modulation scheme and a channel coding rate based on the channel state of the UE is applied. The S-GW a-30 is a device that provides a data bearer, and creates or removes a data bearer under the control of the MME a-25. The MME is a device in charge of various control functions as well as a mobility management function for the UE, and is connected to a plurality of base stations.

In the protocol structure of the disclosure, a PDU may indicate a protocol data unit, and an SDU may indicate a service data unit.

Figure 2:
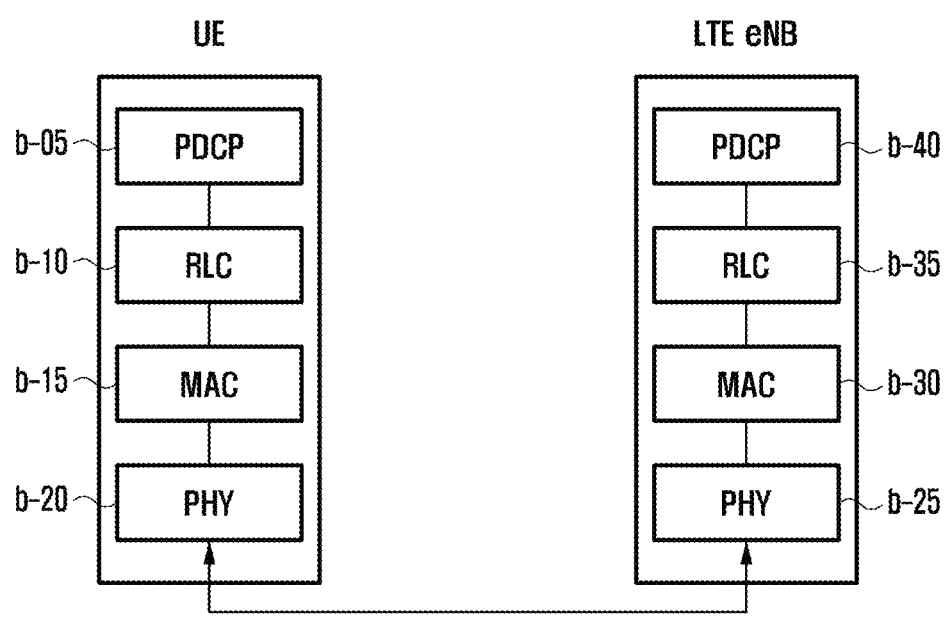
FIG. 2 is a diagram illustrating a radio protocol structure of an LTE system according to various embodiments of the present disclosure.

FIG. 2 is a diagram illustrating a radio protocol structure of an LTE system according to various embodiments of the present disclosure.

Referring to FIG. 2, the radio protocol of the LTE system consists of a packet data convergence protocol (PDCP) b-05 and b-40, a radio link control (RLC) b-10 and b-35, and medium access control (MAC) b-15 and b-30 in the UE and ENB, respectively. The packet data convergence protocol (PDCP) b-05 and b-40 is responsible for IP header compression/decompression operations. The main functions of PDCP are summarized below:

Header compression and decompression (ROHC only);
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and/or
Timer-based SDU discard in uplink.

The radio link control (hereinafter referred to as RLC) b-10 and b-35 performs ARQ operation by reconfiguring a PDCP protocol data unit (PDU) or RLC service data unit (SDU) to an appropriate size. The main functions of RLCs are summarized below:

Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and/or
RLC re-establishment.

The MACs b-15 and b-30 are connected to several RLC layers configured in one UE, and perform operations of multiplexing RLC PDUs into MAC PDUs and demultiplexing RLC PDUs from MAC PDUs. The main functions of MACs are summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection; and/or
Padding.

The physical layer b-20 and b-25 channel-codes and modulates upper layer data, makes OFDM symbols and transmits them through a radio channel, or demodulates and channel-decodes the OFDM symbols received through the radio channel and transmits them to upper layers.

Figure 3:
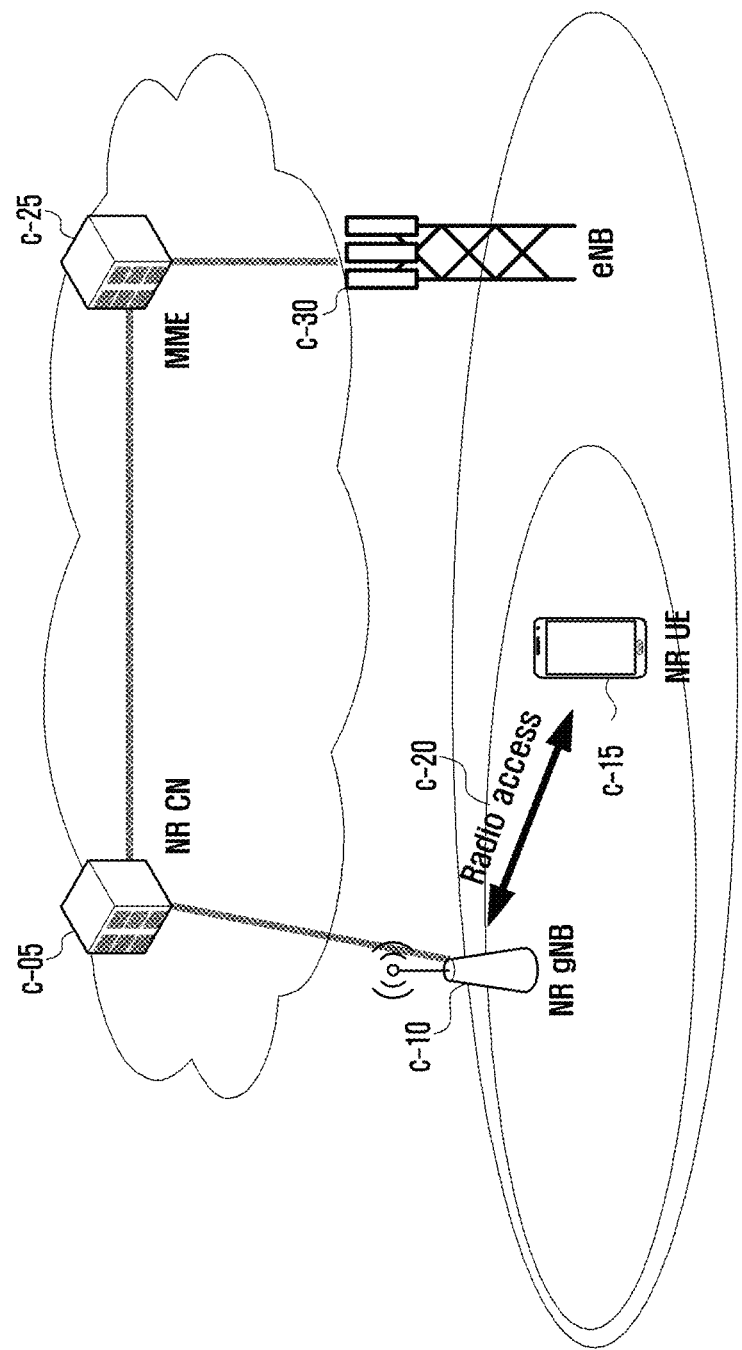
FIG. 3 is a diagram illustrating a structure of a next-generation mobile communication system according to various embodiments of the present disclosure.

FIG. 3 is a diagram illustrating a structure of a next-generation mobile communication system according to various embodiments of the present disclosure.

Referring to FIG. 3, as illustrated, a radio access network of a next-generation mobile communication system (hereinafter referred to as NR or 5G) is composed of a next-generation base station (New Radio Node B, hereinafter NR gNB or NR base station) c-10 and a new radio core network (NR CN) c-05. A new radio user equipment (hereinafter NR UE or UE) c-15 accesses an external network through NR gNB c-10 and NR CN c-05.

In FIG. 3, the NR gNB c-10 corresponds to an Evolved Node B (eNB) of an existing LTE system. The NR gNB is connected to the NR UE c-15 through a radio channel and may provide a service superior to that of the existing Node B. In the next-generation mobile communication system, because all user traffic is serviced through the shared channel, a device for scheduling by collecting status information such as buffer status, available transmission power status, and channel status of the UEs is required, and the NR NB c-10 is responsible for this. One NR gNB typically controls multiple cells. In order to implement ultra-high-speed data transmission compared to current LTE, the next-generation mobile communication system may have more than the existing maximum bandwidth, and additional beamforming technology may be grafted using orthogonal frequency division multiplexing (hereinafter referred to as OFDM) as a radio access technology. In addition, an adaptive modulation and coding (AMC) method for determining a modulation scheme and a channel coding rate according to the channel state of the UE is applied. The NR CN c-05 performs functions such as mobility support, bearer setup, QoS configuration, and the like. The NR CN c-05 is a device in charge of various control functions as well as a mobility management function for the UE, and is connected to a plurality of base stations. In addition, the next-generation mobile communication system may be linked with the existing LTE system, and the NR CN is connected to the MME c-25 through a network interface. The MME is connected to the existing base station eNB c-30.

Figure 4:
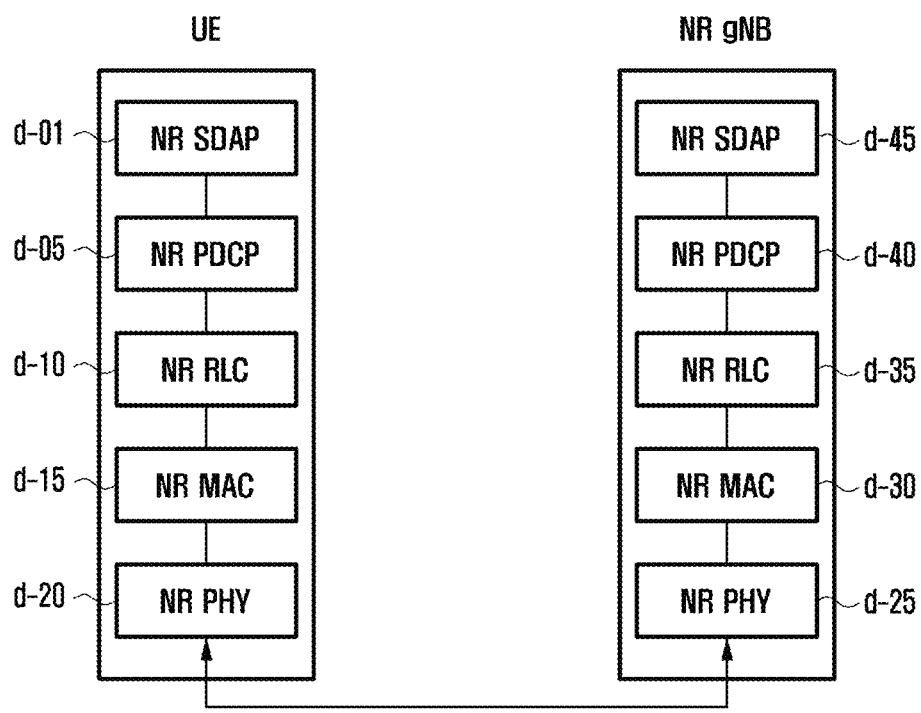
FIG. 4 is a diagram illustrating a radio protocol structure of a next-generation mobile communication system according to various embodiments of the present disclosure.

FIG. 4 is a diagram illustrating a radio protocol structure of a next-generation mobile communication system according to various embodiments of the present disclosure.

Referring to FIG. 4, a radio protocol of a next-generation mobile communication system consists of NR SDAP d-01 and d-45, NR PDCP d-05 and d-40, NR RLC d-10 and d-35, and NR MAC d-15 and d-30 in a UE and an NR base station, respectively.

The main functions of the NR SDAPs d-01 and d-45 may include some of the following functions:
 Transfer of user plane data;
 Mapping between a QoS flow and a DRB for both DL and UL;
 Marking QoS flow ID in both DL and UL packets; and/or
 Reflective QoS flow to DRB mapping for the UL SDAP PDUs.

With respect to the SDAP layer, the UE may be configured with an RRC message whether to use the header of the SDAP layer or the function of the SDAP layer for each PDCP layer, for each bearer, or for each logical channel, and when SDAP header is configured, with the NAS QoS reflection configuration 1-bit indicator (NAS reflective QoS) and the AS QoS reflection configuration 1-bit indicator (AS reflective QoS) in the SDAP header, it is possible to instruct the UE to update or reconfiguring mapping information for uplink and downlink QoS flows and data bearers. The SDAP header may include QoS flow ID information indicating QoS. The QoS information may be used as data processing priority, scheduling information to support a smooth service, etc.

The main function of NR PDCP d-05 and d-40 may include some of the following functions:
 Header compression and decompression (ROHC only);
 Transfer of user data;
 In-sequence delivery of upper layer PDUs;
 Out-of-sequence delivery of upper layer PDUs;
 PDCP PDU reordering for reception;
 Duplicate detection of lower layer SDUs;
 Retransmission of PDCP SDUs;
 Ciphering and deciphering; and/or
 Timer-based SDU discard in uplink.

In the above, the reordering function of the NR PDCP device refers to a function of reordering PDCP PDUs received from a lower layer in order based on a PDCP sequence number (SN), and may include a function to transmit data to the upper layer in the rearranged order or a function to directly transmit data without considering the order, a function to record lost PDCP PDUs by rearranging the order, a function to report the status of lost PDCP PDUs to the transmitting side, and a function to request retransmission for lost PDCP PDUs.

The main function of the NR RLC d-10 and d-35 may include some of the following functions:
 Transfer of upper layer PDUs;
 In-sequence delivery of upper layer PDUs;
 Out-of-sequence delivery of upper layer PDUs;
 Error Correction through ARQ;
 Concatenation, segmentation and reassembly of RLC SDUs;
 Re-segmentation of RLC data PDUs;
 Reordering of RLC data PDUs;
 Duplicate detection;
 Protocol error detection;
 RLC SDU discard; and/or
 RLC re-establishment.

In the above, in-sequence delivery of the NR RLC device refers to a function of sequentially delivering RLC SDUs received from a lower layer to an upper layer, and, may include a function to reassemble and deliver divided RLC SDUs when originally one RLC SDU is divided into several RLC SDUs and received, a function of rearranging received RLC PDUs based on RLC sequence number (SN) or PDCP sequence number (SN), a function to reorder and record lost RLC PDUs, a function to report the status of lost RLC PDUs to the transmitting side, a function to request retransmission of lost RLC PDUs, a function of sequentially delivering only the RLC SDUs before the lost RLC SDU to the upper layer when there is a missing RLC SDU, a function of sequentially delivering all RLC SDUs received before the timer starts to the upper layer if a predetermined timer has expired even if there is a lost RLC SDU, or a function of sequentially delivering all RLC SDUs received so far to the upper layer if a predetermined timer has expired even if there is a lost RLC SDU. In addition, the RLC PDUs may be processed in the order (in the order of arrival, out-of-sequence of the serial number and sequence number) in which RLC PDUS are received and delivered to the PDCP device out-of-sequence (out-of-sequence delivery), and in the case of segments, segments stored in the buffer or to be received later are received, reconstructed into one complete RLC PDU, processed, and delivered to the PDCP device. The NR RLC layer may not include a concatenation function, and the function may be performed by the NR MAC layer or replaced with a multiplexing function of the NR MAC layer.

In the above, out-of-sequence delivery of the NR RLC device refers to a function of directly delivering RLC SDUs received from a lower layer to an upper layer regardless of order, and may include a function of reassembling and delivering when originally one RLC SDU is divided into several RLC SDUs and received, and a function of storing the RLC SN or PDCP SN of the received RLC PDUs, arranging the order, and recording the lost RLC PDUs.

The NR MACs d-15 and d-30 may be connected to several NR RLC layers configured in one UE, and the main function of the NR MAC may include some of the following functions:
 Mapping between logical channels and transport channels;
 Multiplexing/demultiplexing of MAC SDUs;
 Scheduling information reporting;
 Error correction through HARQ;
 Priority handling between logical channels of one UE;
 Priority handling between UEs by means of dynamic scheduling;
 MBMS service identification;
 Transport format selection; and/or
 Padding.

The NR PHY layer d-20 and d-25 channel-codes and modulates the upper layer data, and may perform making an OFDM symbol and transmitting the OFDM symbol through a radio channel, or demodulating an OFDM symbol received through the radio channel, performing channel decoding, and transmitting the OFDM symbol to an upper layer.

Because the next-generation mobile communication system may use a very high frequency band, the frequency bandwidth may also be very wide. However, supporting all very wide bandwidths in UE implementation requires high implementation complexity and incurs high cost. Therefore, the concept of a bandwidth part (BWP) may be introduced in the next-generation mobile communication system, and a plurality of bandwidth parts (BWPs) may be configured in one cell (Spcell or Scell) and data may be transmitted/received in one or a plurality of bandwidth parts according to an indication of a base station.

The disclosure is characterized by proposing a state transition method or a bandwidth part switching method and a specific operation considering the state of the Scell and a plurality of bandwidth parts configured in the Scell when introducing the dormant bandwidth part provided in the disclosure. In addition, a method of managing the dormant mode by BWP-level and making a state transition or a method of bandwidth part switching, respectively are provided, and a specific bandwidth part operation according to the state of each SCell or the state or mode (active, inactive, or dormant) of each bandwidth part is provided.

In addition, the disclosure is characterized in that it is possible to configure a plurality of bandwidth parts for each downlink or uplink in one cell (Spcell, Pcell, Pscell, or Scell), and configure and operate an active bandwidth part (active DL or UL BWP), a dormant bandwidth part (dormant BWP or dormant DL BWP), or an inactive bandwidth part (inactive or deactivated DL/UL BWP) through bandwidth part switching. That is, the data transmission rate may be increased by a method similar to the carrier aggregation technology by transitioning the downlink or uplink bandwidth part to the active state for the single cell, and the UE may not perform PDCCH monitoring for the cell, thereby saving battery by transitioning or switching the downlink bandwidth part to the dormant bandwidth part, and it is possible to support the activation of a fast cell or bandwidth part in the future by enabling the UE to perform channel measurement on the downlink bandwidth part and report the channel measurement result. In addition, it is possible to save the battery of the UE by transitioning the downlink (or uplink) bandwidth part to the inactive state in the one cell. In the above, a state transition indication or a bandwidth part switching indication for each cell may be configured and indicated by an RRC message, MAC CE, or downlink control information (DCI) of a PDCCH.

In the disclosure, the bandwidth part (BWP) may be used without distinguishing between the uplink and the downlink, and the meaning may indicate the uplink bandwidth part and the downlink bandwidth part respectively according to the context.

In the disclosure, the link may be used without distinguishing between the uplink and the downlink, and the meaning may indicate the uplink and the downlink respectively according to the context.

In the disclosure, the dormant bandwidth part (BWP) is configured or introduced for the SCell of the UE performing the carrier aggregation technique, monitoring the PDCCH in the dormant bandwidth part is not performed to reduce the battery consumption of the UE, and when data transmission is required by performing channel measurement and reporting (e.g., channel state information (CSI) or channel quality information (CQI) measurement or reporting) in the dormant bandwidth part, or performing beam measurement or beam tracking or beam operation, data transmission may be started quickly in the normal bandwidth part by switching or activating the normal bandwidth part (BWP). In the above, the dormant bandwidth part may not configure nor apply for the SpCell (PCell in MCG or PCell in SCG (or PSCell)) that need to continuously monitor signals, transmit or receive feedback, or verify and maintain synchronization or the SCell with PUCCH configured.

The disclosure provides various embodiments of PDCCH DCI-based, MAC CE-based, or RRC message-based operation operate the aforementioned dormant bandwidth part for the SCell of the UE.

A network or a base station may configure a Spcell (Pcell and PScell) and a plurality of Scells to the UE. In the above, Spcell may indicate the Pcell when the UE communicates with one base station, and may indicate the Pcell of the master base station or the PScell of the secondary base station when the UE communicates with two base stations (master base station and secondary base station). In the above, Pcell or Pscell represents a main cell used by the UE and the base station in each MAC layer to communicate, and a cell in which timing is performed to perform synchronization, random access is performed, HARQ ACK/NACK feedback is transmitted as a PUCCH transmission resource, and most control signals are transmitted and received. In the above, a technology in which a base station operates a plurality of Scells together with Spcells to increase transmission resources and to increase uplink or downlink data transmission resources is referred to as a carrier aggregation technology.

When the UE receives the Spcell and a plurality of SCells configured with the RRC message, the UE may receive the state or mode for each SCell or bandwidth part of each SCell configured by the RRC message, MAC CE, or DCI of PDCCH. In the above, the state or mode of the Scell may be configured to an active mode or an activated state and a deactivated mode or a deactivated state. In the above, that the Scell is in the active mode or in the active state refers to that the UE may transmit and receive uplink or downlink data with the base station in the activated bandwidth part of the Scell, the activated normal bandwidth part, or a bandwidth part other than the activated dormant bandwidth part in the active mode or the activated, monitor the PDCCH to confirm the indication of the base station, perform channel measurement on the downlink of the Scell (or the active bandwidth part of the Scell, the activated normal bandwidth part, or the active dormant bandwidth part other than the active bandwidth part) in the active mode or active state, periodically report measurement information to the base station, and periodically transmit a pilot signal (sounding reference signal, SRS) to the base station so that the base station may measure the uplink channel.

However, the inactive mode or inactive state of the SCell may refer to that the bandwidth parts configured in the SCell of the UE are in an inactive state or the configured bandwidth parts are not activated, or data may not be transmitted/received with the base station because there is no active bandwidth part among the configured bandwidth parts, monitoring the PDCCH for confirming the indication of the base station is not performed, measuring the channel is not performed, reporting the measurement is not performed, and the pilot signal is not transmitted.

Therefore, in order to activate the Scells in the inactive mode, the base station first configures frequency measurement configuration information to the UE through an RRC message, and the UE performs cell or frequency measurement based on the frequency measurement configuration information. In addition, the base station may activate the deactivated Scells based on frequency/channel measurement information after receiving the cell or frequency measurement report of the UE. Because of this, a lot of delay occurs when the base station activates the carrier aggregation technology to the UE and starts data transmission or reception.

In the disclosure, in order to save the battery of the UE and to start data transmission or reception quickly, a dormant mode or a dormant state for the bandwidth part of each activated Scell (activated SCell or active SCell) (BWP) is provided, or configuring or introducing a dominant bandwidth part (BWP) for each activated SCell is provided.

In the dormant BWP in activated SCell, when the dormant bandwidth part is activated, the UE cannot transmit and receive data with the base station, or does not monitor the PDCCH to confirm the indication of the base station, or does not transmit a pilot signal, but performs channel measurements, and reports the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth part (or the bandwidth part that is not the dormant bandwidth part) of the activated SCell is activated, and because the channel measurement report is performed unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

Accordingly, in the disclosure, that the Scell is in the active mode or in the active state refers to that the UE may transmit and receive uplink or downlink data with the base station in the activated bandwidth part of the Scell, the activated normal bandwidth part, or a bandwidth part other than the activated dormant bandwidth part in the active mode or the activated. In addition, that the Scell is in the active mode or in the active state refers to that the UE may monitor the PDCCH to confirm the indication of the base station, perform channel measurement on the downlink of the Scell (or the active bandwidth part of the Scell, the activated normal bandwidth part, or the active dormant bandwidth part other than the active bandwidth part) in the active mode or active state, periodically report measurement information to the base station, and periodically transmit a pilot signal (sounding reference signal, SRS) to the base station so that the base station may measure the uplink channel. In addition, in the disclosure, that the Scell is in the active mode or in the active state may refer to that the UE may not transmit and receive uplink or downlink data with the base station in the activated dormant bandwidth part of the Scell in the active mode or the activated Scell, or may refer to that it is possible to perform channel measurement on the downlink of the active dormant bandwidth part of the active mode or the active Scell and report the measurement information to the base station periodically even though the PDCCH is not monitored to confirm the indication of the base station.

In addition, in the disclosure, the dormant bandwidth part may indicate the state of the bandwidth part, or the dormant bandwidth part may be used as the name of a logical concept indicating a specific bandwidth part. Accordingly, the dormant bandwidth part may be activated, deactivated, or switched. For example, the indication to switch the second bandwidth part activated in the first SCell to the dormant bandwidth part, or the indication to transition the first SCell to dormant or dormant mode, or the indication to activate the dormant bandwidth part of the first SCell may be interpreted as the same meaning.

In addition, in the disclosure, the normal bandwidth part may represent bandwidth parts that are not dormant bandwidth parts among the bandwidth parts configured in each SCell of the UE by RRC message, uplink or downlink data may be transmitted and received with the base station in the normal bandwidth part, it is possible to monitor the PDCCH to confirm the indication of the base station, perform channel measurement for the downlink, and periodically report measurement information to the base station, and the UE may periodically transmit a pilot signal (sounding reference signal, SRS) to the base station so that the base station may measure the uplink channel. In addition, the normal bandwidth part may indicate an initial active bandwidth part, a default bandwidth part, an initial active bandwidth part, or initial bandwidth part activated from dormancy.

In addition, among the bandwidth parts configured in each Scell of the UE, only one dormant bandwidth part may be configured and may be configured for the downlink. As another method, one dormant bandwidth part may be configured for uplink or downlink among bandwidth parts configured for each Scell of the UE.

Figure 5:
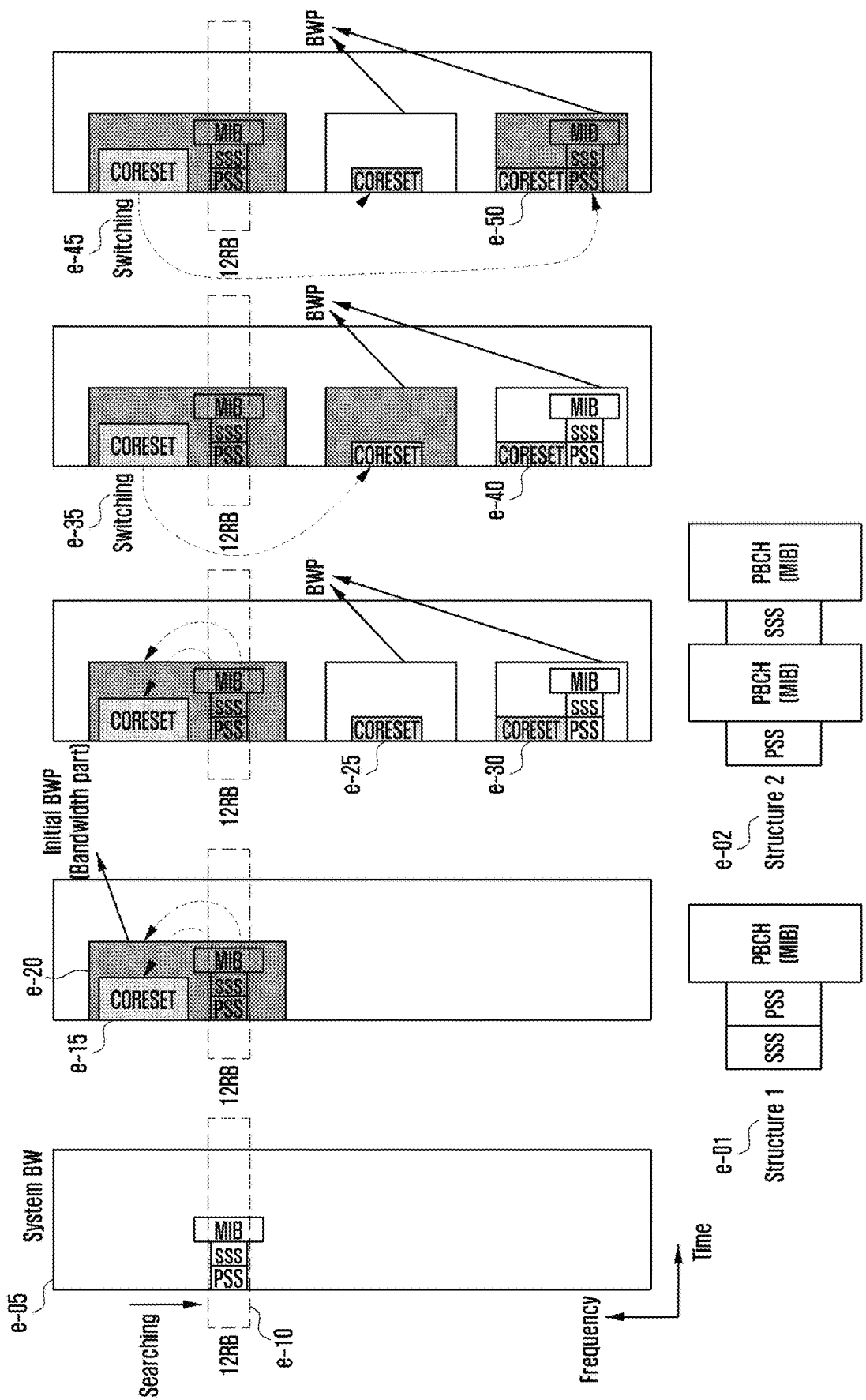
FIG. 5 is a diagram illustrating a procedure for providing a service to a UE by efficiently using a very wide frequency bandwidth in a next-generation mobile communication system according to various embodiments of the present disclosure.

FIG. 5 is a diagram illustrating a procedure for providing a service to a UE by efficiently using a very wide frequency bandwidth in a next-generation mobile communication system according to various embodiments of the present disclosure.

In FIG. 5, how the next-generation mobile communication system efficiently uses a very wide frequency bandwidth to provide services to UEs having different abilities (capabilities or categories) and to save battery.

One cell that the base station provides services may service a very wide frequency band such as e-05. However, in order to provide a service to UEs having different capabilities, the wide frequency band may be divided into a plurality of bandwidth parts and managed as one cell.

First, the UE initially powered on may search the entire frequency band provided by the operator PLMN in a predetermined resource block unit (for example, in 12 resource block (RB) units). For example, the UE may start to search a primary synchronization sequence (PSS)/secondary synchronization sequence (SSS) in the entire system bandwidth in units of the resource block (e-10). If the signals are detected while searching for PSS/SSS e-01 or e-02 in units of the resource block, the signals may be read and interpreted (decoded) to identify boundaries between a subframe and a radio frame. Accordingly, subframes may be distinguished in units of 1 ms, and the UE synchronizes the downlink signal with the base station. In the above, a resource block (RB) may be defined as a two-dimensional unit with the size of a predetermined frequency resource and a predetermined time resource. For example, it may be defined as 1 ms unit as a time resource and 12 subcarriers (1 carrier×15 kHz=180 kHz) as a frequency resource. In the above, when the UE completes synchronization, the UE may identify the master system information block (MIB) or minimum system information (MSI) to identify the information of the control resource set (CORESEST) and identify the initial access bandwidth part (BWP) information e-15 and e-20.

In the above, the CORESET information refers to a location of a time/frequency transmission resource through which a control signal is transmitted from the base station, and, for example, indicates a resource location through which a PDCCH channel is transmitted. The CORESET information is information indicating where the first system information (system information block 1, SIB1) is transmitted, and indicates from which frequency/time resource the PDCCH is transmitted. In the above, when the UE reads the first system information, the UE may identify information on the initial bandwidth part (initial BWP). As described above, when the UE completes synchronization of the downlink signal with the base station and is ready to receive the control signal, the UE may perform a random access procedure in the initial bandwidth part (initial BWP) of the cell on which the UE camps on, request RRC connection configuration, and receive an RRC message to perform RRC connection configuration.

In the RRC connection configuration, a plurality of bandwidth parts may be configured for each cell (Pcell or Pscell or Spcell or Scell). A plurality of bandwidth parts may be configured for downlink in one cell, and a plurality of bandwidth parts may be configured for uplink separately.

The plurality of bandwidth parts may be indicated and configured as a BWP identifier to be used as an initial BWP, default BWP, first active BWP, dormant BWP, or first active BWP from dormant.

In the above, the initial BWP may be used as the bandwidth part determined by the cell-specific level that exists one per cell, and the UE accessing the cell for the first time may configure a connection to the cell through a random access procedure, or the initial BWP may be used as a bandwidth part in which the UE that has configured the connection may perform synchronization. In addition, the base station may configure the initial downlink BWP to be used in the downlink and the initial uplink BWP to be used in the uplink for each cell, respectively. In addition, the configuration information for the initial bandwidth part may be broadcast in the first system information (system information 1, SIB1) indicated by CORESET, and the base station may reconfigure the RRC message to the UE that has accessed the connection. In addition, the initial downlink BWP may be used by designating 0 of the bandwidth part identifier in the uplink and downlink, respectively. That is, all UEs accessing the same cell may use the same initial bandwidth part by designating the same bandwidth part identifier 0. This is because when performing the random access procedure, the base station may transmit a random access response (RAR) message to the initial bandwidth part that all UEs may read, so there may be an advantage in facilitating the contention-based random access procedure.

In the above, the first active BWP may be configured differently for each UE (UE specific), and may be indicated by designating a bandwidth part identifier among a plurality of bandwidth parts. The first active bandwidth part may be configured for downlink and uplink, respectively, and may be configured as first active downlink BWP and first active uplink BWP, respectively, as a bandwidth part identifier. The first activated bandwidth part may be used to indicate which bandwidth part is to be initially activated and used when a plurality of bandwidth parts are configured in one cell. For example, when a Pcell or Pscell and a plurality of Scells are configured in the UE and a plurality of bandwidth parts are configured in each Pcell, Pscell or Scell, and if the Pcell, Pscell, or Scell is activated, the UE may activate and use the first active BWP among a plurality of bandwidth parts configured in the Pcell, Pscell or Scell. For example, the first active downlink BWP may be activated and used for the downlink and the first active uplink BWP may be activated and used for the uplink.

In the above, the operation of the UE switching the current or activated downlink bandwidth part for the Scell and activating the downlink bandwidth part as the first activated downlink bandwidth part (or the bandwidth part configured or indicated by the RRC message) or switching the current or activated uplink bandwidth part for the Scell and activating the uplink bandwidth part as the first activated uplink bandwidth part (or the bandwidth part configured or indicated by the RRC message) may be performed when the Scell or the bandwidth part is in an inactive state and receives an instruction to activate the Scell or the bandwidth part through an RRC message, MAC control information, or DCI. In addition, it may be performed when the UE receives an instruction to transition the Scell or bandwidth part to the dormant state through an RRC message, MAC control information, or DCI. This is because when activating the Scell or bandwidth part, the current or activated downlink bandwidth part is switched to activate the first activated downlink bandwidth part (or the bandwidth part configured or indicated by the RRC message) or the uplink bandwidth part is switched to activate the first activated uplink bandwidth part (or the bandwidth part configured or indicated by the RRC message), the base station may effectively use the carrier aggregation technology only when the frequency/channel is measured and reported for the first active downlink/uplink bandwidth part even when the channel measurement report is performed in the dormant state.

In the above, the default BWP may be configured differently for each UE (UE specific), and may be indicated by designating a bandwidth part identifier among a plurality of bandwidth parts. It may be characterized in that the default bandwidth part is configured only for the downlink. The default bandwidth part may be used as a bandwidth part to which an activated bandwidth part among a plurality of downlink bandwidth parts may fall back after a predetermined time. For example, BWP inactivity timer may be configured for each cell or for each bandwidth part with an RRC message, and the timer is started or restarted when data transmission/reception occurs in an activated bandwidth part other than the default bandwidth part, or may be started or restarted when the activated bandwidth part is switched to another bandwidth part. When the timer expires, the UE may fallback or switch the downlink bandwidth part activated in the cell to the default bandwidth. In the above, switching may refer to a procedure of inactivating a currently activated bandwidth part and activating a bandwidth part indicated by switching, and the switching may be triggered by an RRC message, a MAC control element, or L1 signaling (downlink control information (DCI) of PDCCH). In the above, the switching may be triggered by indicating a bandwidth part to be switched or activated, and the bandwidth part may be indicated by a bandwidth part identifier (e.g., 0, 1, 2, 3, or 4).

The reason why the default bandwidth part is applied and used only for downlink is that the base station may facilitate scheduling of the base station by causing the UE to fall back to the default bandwidth part after a predetermined time has elapsed for each cell to receive an instruction (e.g., DCI of PDCCH) from the base station. For example, if the base station configures the basic bandwidth part of UEs accessing one cell as the initial bandwidth part, the base station may continue to perform the scheduling instruction only in the initial bandwidth part after a certain period of time. If the default bandwidth part is not configured in the RRC message, the initial bandwidth part may be regarded as a default bandwidth part, and fall back to the initial bandwidth part when the bandwidth part deactivation timer expires.

As another method, in order to increase the implementation freedom of the base station, a default bandwidth part for the uplink may be defined and configured, and used like the default bandwidth part of the downlink.

In the above description, the dormant BWP may mean a bandwidth part that is a dormant mode of an activated SCell or a dormant BWP in activated SCell. When the dormant bandwidth part is activated, the UE may not transmit and receive data with the base station, or does not monitor the PDCCH to confirm the indication of the base station, or does not transmit a pilot signal, but performs channel measurements, and reports the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth (or the bandwidth part that is not the dormant bandwidth part) part of the activated SCell is activated. In addition, because the UE performs the channel measurement report unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

Figure 6:
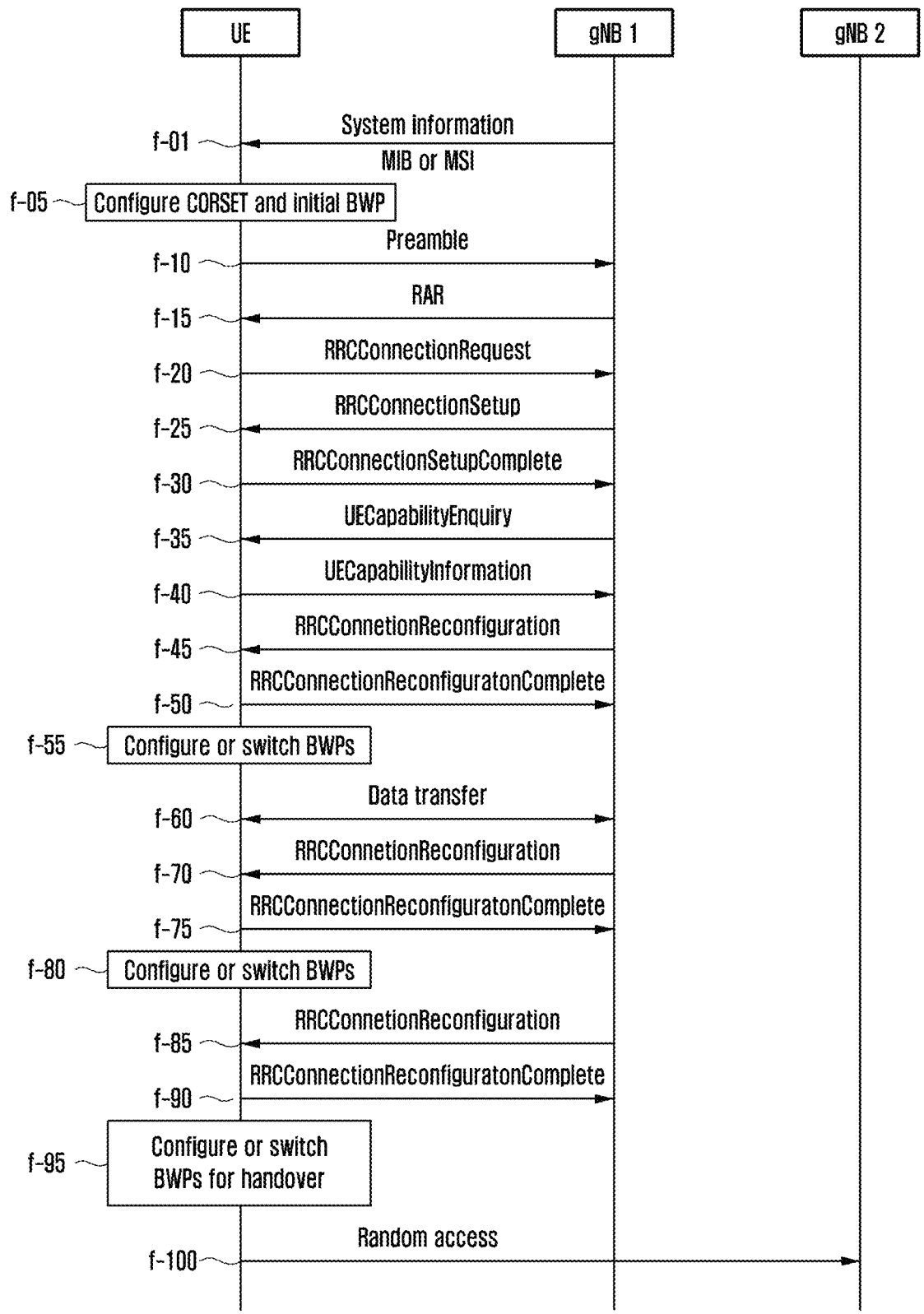
FIG. 6 is a diagram illustrating a procedure for a UE to switch from an RRC idle mode to an RRC connected mode in the next-generation mobile communication system of the disclosure, and proposing a method of configuring a plurality of bandwidth parts (BWP) and configuring a default BWP or a first active BWP, according to various embodiments of the present disclosure.

The first active bandwidth part (or the first active non-dormant bandwidth part or the bandwidth part configured or indicated by the RRC message) activated in the dormant state or switched from the dormant bandwidth part may be a bandwidth part to be activated by switching the current or activated bandwidth part of the SCell activated by the UE according to a corresponding indication, or a bandwidth part to be activated from a dormant state set in an RRC message when the UE is operating the bandwidth part of one activated SCell as the dormant bandwidth part, when the active bandwidth part in the activated SCell is the dormant bandwidth part, when switched to the dormant bandwidth part in the SCell, when the UE is instructed to switch the bandwidth part of the activated SCell from the dormant bandwidth part to the normal bandwidth part (or the bandwidth part that is not the dormant bandwidth part) by the DCI or MAC CE or RRC message of the PDCCH from the base station, when the UE is instructed to switch or switch the convert bandwidth part to the normal bandwidth part in the dormant bandwidth part, or when instructed to switch or convert or activate the active bandwidth part to the normal bandwidth part (e.g., the e first active bandwidth part that is activated from dormancy) in the dormant bandwidth part, FIG. 6 is a diagram illustrating a procedure for a UE to switch from an RRC idle mode to an RRC connected mode in the next-generation mobile communication system according to various embodiments of the present disclosure, and provides a method of configuring a plurality of bandwidth parts (BWP) and configuring a default BWP or a first active BWP.

One cell provided by the base station may service a very wide frequency band. First, the UE may search the entire frequency band provided by the operator (PLMN) in units of a certain resource block (e.g., in units of 12 RBs). That is, the UE may start searching for a primary synchronization sequence (PSS)/secondary synchronization sequence (SSS) in the entire system bandwidth in units of the resource blocks. If the signals are detected while searching for PSS/SSS in units of the resource blocks, the boundaries between a sub-frame and a radio transmission resource frame may be identified by reading and analyzing (decoding) the signals. In the above, when the synchronization is completed, the UE may read system information of the cell currently camped on. That is, the initial bandwidth part (BWP) information may be identified by identifying the master system information block (MIB) or minimum system information (MSI) to identify the information of the control resource set (CORESEST) and by reading the system information f-01 and f-05. In the above, the CORESET information refers to a location of a time/frequency transmission resource through which a control signal is transmitted from a base station, and, for example, indicates a resource location through which a PDCCH channel is transmitted.

As described above, when the UE completes synchronization of the downlink signal with the base station and is ready to receive the control signal, the UE may perform a random access procedure in the initial bandwidth part, receive a random access response, request RRC connection establishment, and receive an RRC message to perform RRC connection configuration f-10, f-15, f-20, f-25, and f-30.

When the basic RRC connection configuration is completed in the above, the base station may transmit an RRC message inquiring about the UE capability to the UE to identify the UE capability (UECapabilityEnquiry, f-35). In another method, the base station may ask the MME or AMF for the UE capability to identify the UE capability. This is because the MME or AMF may have stored the capability information of the UE if the MME or AMF has previously accessed the UE. If there is no UE capability information desired by the base station, the base station may request UE capability from the UE.

The reason why the base station transmits the RRC message to the UE to identify the UE capability is to identify the capability of the UE and, for example, to determine what frequency band the UE may read or the frequency band area that the UE may read. In addition, after confirming the capability of the UE, the base station may configure an appropriate bandwidth part (BWP) to the UE. When the UE receives the RRC message inquiring about the UE capability in the above, in response to this, the UE may indicate the range of the bandwidth supported by the UE or the range to which the bandwidth is supported from the current system bandwidth as an offset from the reference center frequency, may directly indicate the start point and the end point of the supported frequency bandwidth, or may indicate the center frequency and bandwidth f-40.

In the above, the bandwidth part may be configured with an RRCSetup message, an RRCResume message f-25, or an RRCReconfiguration message f-45 of RRC connection setup. The RRC message may include configuration information for a Pcell, Pscell, or a plurality of Scells, and a plurality of bandwidth parts may be configured for each cell (PCell, Pscell, or Scell). When configuring a plurality of bandwidth parts for each cell, a plurality of bandwidth parts to be used in the downlink of each cell may be configured, In the case of the FDD system, a plurality of bandwidth parts to be used in the uplink of each cell may be configured separately from the downlink bandwidth parts, and in the case of the TDD system, a plurality of bandwidth parts to be commonly used in the downlink and the uplink of each cell may be configured.

The information for configuring the bandwidth part of each cell (PCell, Pscell, or Scell) may include some of the following information:
  Downlink bandwidth part configuration information of the cell:
    Initial downlink BWP configuration information,
    A plurality of bandwidth part configuration information and a bandwidth part identifier (BWP ID) corresponding to each bandwidth part,
    Initial state configuration information of the downlink bandwidth part of the cell (e.g., active state, dormant state, or inactive state),
    Bandwidth part identifier indicating the first active downlink BWP, Bandwidth part identifier indicating default BWP, Configuration information for PDCCH monitoring for each bandwidth part. For example, CORESET information, search space resource information, or PDCCH transmission resource, period, sub-frame number information, etc., A bandwidth part identifier indicating a dormant bandwidth part or a 1-bit indicator indicating a dormant bandwidth part for each bandwidth part in the bandwidth part configuration information, A bandwidth part identifier indicating the first active bandwidth part activated from dormancy or a 1-bit indicator indicating the first active bandwidth part activated from dormancy for each bandwidth part in the bandwidth part configuration information, Bandwidth part deactivation timer configuration and timer value, and/or An identifier indicating the MBS service or an identifier indicating the type of the MBS service or an indicator that the MBS service may be supported by falling back (or transitioning or switching) to the bandwidth part when the MBS service is not valid (e.g., when the wireless signal is poor); and/or Uplink bandwidth part configuration information of the cell:

Initial uplink BWP configuration information,

A plurality of bandwidth part configuration information and a bandwidth part identifier (BWP ID) corresponding to each bandwidth part, Initial state configuration information of the uplink bandwidth part of the cell (e.g., active state, dormant state, or inactive state), A bandwidth part identifier indicating a dormant bandwidth part or a 1-bit indicator indicating a dormant bandwidth part for each bandwidth part in the bandwidth part configuration information, A bandwidth part identifier indicating the first active uplink BWP, and/or An identifier indicating the MBS service or an identifier indicating the type of the MBS service or an indicator that the MBS service may be supported by falling back (or transitioning or switching) to the bandwidth part when the MBS service is not valid (e.g., when the wireless signal is poor).

In the above, the base station may transmit to the UE including configuration information for the MBS service or configuration information for the MBS bearer in the RRC-Setup message or RRCResume message f-25 or RRCReconfiguration message f-45 of the RRC connection configuration. The configuration information may include PDCP layer device configuration information for MBS service or MBS bearer per bearer or per logical channel identifier, or RLC layer device configuration information or MAC layer device configuration information. The configuration information may include the following information or indicators.

In one example of information or indicators, in the RRC message, a PDCP re-establishment procedure or a PDCP reconfiguration procedure for the bearer may be instructed to the UE by including an indicator to re-establish or reconfigure the PDCP layer. The indicator may be configured for each MBS service (e.g., multicast service, unicast service, PTP, or PTM) supported by one PDCP layer, for each connected (or for multicast service, unicast service, PTP, or PTM) RLC layer, or for each mode of the RLC layer (e.g., per UM mode, AM mode, UM DRB, or AM DRB). In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information or indicators, window variable initialization may be indicated by configuring an indicator to initialize transmission or reception window variables (e.g., RX_NEXT, RX_DELIV, RX_REORD, or TX_Next) of the PDCP layer of the bearer or only specific transmission or reception window variables (e.g., RX_NEXT, RX_DELIV, RX_REORD, or TX_Next) in the RRC message. In the above, the window variable initialization may indicate to initialize or set the window variable values to 0. As another method, when specific values for window variables (or a value for each window variable or a common value for window variables) of the PDCP layer are included and configured in the RRC message, it may be instructed to initialize or set the window variable values to the specific values (e.g., PDCP serial number value or COUNT value) set above. If the indicator to initialize the transmission or reception window variables of the PDCP layer is not included (or not configured) in the above, the current transmission or reception window variables may be maintained. The procedure may be performed when performing a PDCP re-establishment procedure or a PDCP re-establishment procedure for the bearer. The indicator may be configured for each MBS service (e.g., multicast service or unicast service or PTP or PTM) supported by one PDCP layer or for each connected (or for multicast service or unicast service or PTP or PTM) RLC layer.

In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, it may be configured or indicated including an indicator indicating to perform data processing on data (e.g., PDCP PDU or PDCP SDU) stored in a reception PDCP layer of the PDCP layer of the bearer or data (e.g., data stored because PDCP PDU or PDCP SDU or reception PDCP serial numbers or COUNT values are not received in order or data in which the header decompression procedure has not yet been applied when the header compression procedure is configured) out of order, and transmit to an upper layer. If the indicator is configured, the UE may transmit the data (e.g., PDCP PDU or PDCP SDU) stored in a reception PDCP layer of the PDCP layer of the bearer or data (e.g., data stored because PDCP PDU or PDCP SDU or reception PDCP serial numbers or COUNT values are not received in order or data in which the header decompression procedure has not yet been applied when the header compression procedure is configured) out of order to the upper layer. Alternatively, when the header compression function is configured, data to which the header decompression procedure is not applied may be transmitted to the upper layer after applying the header decompression procedure.

As another method, for the MBS bearer, when the header compression function is configured to the reception PDCP layer, the delay may be reduced by enabling the header decompression procedure to be immediately performed on received data regardless of the order. The procedure may be performed when performing a PDCP re-establishment procedure or a PDCP reconfiguration procedure for the bearer. The indicator may be configured for each MBS service (e.g., multicast service or unicast service or PTP or PTM) supported by one PDCP layer or for each connected (or for multicast service or unicast service or PTP or PTM) RLC layer. In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type.

As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, an indicator indicating whether to continue maintaining or initializing the mapping relationship (or the status of the COUNT value (or PDCP serial number) allocated to each data) between the COUNT value (or PDCP serial number) of the PDCP layer of the bearer and data may be included and configured. For example, if the indicator indicates to maintain the mapping relationship (or if there is no indicator), the PDCP layer may maintain the current mapping relationship. However, if the indicator indicates to initialize the mapping relationship, the PDCP layer releases or initializes the current mapping relationship, and based on the data (PDCP PDU or PDCP SDU) and the PDCP serial number of the PDCP header or the derived COUNT value from newly received data, newly configure or store the mapping relationship (or state) between the data and the COUNT value (or PDCP serial number). The procedure may be performed when performing a PDCP re-establishment procedure or a PDCP reconfiguration procedure for the bearer. The indicator may be configured for each MBS service (e.g., multicast service or unicast service or PTP or PTM) supported by one PDCP layer or for each connected (or for multicast service or unicast service or PTP or PTM) RLC layer.

In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, the RRC message may include an indicator indicating whether to use a ciphering procedure in the PDCP layer of the bearer or an indicator indicating whether to use an integrity protection procedure, and may configure each security key or algorithm to be used in the ciphering procedure or the integrity protection procedure as security configuration information. In the above, the ciphering procedure, integrity protection procedure, security key, or algorithm may be configured for each MBS service (e.g., multicast service, unicast service, PTP, or PTM) supported by one PDCP layer or for each connected (or for multicast service or unicast service or PTP or PTM) RLC layer. For example, when one PDCP layer, a UM mode RLC layer supporting multicast service, and an AM mode RLC layer supporting unicast service are connected together, for the PDCP layer, the ciphering procedure, integrity protection procedure, security key or algorithm may be configured for each MBS service (e.g., multicast service or unicast service or PTP or PTM) or for each connected (or for multicast service or unicast service or PTP or PTM) RLC layer with the RRC message.

For example, in the above, the UE may configure a first security key (symmetric key, share and use the same key as the network) to be applied in UM DRB or AM DRB or SRB, and may be configured to apply different security keys by configuring a second security key (symmetric key, sharing and using the same key as the network or asymmetric key, the network uses a private key and the UE uses a public key) to the bearer (UM MRB or AM DRB) for the MBS service. For example, depending on the type of MBS service, a bearer serving a multicast service may configure and use the second security key, and a bearer serving a unicast service may use the first security key.

For example, it may be configured to apply different security keys as described above according to the MBS service type or RLC mode serviced by different RLC layers by configuring the first security key and the second security key together in one PDCP layer (like the security key, the algorithm may be set differently and applied as the first algorithm or the second algorithm). As another method, the ciphering procedure, integrity protection procedure, security key, or algorithm may be configured in the RRC message for each PDCP layer. The indicator may be configured for each MBS service (e.g., multicast service or unicast service or PTP or PTM) supported by one PDCP layer or for each connected (or for multicast service or unicast service or PTP or PTM) RLC layer.

In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, an RLC re-establishment procedure or an RLC reconfiguration procedure including an indicator to re-establish or reconfiguration the RLC layer for the bearer may be instructed to the UE. The indicator may be configured for each MBS service (e.g., multicast service or unicast service or PTP or PTM) supported by one RLC layer or for each connected (or for multicast service or unicast service or PTP or PTM) RLC layer. In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, window variable initialization may be indicated by configuring an indicator to initialize transmission or reception window variables (e.g., RX_Next or RX_Next_Highest or RX_Highest_Status or RX_Next_Status_Trigger or TX_Next) of the RLC layer of the bearer or only specific transmission or reception window variables (e.g., RX_Next or RX_Next_Highest or RX_Highest_Status or RX_Next_Status_Trigger or TX_Next). In the above, window variable initialization may be indicated to initialize or set the window variable values to 0. As another method, when specific values (e.g., RLC serial number value or COUNT value) for window variables (or a value for each window variable or a common value for window variables) of the RLC layer are included in the RRC message and set, initializing or setting the window variable values to the specific values set above may be instructed. If the indicator to initialize the transmission or reception window variables of the RLC layer is not included (or is not configured), the current transmission or reception window variables may be maintained. The procedure may be performed when performing an RLC re-establishment procedure or an RLC reconfiguration procedure for the bearer. The indicator may be configured for each MBS service (e.g., multicast service or unicast service or PTP or PTM) supported by one RLC layer or for each connected (or for multicast service or unicast service or PTP or PTM) RLC layer.

In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, it may be configured or indicated including an indicator indicating to perform data processing on data (e.g., RLC PDU or RLC SDU) stored in a reception RLC layer of the RLC layer of the bearer or data (e.g., data stored because RLC PDU or RLC SDU or reception RLC serial numbers or COUNT values are not received in order) out of order, and transmit to an upper layer. If the indicator is configured, the UE may transmit the data (e.g., RLC PDU or RLC SDU) stored or data (e.g., data stored because RLC PDU or RLC SDU or reception RLC serial numbers or COUNT values are not received in order or data in which the header decompression procedure has not yet been applied when the header compression procedure is configured) out of order to the upper layer. Alternatively, in a case where the header compression function is configured, data to which the header decompression procedure is not applied may be transmitted to the upper layer after the header decompression procedure is applied.

As another method, for the MBS bearer, when the header compression function is configured to the reception RLC layer, the delay may be reduced by enabling the header decompression procedure to be immediately performed on received data regardless of the order. The procedure may be performed when performing a RLC re-establishment procedure or a RLC reconfiguration procedure for the bearer. The indicator may be configured for each MBS service (e.g., multicast service or unicast service or PTP or PTM) supported by one RLC layer or for each connected (or for multicast service or unicast service or PTP or PTM) RLC layer. In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type.

As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, in the RRC message, an indicator indicating whether to continue maintaining or initializing the mapping relationship (or the status of the COUNT value (or RLC serial number) allocated to each data) between the COUNT value (or RLC serial number) of the RLC layer of the bearer and data may be included and configured. For example, if the indicator indicates to maintain the mapping relationship (or if there is no indicator), the RLC layer may maintain the current mapping relationship. However, if the indicator indicates to initialize the mapping relationship, the RLC layer releases or initializes the current mapping relationship, and based on the data (RLC PDU or RLC SDU) and the RLC serial number of the RLC header or the derived COUNT value from newly received data, newly configure or store the mapping relationship (or state) between the data and the COUNT value (or RLC serial number). The procedure may be performed when performing a RLC re-establishment procedure or a RLC reconfiguration procedure for the bearer. The indicator may be configured for each MBS service (e.g., multicast service or unicast service or PTP or PTM) supported by one RLC layer or for each connected (or for multicast service or unicast service or PTP or PTM) RLC layer.

In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

In one example of information and indicators, the RRC message may configure including an indicator indicating whether the MAC layer of the UE is to be reset, whether to perform a partial reset, or to be maintained as it is (or not performing the reset procedure). In addition, the above procedure may be configured and performed as an RRC message even during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type. As another method, the procedure may be performed during the switching or transitioning procedure (e.g., switching from multicast service (PTM) (or multicast bearer) to unicast service (PTP) (or unicast bearer) or from unicast service (PTP) (or unicast bearer) to multicast service (PTM) (or multicast bearer)) of the MBS service type without the configuration or indicator of the RRC message. In addition, the configuration information or indicator may be configured differently for each bearer type (UM DRB, AM DRB, UM MRB (MBS bearer associated with RLC UM mode), or AM MRB (MBS bearer associated with RLC AM mode)) or mode of the RLC layer (e.g., by UM mode or AM mode or UM DRB or AM DRB) to perform different procedures.

When performing a PDCP reconfiguration procedure or a PDCP re-establishment procedure for AM DRB or UM DRB in the disclosure, data (PDCP PDU or PDCP SDU or uplink data) may be transmitted or retransmitted in an ascending order of the PDCP serial number (or COUNT) value from the data corresponding to the first PDCP serial number (or COUNT) value for which successful delivery (identify ACK or NACK based on RLC status report) from the lower layer (RLC layer) is not confirmed. For the MBS bearer (UM MRB or AM MRB) provided in the disclosure, when performing a PDCP reconfiguration procedure, a PDCP re-establishment procedure, or an MBS service switching procedure, the above transmission or retransmission procedure (for example, transmission or retransmission of data (PDCP PDU or PDCP SDU or uplink data) in an ascending order of the PDCP serial number (or COUNT) value from the data corresponding to the first PDCP serial number (or COUNT) value for which successful delivery from the lower layer (RLC layer) is not confirmed) may not be performed.

The initial bandwidth part (initial BWP), the default bandwidth part (default BWP), or the first active bandwidth part (first active BWP) configured above may be used for the following purposes, and may operate as follows according to the purpose.

In the above, the initial BWP may be used as the bandwidth part determined by the cell-specific level that exists one per cell, and the UE accessing the cell for the first time may configure a connection to the cell through a random access procedure, or the initial BWP may be used as a bandwidth part in which the UE that has configured the connection may perform synchronization. In addition, the base station may configure the initial downlink BWP to be used in the downlink and the initial uplink BWP to be used in the uplink for each cell, respectively. In addition, the configuration information for the initial bandwidth part may be broadcast in the first system information (system information 1, SIB1) indicated by CORESET, and the base station may reconfigure the RRC message to the UE that has accessed the connection. In addition, the initial downlink BWP may be used by designating 0 of the bandwidth part identifier in the uplink and downlink, respectively. All UEs accessing the same cell may use the same initial bandwidth part by designating the same bandwidth part identifier 0. This is because when performing the random access procedure, the base station may transmit a random access response (RAR) message to the initial bandwidth part that all UEs may read, so there may be an advantage in facilitating the contention-based random access procedure.

In the above, the first active BWP may be configured differently for each UE (UE specific), and may be indicated by designating a bandwidth part identifier among a plurality of bandwidth parts. The first active bandwidth part may be configured for downlink and uplink, respectively, and may be configured as first active downlink BWP and first active uplink BWP, respectively, as a bandwidth part identifier. The first activated bandwidth part may be used to indicate which bandwidth part is to be initially activated and used when a plurality of bandwidth parts are configured in one cell. For example, when a Pcell or Pscell and a plurality of Scells are configured in the UE and a plurality of bandwidth parts are configured in each Pcell, Pscell or Scell, and if the Pcell, Pscell, or Scell is activated, the UE may activate and use the first active BWP among a plurality of bandwidth parts configured in the Pcell, Pscell or Scell. For example, the first active downlink BWP may be activated and used for the downlink and the first active uplink BWP may be activated and used for the uplink.

The operation in which the UE switches the current or activated downlink bandwidth part for the Scell and activates as the first activated downlink bandwidth part (or the bandwidth part configured or indicated by the RRC message) or switches the current or activated uplink bandwidth part and activates as the first activated uplink bandwidth part (or the bandwidth part configured or indicated by the RRC message) may be performed when the Scell or a bandwidth part of the activated Scell is in an inactive or dormant state and is instructed to activate, or when an instruction to switch or activate from the deactivated or dormant bandwidth part to the normal bandwidth part is received through an RRC message, MAC control information, or DCI of PDCCH. In addition, when the UE receives an instruction to transition the activated Scell or bandwidth part to the dormant state or to switch to or activate the dormant bandwidth part through an RRC message, MAC control information, or DCI of PDCCH, the UE may switch or activate the bandwidth part to the dormant bandwidth part or make the bandwidth part dormant.

In the above description, switching to the dormant or dormant bandwidth part or activation of the dormant bandwidth part may refer to performing the operation provided in the dormant state in the disclosure. For example, it is possible to measure and report the channel for the downlink bandwidth part (or dormant bandwidth part) to the base station without performing PDCCH monitoring. As another method, when the activated Scell or bandwidth part is activated or switched to the normal bandwidth part, because the downlink bandwidth part is switched to be activated as the first activated downlink bandwidth part and the uplink bandwidth part is switched to be activated as the first activated uplink bandwidth part, the dormant bandwidth part may be configured as the first active downlink or uplink bandwidth part or a default bandwidth part. In the above, the default BWP may be configured differently for each UE (UE specific), and may be indicated by designating a bandwidth part identifier among a plurality of bandwidth parts. The default bandwidth part may be configured only for downlink. The default bandwidth part may be used as a bandwidth part to which an activated bandwidth part among a plurality of downlink bandwidth parts may fall back after a predetermined time.

For example, BWP inactivity timer may be configured for each cell or for each bandwidth part with an RRC message, and the timer is started or restarted when data transmission/reception occurs in an activated bandwidth part other than the default bandwidth part, or may be started or restarted when the activated bandwidth part is switched to another bandwidth part. When the timer expires, the UE may fall-back or switch the downlink bandwidth part activated in the cell to the default bandwidth. In the above, switching may refer to a procedure of inactivating a currently activated bandwidth part and activating a bandwidth part indicated by switching. The switching may be triggered by an RRC message, a MAC control element, or L1 signaling (downlink control information (DCI) of PDCCH). In the above, the switching may be triggered by indicating a bandwidth part to be switched or activated, and the bandwidth part may be indicated by a bandwidth part identifier (e.g., 0, 1, 2, 3, or 4).

The reason why the default bandwidth part is applied and used only for downlink is that the base station may facilitate scheduling of the base station by causing the UE to fall back to the default bandwidth part after a predetermined time has elapsed for each cell to receive an instruction (e.g., DCI of PDCCH) from the base station. For example, if the base station configures the basic bandwidth part of UEs accessing one cell as the initial bandwidth part, the base station may continue to perform the scheduling instruction only in the initial bandwidth part after a certain period of time. If the default bandwidth part is not configured in the RRC message, the initial bandwidth part may be regarded as a default bandwidth part, and fall back to the initial bandwidth part when the bandwidth part deactivation timer expires.

As another method, in order to increase the implementation freedom of the base station, a default bandwidth part for the uplink may be defined and configured, and used like the default bandwidth part of the downlink.

In the above description, the dormant BWP may mean a bandwidth part that is a dormant mode of an activated SCell or a dormant BWP in activated Scell, or when the dormant bandwidth part is activated, the UE may not transmit and receive data with the base station. Alternatively, the UE does not monitor the PDCCH to confirm the indication of the base station, or does not transmit a pilot signal, but performs channel measurements, and may report the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth part (or the bandwidth part that is not the dormant bandwidth part) of the activated SCell is activated. In addition, because the UE performs the channel measurement report unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

In the above, when the UE is instructed by the base station to switch the bandwidth part of the activated SCell from the dormant bandwidth part to the normal bandwidth part (or the bandwidth part that is not the dormant bandwidth part) in a DCI or MAC CE or RRC message of the PDCCH when the bandwidth part of one activated SCell of the UE is operated as the dormant bandwidth part or when the active bandwidth part in the activated SCell is the dormant bandwidth part or when the SCell switches to the dormant bandwidth part, or when the UE is instructed to switch or switch the active bandwidth part to the normal bandwidth part in the dormant bandwidth part, or when the UE is instructed to switch or convert or activate the active bandwidth part to the normal bandwidth part (e.g., the first active bandwidth part that is activated from dormancy) in the dormant bandwidth part, the first active bandwidth part (or the first active non-sleep bandwidth part) activated from dormancy may be the first active bandwidth part in which the UE needs to switch or activate the bandwidth part of the activated SCell according to the above indication is activated from dormancy configured in the RRC message.

In the disclosure, the meaning of switching the first bandwidth part to the second bandwidth part may be interpreted as the meaning of activating the second bandwidth part, or may be interpreted as meaning that the activated first bandwidth part is deactivated and the second bandwidth part is activated.

In addition, in the above the RRCSetup message, the RRCResume message f-25, or the RRCReconfiguration message f-45, frequency measurement configuration information and frequency measurement gap configuration information, etc. may be configured and frequency measurement object information may be included. In addition, in the above the RRCSetup message, the RRCResume message f-25, or the RRCReconfiguration message f-45, the power saving mode of the UE may be configured, or to reduce power consumption when the UE receives the MBS service, configuration information such as discontinuous reception (DRX) cycle, offset, on-duration period (a period in which the UE needs to monitor the PDCCH) or time information for MBS service reception, or time information or short time period information when monitoring or detecting the PDCCH from the base station before the on-duration period in the DRX cycle may be configured. If the function for reducing the power consumption of the UE is configured in the above, the UE may set the DRX cycle and detect a wake-up signal (WUS) signal in the period configured to monitor the PDCCH of the base station before the on-duration period in the above, and with the DCI of the PDCCH of the WUS signal, the base station may indicate to the UE whether to skip (or not perform) or perform PDCCH monitoring in the immediately following on-duration period. Although the UE may always monitor the PDCCH in the on-duration period, the base station with the WUS signal as described above may instruct the UE not to monitor the PDCCH in the on-duration period to save battery consumption of the UE.

In addition, when the UE receives the MBS service, the UE periodically may determine the period for PDCCH monitoring by applying the DRX configuration information configured for the MBS service based on the configuration information, and prevents PDCCH monitoring from always being performed, thereby reducing power consumption. As another method for reducing power consumption, allocating an RNTI (e.g., C-RNTI) for a data service in the RRC connected mode, allocating one RNTI for the MBS service, and for one RNTI (e.g., MBS-RNTI) for the MBS service, different MBS services are classified by different logical channel identifiers, so that the base station may provide the MBS service to the UE. The UE may reduce power consumption by receiving a service through one RNTI for the one MBS service. When the MBS service is provided to the UE through the RNTI for the RRC connected mode data service (e.g., unicast service or point-to-point service), the UE may reduce power consumption of the UE by not searching, not reading, or releasing the RNTI for the MBS service.

As another method for reducing power consumption, the base station may allocate an RNTI (e.g., C-RNTI) for a data service in the RRC connected mode, and may allocate different RNTIs for different MBS services (e.g., depending on the type of MBS service or multicast service or unicast service). Power consumption of the UE may be reduced by reading (or by searching for or identifying) only the RNTI corresponding to the MBS service received by the UE and not searching for, not reading, or releasing the RNTI corresponding to the MBS service that the UE does not receive (or not receiving MBS service).

When the RRC connection configuration is completed as described above, the UE may configure a plurality of bandwidth parts according to the instruction configured with the RRC message. In addition, in order to save battery, one or a small number of bandwidths among the plurality of configured bandwidth parts may be activated. For example, one bandwidth part to be activated may be indicated. In addition, the base station may instruct the switch to a new bandwidth part from the initial access bandwidth part by instructing activation of the bandwidth part with an RRC message or with MAC control information (MAC CE) or L1 signaling (PHY layer control signal such as DCI of PDCCH).

As another method, it is possible to define new bitmap information in the DCI of the PDCCH and indicate whether to activate, dormant, or deactivate. As another method, the bitmap may indicate whether to activate the normal bandwidth part (e.g., the first activation bandwidth part to activate from dormancy) or the dormant bandwidth part or whether to switch to the dormant bandwidth part or perform bandwidth part switching. Because there may be many other newly accessing users in the initial access bandwidth, it may be more advantageous to allocate a new bandwidth part and separately manage the connected users in terms of scheduling. This is because the initial access bandwidth part is not configured for each UE, but may be shared and used by all UEs. In addition, in order to reduce signaling overhead, a default bandwidth part may be dynamically indicated by the MAC control information, L1 signaling, or system information. In the above method, the base station may receive the MBS service by switching or changing the bandwidth part of a cell (e.g., PCell or SCell) of the UE to the bandwidth part (e.g., the bandwidth part dedicated to MBS) supporting the MBS service.

In the disclosure, when the base station and the network supports the MBS service to the UE, in the system information, the RRC message (e.g., RRCSetup, RRCResume, RRCReconfiguration, RRCRelease, or a newly defined RRC message), or the control message for the MBS channel, the bearer configuration information for the MBS service or the transmission resource information (e.g., time resource, frequency resource, bandwidth, frequency, bandwidth part (or bandwidth part identifier), bandwidth, subcarrier interval, transmission resource period, RNTI identifier for each MBS service, or logical channel identifier for each MBS service) for the MBS service may be configured to the UE. As another method, the bearer configuration information for the MBS service may be reserved or designated as a default configuration. In the above, the bearer for the MBS service may be considered as a multicast bearer or a unicast bearer from the viewpoint of the base station or the UE. As another method, by configuring a separate identifier or indicator in the system information or RRC message (e.g., RRCSetup, RRCResume, RRCReconfiguration, RRCRelease, or a newly defined RRC message) or the control message for the MBS channel, a multicast bearer for the MBS service or a unicast bearer (or broadcast bearer) for the MBS service may be distinguished and configured to the UE.

In the disclosure, the multicast bearer may refer to a bearer serving a multicast service or a broadcast service, and may indicate a broadcast bearer. In the above, the multicast service may indicate a service provided only to UEs registered or permitted in the network, or the broadcast service may indicate a service provided to unspecified number of UEs, unregistered UE, or unauthorized UE. In the disclosure, for convenience of description, a bearer supporting the multicast service or the broadcast service may be referred to as a multicast bearer.

In addition, in the disclosure, the MBS service may indicate a multicast service, a broadcast service, or a unicast service for the MBS service, and may be described as an MBS service or an MBS bearer for convenience of description.

In addition, in the disclosure, the multicast service may indicate an MBS service supported by the point to multicast (PTM) method or may be supported as a multicast bearer, and the unicast service may indicate an MBS service supported by the point to point (PTP) method or may be supported as a unicast bearer.

In addition, in the disclosure, the MBS bearer may indicate a multicast bearer or a unicast bearer.

In the disclosure, the bearer type for the MBS service may be divided into AM MRB (MBS bearer associated with RLC AM mode) or UM MRB (MBS bearer associated with RLC UM mode), the AM MRB may be regarded as an AM DRB, or the UM MRB may be regarded as a UM DRB. As another method, when at least one RLC layer operates in the AM mode, a bearer connected to the RLC layer operating in the AM mode may be regarded as an AM MRB or an AM DRB. With the bearer considered as described above, the UE may perform a corresponding PDCP re-establishment procedure, PDCP reconfiguration procedure, or MBS service switching procedure.

The downlink shared channel (DL-SCH) described in the disclosure may include or indicate a common control channel (CCCH), a dedicated control channel (DCCH), or a dedicated traffic channel (DTCH).

The bearer, multicast bearer, or unicast bearer for the MBS service described in the disclosure may be interpreted as a multicast bearer or unicast bearer.

In the disclosure, bearer may refer to including SRB and DRB, SRB refers to signaling radio bearer, and DRB refers to data radio bearer. The SRB is mainly used to transmit and receive RRC messages of the RRC layer, and DRB is mainly used to transmit and receive user layer data. In addition, UM DRB refers to a DRB using an RLC layer operating in an unacknowledged mode (UM) mode, and AM DRB refers to a DRB using an RLC layer operating in an acknowledged mode (AM) mode.

MBS data for the MBS service described in the disclosure may be interpreted as MBS channel configuration information or MBS control plane data for bearer configuration or service configuration or MBS user plane data supporting the MBS service.

Figure 7:
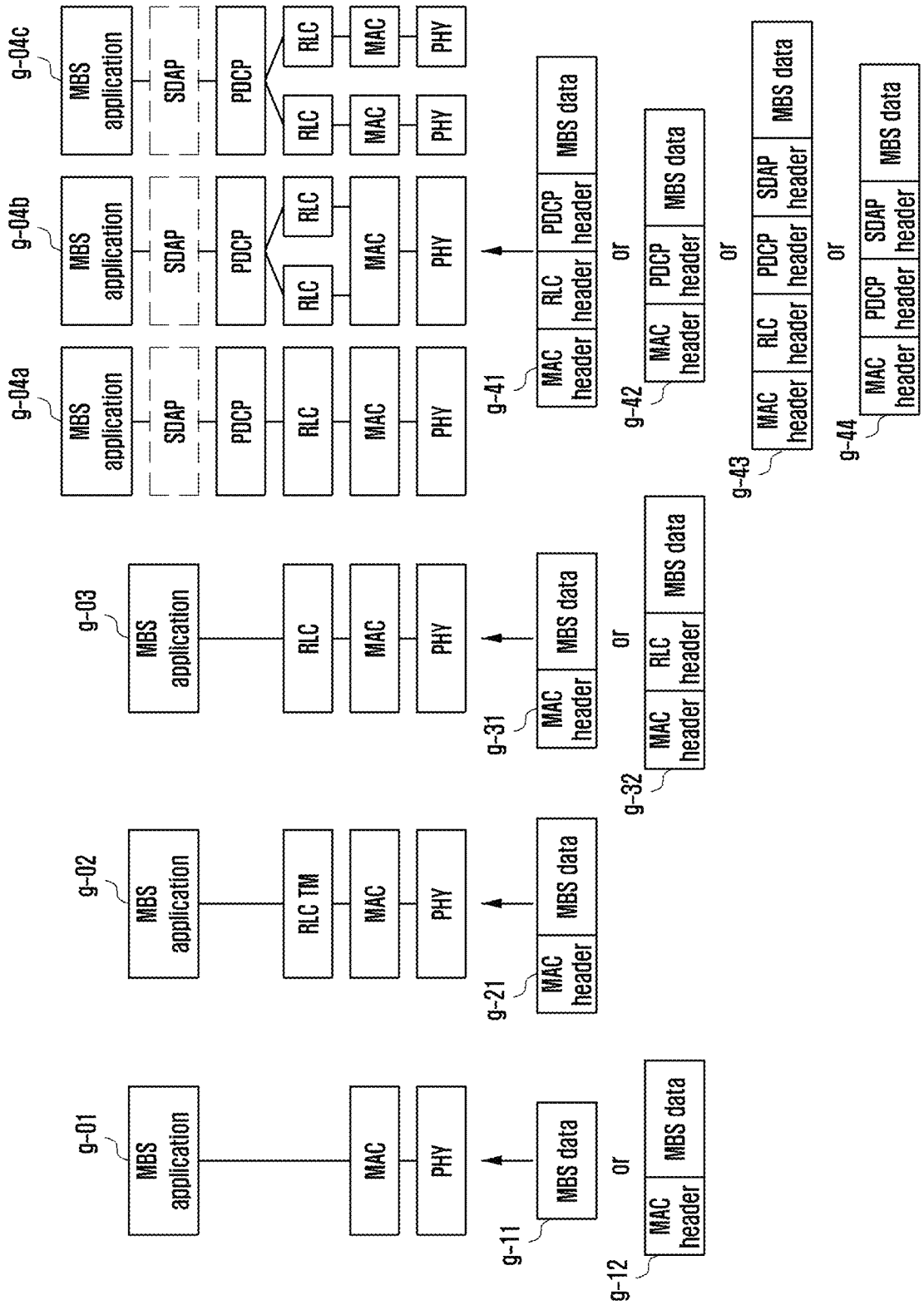
FIG. 7 is a diagram illustrating a structure of a bearer that may be configured for an MBS service to a UE in system information or control information for RRC message (e.g., RRCSetup, RRCResume, RRCReconfiguration, RRCRelease, or a newly defined RRC message) or an MBS channel, or established by the UE to receive the MBS service when a base station or a network supports the MBS service to the UE in RRC connected mode, RRC inactive mode, or RRC idle mode, according to various embodiments of the present disclosure.

The radio network temporary identifier (RNTI) described in the disclosure is the identifier to be used to identify whether the RNTI value set in the UE or an RNTI value corresponding to the PDCCH that the UE intends to receive, and to determine whether the UE is a PDCCH to be read by monitoring the physical downlink control channel (PDCCH) in the PHY layer, and descrambling or checking the cyclic redundancy check (CRC) of the received PDCCH by the UE. FIG. 7 is a diagram illustrating a structure of a bearer that may be configured for an MBS service to a UE in system information or control information for RRC message (e.g., RRCSetup, RRCResume, RRCReconfiguration, RRCRelease, or a newly defined RRC message) or an MBS channel, or established by the UE to receive the MBS service when a base station or a network supports the MBS service to the UE in RRC connected mode, RRC inactive mode, or RRC idle mode according to various embodiments of the present disclosure. In addition, the bearer structures provided in FIG. 7 may be extended and applied or configured even when a general data service is supported.

The structure of a bearer configured for the MBS service in FIG. 7 may have one or a plurality of structures among the following bearer structures. As another method, as for the configuration information of the bearer for the MBS service, one or a plurality of structures among the following bearer structures may be promised or designated as a default configuration. In addition, the following bearer structures may be configured or applied to a IE or a base station.

In one example of first bearer structure g-01, the first bearer structure g-01 illustrated in FIG. 7, and if a unicast bearer or a multicast bearer for MBS service is configured, the UE may configure the bearer structure for directly connecting the MAC layer and the upper MBS application layer as the bearer for the MBS service. In the first bearer structure, transmission of HARQ ACK or NACK, the HARQ retransmission procedure, or the HARQ processing procedure of the MAC layer may not be applied to the first bearer structure. Alternatively, in the first bearer structure, the UE may transfer MBS data (MBS control data or MBS user data) received through the PHY layer or the MAC layer to the upper MBS application layer. In the first bearer structure, MBS data may not include a MAC header. For example, this is because, when a separate physical channel or transport channel for the MBS service is configured and a separate transmission resource (frequency, time resource, or transmission period) is configured, the MAC layer may distinguish MBS data without a MAC header.

For example, with another method, when a separate physical channel or transport channel for the MBS service is configured and a separate transmission resource (frequency, time resource, or transmission period) is configured, this is because, if the first RNTI for MBS data is allocated or determined, MBS data may be distinguished even if there is no MAC header in the PHY layer or the MAC layer. In the above, the RNTI for MBS data may be allocated or designated as a 1-1 RNTI for MBS control data (or MBS control data channel) or a 1-2 RNTI for MBS user data (or MBS user data channel), respectively. In the first bearer structure, the MAC layer may not basically apply HARQ ACK or NACK transmission, the HARQ retransmission procedure, or the HARQ processing procedure to a bearer supporting the MBS service.

Alternatively, in the system information, RRC message (e.g., RRCSetup, RRCResume, RRCReconfiguration, RRCRelease, or a newly defined RRC message), or control message for the MBS channel, configuration information of the SDAP layer may not be configured for the first bearer structure, and the SDAP layer may transfer the data of the first bearer directly to the MBS application layer without processing (e.g., bypass). In another method, in the system information, RRC message (e.g., RRCSetup, RRCResume, RRCReconfiguration, RRCRelease, or a newly defined RRC message), or the control message for the MBS channel, SDAP layer configuration information for the bearer may be configured, and mapping information between QoS flow and bearer may be configured or reconfigured.

In addition, in the SDAP layer configuration information, the presence or absence of an SDAP header for downlink data, or the presence or absence of an SDAP header for uplink data may be configured. In addition, a reconfiguration or switching procedure between a unicast bearer or a multicast bearer may be supported by using the QoS flow and the mapping information of the bearer. In addition, in the SDAP configuration information for the bearer, the QoS flow for the MBS service may be mapped to the bearer to support MBS services. MBS data that may be received or transmitted in the first bearer structure may have a structure of g-11 or g-12. For example, MBS data that may be received or transmitted in the first bearer structure according to system information, configuration information of an RRC message (e.g., RRCSetup, RRCResume, RRCReconfiguration, RRCRelease, or a newly defined RRC message), or a control message for an MBS channel may have a structure of g-11 or g-12. As described above, the overhead due to the header may be reduced.

In one example of second bearer structure g-02, the second bearer structure g-02 illustrated in FIG. 7, and if a unicast bearer or a multicast bearer for MBS service is configured, the UE may configure an RLC layer corresponding to a logical channel identifier (or MBS service) of an MBS control data channel, MBS user data channel, or MBS user data channel connected to the MAC layer. In addition, a bearer structure for directly connecting the RLC layer to an upper MBS application layer may be configured as a bearer for the MBS service. In the second bearer structure, transmission of HARQ ACK or NACK, the HARQ retransmission procedure, or the HARQ processing procedure of the MAC layer may not be applied to the second bearer structure. Alternatively, in the second bearer structure, the UE may transfer MBS data (MBS control data or MBS user data) received through the PHY layer or the MAC layer to the upper MBS application layer through the RLC layer. In the second bearer structure, MBS data may not include a MAC header.

For example, this is because, when a separate physical channel or transport channel for the MBS service is configured and a separate transmission resource (frequency, time resource, or transmission period) is configured, the MAC layer may distinguish MBS data without a MAC header. For example, with another method, when a separate physical channel or transport channel for the MBS service is configured and a separate transmission resource (frequency, time resource, or transmission period) is configured, this is because, if the first RNTI for MBS data is allocated or determined, MBS data may be distinguished even if there is no MAC header in the PHY layer or the MAC layer. In the above, the RNTI for MBS data may allocated or designate a 1-1 RNTI for MBS control data (or MBS control data channel) or a 1-2 RNTI for MBS user data (or MBS user data channel), respectively.

As another method, in a case where a separate physical channel or transport channel for the MBS service is configured in the second bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer after demultiplexing.

As another method, in a case where the separate physical channel or transport channel for the MBS service is configured in the second bearer structure, the MBS service is supported in a downlink shared channel (DL-SCH) used for a general data service, or a separate transmission resource (frequency, time resource, or transmission period) is configured, MBS data may be received from the transmission resource. If the first RNTI for MBS data is allocated or determined, MBS data may be received from the transmission resource to the RNTI according to the PDCCH indication. The MBS data may include a MAC header and distinguish MBS control data (or MBS control data channel), MBS user data (or by MBS user data channel, logical channel identifier, or MBS service), or MBS service based on the logical channel identifier included in the MAC header, or deliver the divided and de-multiplexed MBS control data MBS user data, or MBS service to each RLC layer.

For example, different logical channel identifiers may be configured or defined for each MBS control data channel, MBS user data channel, or MBS service as the logical channel, and the MBS service may be supported. The RLC layer configured in the second bearer structure may be configured to transparent mode (TM), and may be characterized in that the RLC header is not included in the MBS data. Alternatively, the RLC serial number length may not be set in the RLC layer. Alternatively, the RLC layer may not apply a data processing procedure to the MBS data. In addition, the RLC layer configured in the second bearer structure may not apply a data partitioning procedure or a data reassembly procedure for MBS data in TM mode. Alternatively, the RLC layer configured in the second bearer structure may set the RLC reception window size to 0 or may not operate the RLC reception window. In the second bearer structure, the MAC layer may not basically apply HARQ ACK or NACK transmission, the HARQ retransmission procedure, or the HARQ processing procedure to a bearer supporting the MBS service.

Alternatively, in the system information, RRC message (e.g., RRCSetup, RRCResume, RRCReconfiguration, RRCRelease, or a newly defined RRC message), or control message for the MBS channel, configuration information of the SDAP layer may not be configured for the second bearer structure, and the SDAP layer may transfer the data of the second bearer directly to the MBS application layer without processing (e.g., bypass). In another method, in the system information, RRC message (e.g., RRCSetup, RRCResume, RRCReconfiguration, RRCRelease, or a newly defined RRC message), or the control message for the MBS channel, SDAP layer configuration information for the bearer may be configured, and mapping information between QoS flow and bearer may be configured or reconfigured.

In addition, in the SDAP layer configuration information, the presence or absence of an SDAP header for downlink data, or the presence or absence of an SDAP header for uplink data may be configured. In addition, a reconfiguration or switching procedure between a unicast bearer or a multicast bearer may be supported by using the QoS flow and the mapping information of the bearer. In addition, in the SDAP configuration information for the bearer, the QoS flow for the MBS service may be mapped to the bearer to support MBS services. MBS data that may be received or transmitted in the second bearer structure may have a structure of g-21. As described above, the overhead due to the header may be reduced. For example, MBS data that may be received or transmitted in the second bearer structure according to system information, configuration information of an RRC message (e.g., RRCSetup, RRCResume, RRCReconfiguration, RRCRelease, or a newly defined RRC message), or a control message for an MBS channel may have a structure of g-21.

In one example of third bearer structure g-03, the third bearer structure g-03 illustrated in FIG. 7, and if a unicast bearer or a multicast bearer for MBS service is configured, the UE may configure an RLC layer corresponding to a logical channel identifier (or MBS service) of an MBS control data channel, MBS user data channel, or MBS user data channel connected to the MAC layer. In addition, a bearer structure for directly connecting the RLC layer to an upper MBS application layer may be configured as a bearer for the MBS service. In the third bearer structure, transmission of HARQ ACK or NACK, the HARQ retransmission procedure, or the HARQ processing procedure of the MAC layer may not be applied to the third bearer structure. In another method, in the system information, RRC message (e.g., RRCSetup, RRCResume, RRCReconfiguration, RRCRelease, or a newly defined RRC message), or the control message for the MBS channel, whether or not to perform HARQ ACK or NACK transmission, the HARQ retransmission procedure, or the HARQ processing procedure of the MAC layer may be configured by an indicator.

For example, in the system information, RRC message (e.g., RRCSetup, RRCResume, RRCReconfiguration, RRCRelease, or a newly defined RRC message), or the control message for the MBS channel, when the indicator is configured (either the indicator value indicates to a specific value, or the indicator field does not exist) to perform HARQ ACK or NACK transmission, the HARQ retransmission procedure, or the HARQ processing procedure, HARQ ACK or NACK transmission, the HARQ retransmission procedure, or the HARQ processing procedure of the device may be performed. Alternatively, in the above, when the indicator is configured (either the indicator value indicates to a specific value, or the indicator field does not exist) not to perform HARQ ACK or NACK transmission, the HARQ retransmission procedure, or the HARQ processing procedure, HARQ ACK or NACK transmission, the HARQ retransmission procedure, or the HARQ processing procedure of the device may not be performed. Alternatively, transmission of HARQ ACK or NACK, the HARQ retransmission procedure, or the HARQ processing procedure in the MAC layer may not be basically applied to a bearer supporting the MBS service.

Alternatively, the indicator may be configured for an MBS control data channel, an MBS user data channel, a logical channel identifier (or MBS service), or a bearer identifier of the MBS user data channel, respectively. As another method, when HARQ ACK or NACK transmission, the HARQ retransmission procedure, or the HARQ processing procedure of the MAC layer is performed or configured, or when it is configured for a specific logical channel identifier, MBS service, or bearer, in the system information, RRC message (e.g., RRCSetup, RRCResume, RRCReconfiguration, RRCRelease, or a newly defined RRC message), or the control message for the MBS channel, it may be configured to perform HARQ reordering or RLC reordering (or in-order delivery) by the indicator (either the indicator value indicates to a specific value, or the indicator field does not exist) for the MBS control data channel, the MBS user data channel, the logical channel identifier (or MBS service) of the MBS user data channel, or RLC layer configured for the bearer identifier.

Alternatively, the RLC reception window size may be set to a value (e.g., 2^(RLC serial number length−1)) greater than 0 for operation. Because when performing HARQ process or retransmission on MBS data, the order of data may be mixed, and so MBS data must be rearranged based on the RLC reception window or the RLC serial number, or a reordering timer must be driven to support the MBS service in order. As another method, when the HARQ ACK or NACK transmission, the HARQ retransmission procedure, or the HARQ processing procedure of the MAC layer is not performed or is configured not to be performed, in the system information, RRC message (e.g., RRCSetup, RRCResume, RRCReconfiguration, RRCRelease, or a newly defined RRC message), or the control message for the MBS channel, it may be configured not to perform HARQ reordering or RLC reordering (or in-order delivery) by the indicator (either the indicator value indicates to a specific value, or the indicator field does not exist) for the MBS control data channel, the MBS user data channel, the logical channel identifier (or MBS service) of the MBS user data channel, or RLC layer configured for the bearer identifier.

Alternatively, even in the RLC layer configured in the bearer supporting the MBS service, HARQ reordering or RLC reordering (or in-order delivery) may not be performed by default by not applying transmission of HARQ ACK or NACK, the HARQ retransmission procedure, or the HARQ processing procedure to the bearer supporting the MBS service by default in the MAC layer. Alternatively, the reception RLC window may not be operated by setting the RLC reception window size to 0. For example, in the absence of the configuration information or basically, the UE may transmit data always received from the RLC layer to the upper layer by an out-of-order delivery method regardless of the order. Alternatively, in the third bearer structure, the UE may transmit MBS data (MBS control data or MBS user data) received through the PHY layer or the MAC layer to the upper MBS application layer through the RLC layer. In the third bearer structure, MBS data may include a MAC header.

Alternatively, the logical channel identifier included in the MAC header may be configured or defined to indicate an MBS control data channel, an MBS user data channel, or each MBS service. For example, when a separate physical channel or transport channel for the MBS service is configured, and a separate transmission resource (frequency or time resource or transmission period) is configured, if the first RNTI for MBS data is allocated or determined, it may be possible to distinguish whether MBS data is MBS control data, MBS user data, or data for which MBS service based on the RNTI or logical channel identifier, or it may be divided and demultiplexed to each RLC layer and delivered in the PHY layer or the MAC layer. In the above, the RNTI for MBS data may allocated or designate a 1-1 RNTI for MBS control data (or MBS control data channel) or a 1-2 RNTI for MBS user data (or MBS user data channel), respectively.

As another method, in a case where the separate physical channel or transport channel for the MBS service is configured in the third bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer after demultiplexing.

As another method, in a case where the separate physical channel or transport channel for the MBS service is configured in the third bearer structure, the MBS service is supported in a downlink shared channel (DL-SCH) used for a general data service, or a separate transmission resource (frequency, time resource, or transmission period) is configured, MBS data may be received from the transmission resource. If the first RNTI for MBS data is allocated or determined, MBS data may be received from the transmission resource to the RNTI according to the PDCCH indication. The MBS data may include a MAC header and distinguish MBS control data (or MBS control data channel), MBS user data (or by MBS user data channel, logical channel identifier, or MBS service), or MBS service based on the logical channel identifier included in the MAC header, or deliver the divided and de-multiplexed MBS control data to each RLC layer. For example, different logical channel identifiers may be configured or defined for each MBS control data channel, MBS user data channel, or MBS service as the logical channel, and the MBS service may be supported. The RLC layer configured in the third bearer structure may be configured as the transparent mode (TM), UM (unacknowledged mode), uni-directional mode of the UM mode, the bi-directional mode of the UM mode, or the acknowledged mode (AM) mode. In the RLC TM mode, the RLC header may not be included in the MBS data, and the RLC header may be included in the RLC UM mode or the AM mode.

In addition, in the RLC TM mode, the RLC layer may not apply the data processing procedure to the MBS data (for example, data partitioning procedure or reassembly procedure may not be applied), and in the RLC UM mode or the AM mode, the RLC layer may apply the data processing procedure to the MBS data. Alternatively, in the system information, RRC message (e.g., RRCSetup, RRCResume, RRCReconfiguration, RRCRelease, or a newly defined RRC message), or control message for the MBS channel, configuration information of the SDAP layer may not be configured for the third bearer structure, and the SDAP layer may transfer the data of the third bearer directly to the MBS application layer without processing (e.g., bypass).

In another method, in the system information, RRC message (e.g., RRCSetup, RRCResume, RRCReconfiguration, RRCRelease, or a newly defined RRC message), or the control message for the MBS channel, SDAP layer configuration information for the bearer may be configured, and mapping information between QoS flow and bearer may be configured or reconfigured. In addition, in the SDAP layer configuration information, the presence or absence of an SDAP header for downlink data, or the presence or absence of an SDAP header for uplink data may be configured. In addition, a reconfiguration or switching procedure between a unicast bearer or a multicast bearer may be supported by using the QoS flow and the mapping information of the bearer.

In addition, in the SDAP configuration information for the bearer, the QoS flow for the MBS service may be mapped to the bearer to support MBS services. MBS data that may be received or transmitted in the third bearer structure may have a structure of g-31 or g-32. As described above, the overhead due to the header may be reduced. For example, MBS data that may be received or transmitted in the third bearer structure according to system information, configuration information of an RRC message (e.g., RRCSetup, RRCResume, RRCReconfiguration, RRCRelease, or a newly defined RRC message), or a control message for an MBS channel may have a structure of g-31 or g-32. In the above, when it is configured to perform the transmission of HARQ ACK or NACK of the MAC layer, the HARQ retransmission procedure, or the HARQ processing procedure in the system information, RRC message (e.g., RRCSetup, RRCResume, RRCReconfiguration, RRCRelease, or a newly defined RRC message), or the control message for the MBS channel, or when it is configured as an indicator, transmission resource (e.g., time or frequency resource, transport channel, frequency interval, etc.) information for transmitting HARQ ACK or NACK may be transmitted together. When the RRC connected mode, RRC inactive mode, or RRC idle mode UE is configured to perform HARQ ACK or NACK transmission, the HARQ retransmission procedure, or the HARQ processing procedure in the above, HARQ ACK or NACK may be transmitted using the transmission resource (e.g., physical transmission resources) configured above after receiving downlink MBS data. In the above, if the base station detects even one NACK in the transmission resource, or detects that at least one UE has transmitted a NACK, the base station may retransmit the MBS data.

Alternatively, retransmission may be performed so that all UEs may receive the MBS data through the MBS channel. As another method, RRC connected mode, RRC inactive mode, or RRC idle mode UE may define MAC control information (or RLC control information, PDCP control information, or RRC message) after receiving the downlink MBS data, and transmit the MAC control information (or RLC control information, PDCP control information, or RRC message) including the UE identifier, the MBS service identifier, the logical channel identifier, the RNTI identifier, or the bearer identifier so that the base station may indicate which UE did not successfully receive the data (for example, the MAC control information (or RLC control information, PDCP control information, or RRC message) may be transmitted in the transmission resource configured above). In the above, the base station may retransmit the MBS data only to the RRC connected mode, RRC idle mode, or RRC inactive mode UE indicating that the NACK has been transmitted or failed to be successfully received in the transmission resource. As another method, in the above, if the base station detects even one NACK in the transmission resource, or detects that at least one UE has transmitted a NACK, the base station may retransmit the MBS data. Alternatively, retransmission may be performed so that all UEs may receive the MBS data through the MBS channel.

In one example of fourth bearer structure g-04*a*, g-04*b*, or g-04*c*, the fourth bearer structure g-04 illustrated in FIG. 7, and if a unicast bearer or a multicast bearer for MBS service is configured, the UE may configure an RLC layer corresponding to a logical channel identifier (or MBS service) of an MBS control data channel, MBS user data channel, or MBS user data channel connected to the MAC layer. In the above, each RLC layer may be configured for each MBS service or for each MBS service type (e.g., multicast service (PTM, Point to Multicast MBS service) or unicast service (Point to Point MBS service)), and may be configured as g-04*a*, g-04*b*, or g-04*c* to be connected to one base station (or one MAC layer) or a plurality of base stations (or multiple MAC layers) to receive a service.

In addition, in the configuration information, each RLC layer or a PDCP layer connected to a plurality of RLC layers may be configured, and a bearer structure for directly connecting the PDCP layer to an upper MBS application layer may be configured as a bearer for the MBS service. In the fourth bearer structure such as g-04b, the base station may facilitate switching (PTM to PTP switching or PTP to PTM switching) or change between the multicast service method and the unicast method by configuring the first RLC layer for the multicast service and the second RLC layer for the unicast service in one PDCP layer, and in the fourth bearer structure as described above, the base station may transmit MBS service data to the first RLC layer or the second RLC layer. In the above, an indicator (e.g., an indicator indicating PTP or PTM, an MBS service identifier, an indicator indicating a primary RLC device, a cell group identifier, a logical channel identifier, etc.) may be configured in the RRC message of the disclosure to distinguish the first RLC layer (e.g., RLC layer, primary RLC layer, or secondary RLC layer for multicast service) or the second RLC layer (e.g., RLC layer, primary RLC layer, or secondary RLC layer for unicast service), or the first RLC layer or the second RLC layer may be distinguished by configuring the primary RLC layer or the secondary RLC layer, respectively.

In addition, in the fourth bearer structure such as g-04c, the base station may facilitate switching (PTM to PTP switching or PTP to PTM switching) or change between the multicast service method and the unicast method by configuring the first RLC layer for the multicast service and the second RLC layer for the unicast service in one PDCP layer, and in the fourth bearer structure as described above, the base station may transmit MBS service data to the first RLC layer or the second RLC layer, and in the above, by connecting the first RLC layer or the second RLC layer with the MAC or PHY layer corresponding to different base stations like dual access technology, it may be configured so that the UE receives MBS service data from different base stations (first base station or second base station).

In the above, an indicator (e.g., an indicator indicating PTP or PTM, an MBS service identifier, an indicator indicating a primary RLC device, a cell group identifier, a logical channel identifier, etc.) may be configured in the RRC message of the disclosure to distinguish the first RLC layer (e.g., RLC layer, primary RLC layer, or secondary RLC layer for multicast service) or the second RLC layer (e.g., RLC layer, primary RLC layer, or secondary RLC layer for unicast service), or the first RLC layer or the second RLC layer may be distinguished by configuring the primary RLC layer or the secondary RLC layer, respectively. The fourth bearer structure such as g-04a, g-04b, or g-04c may support the MBS service by configuring a plurality of RLC devices in one PDCP layer for each MBS service or each MBS service type (e.g., multicast service (PTM, Point to multicast MBS service) or unicast service (point to point MBS service)).

In addition, RLC layers configured in the fourth bearer structure may be configured as UM mode, AM mode, or TM mode. For example, an RLC layer supporting a multicast service (PTM) may be configured as a UM mode, or an RLC layer supporting a unicast service (PTP) may be configured as a UM mode or an AM mode. In the above fourth bearer structure, transmission of HARQ ACK or NACK, the HARQ retransmission procedure, or the HARQ processing procedure of the MAC layer may not be applied to the fourth bearer. As another method, in the system information, RRC message (e.g., RRCSetup, RRCResume, RRCReconfiguration, RRCRelease, or a newly defined RRC message), or the control message for the MBS channel, whether or not to perform HARQ ACK or NACK transmission, the HARQ retransmission procedure, or the HARQ processing procedure of the MAC layer may be configured by an indicator.

For example, in the system information, RRC message (e.g., RRCSetup, RRCResume, RRCReconfiguration, RRCRelease, or a newly defined RRC message), or the control message for the MBS channel, when the indicator is configured (either the indicator value indicates to a specific value, or the indicator field does not exist) to perform HARQ ACK or NACK transmission, the HARQ retransmission procedure, or the HARQ processing procedure, HARQ ACK or NACK transmission, the HARQ retransmission procedure, or the HARQ processing procedure of the device may be performed. Alternatively, in the above, when the indicator is configured (either the indicator value indicates to a specific value, or the indicator field does not exist) not to perform HARQ ACK or NACK transmission, the HARQ retransmission procedure, or the HARQ processing procedure, HARQ ACK or NACK transmission, the HARQ retransmission procedure, or the HARQ processing procedure of the device may not be performed.

Alternatively, transmission of HARQ ACK or NACK, the HARQ retransmission procedure, or the HARQ processing procedure in the MAC layer may not be basically applied to a bearer supporting the MBS service. Alternatively, the indicator may be configured for an MBS control data channel, an MBS user data channel, a logical channel identifier (or MBS service), or a bearer identifier of the MBS user data channel, respectively. As another method, when HARQ ACK or NACK transmission, the HARQ retransmission procedure, or the HARQ processing procedure of the MAC layer is performed or configured, or when it is configured for a specific logical channel identifier, MBS service, or bearer, in the system information, RRC message (e.g., RRCSetup, RRCResume, RRCReconfiguration, RRCRelease, or a newly defined RRC message), or the control message for the MBS channel, it may be configured to perform HARQ reordering or RLC reordering (or in-order delivery) by the indicator (either the indicator value indicates to a specific value, or the indicator field does not exist) for the MBS control data channel, the MBS user data channel, the logical channel identifier (or MBS service) of the MBS user data channel, or RLC layer configured for the bearer identifier.

Alternatively, the RLC reception window size may be set to a value (e.g., $2^{(RLC\ serial\ number\ length-1)}$) greater than 0 for operation. Because when performing HARQ process or retransmission on MBS data, the order of data may be mixed, and so MBS data must be rearranged based on the RLC reception window or the RLC serial number, or a reordering timer must be driven to support the MBS service in order. As another method, when the HARQ ACK or NACK transmission, the HARQ retransmission procedure, or the HARQ processing procedure of the MAC layer is not performed or is configured not to be performed, in the system information, RRC message (e.g., RRCSetup, RRCResume, RRCReconfiguration, RRCRelease, or a newly defined RRC message), or the control message for the MBS channel, it may be configured not to perform HARQ reordering or RLC reordering (or in-order delivery) by the indicator (either the indicator value indicates to a specific value, or the indicator field does not exist) for the MBS control data channel, the MBS user data channel, the logical channel identifier (or MBS service) of the MBS user data channel, or RLC layer configured for the bearer identifier.

Alternatively, even in the RLC layer configured in the bearer supporting the MBS service, HARQ reordering or RLC reordering (or in-order delivery) may not be performed by default by not applying transmission of HARQ ACK or NACK, the HARQ retransmission procedure, or the HARQ processing procedure to the bearer supporting the MBS service by default in the MAC layer. Alternatively, when the MAC layer does not perform transmission of HARQ ACK or NACK, the HARQ retransmission procedure, or the HARQ processing procedure in the above or is configured not to perform, the reception RLC window may not be operated by setting the RLC reception window size of the RLC layer of the MBS bearer to 0. For example, in the absence of the configuration information or basically, the UE may transmit data always received from the RLC layer to the upper layer by an out-of-order delivery method regardless of the order.

Alternatively, in the fourth bearer structure, the UE may transmit MBS data (MBS control data or MBS user data) received through the PHY layer or the MAC layer to the upper MBS application layer through the RLC layer or the PDCP layer. In the fourth bearer structure, MBS data may include a MAC header. Alternatively, the logical channel identifier included in the MAC header may be configured or defined to indicate an MBS control data channel, an MBS user data channel, or each MBS service. For example, when a separate physical channel or transport channel for the MBS service is configured, and a separate transmission resource (frequency or time resource or transmission period) is configured, if the first RNTI for MBS data is allocated or determined, it may be possible to distinguish whether MBS data is MBS control data, MBS user data, or data for which MBS service based on the RNTI or logical channel identifier, or it may be divided and demultiplexed to each RLC layer and delivered in the PHY layer or the MAC layer. In the above, the RNTI for MBS data may allocated or designate a 1-1 RNTI for MBS control data (or MB S control data channel) or a 1-2 RNTI for MBS user data (or MBS user data channel or logical channel identifier or by MBS service), respectively.

As another method, in a case where the separate physical channel or transport channel for the MBS service is configured in the fourth bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer after demultiplexing.

As another method, in a case where the separate physical channel or transport channel for the MBS service is configured in the fourth bearer structure, the MBS service is supported in a downlink shared channel (DL-SCH) used for a general data service, or a separate transmission resource (frequency, time resource, or transmission period) is configured, MBS data may be received from the transmission resource, and if the first RNTI for MBS data is allocated or determined, MBS data may be received from the transmission resource to the RNTI according to the PDCCH indication, and the MBS data may include a MAC header and distinguish MBS control data (or MBS control data channel), MBS user data (or by MBS user data channel, logical channel identifier, or MBS service), or MBS service based on the logical channel identifier included in the MAC header, or deliver the divided and de-multiplexed MBS control data to each RLC layer.

For example, different logical channel identifiers may be configured or defined for each MBS control data channel, MBS user data channel, or MBS service as the logical channel, and the MBS service may be supported. The RLC layer configured in the fourth bearer structure may be configured as the transparent mode (TM), UM (unacknowledged mode), uni-directional mode of the UM mode, the bi-directional mode of the UM mode, or the acknowledged mode (AM) mode. In the RLC TM mode, the RLC header may not be included in the MBS data, and the RLC header may be included in the RLC UM mode or the AM mode. In addition, in the RLC TM mode, the RLC layer may not apply the data processing procedure to the MBS data (for example, data partitioning procedure or reassembly procedure may not be applied), and in the RLC UM mode or the AM mode, the RLC layer may apply the data processing procedure to the MBS data. The overhead of MBS data may be reduced by configuring the RLC layer as the TM mode (for example, the overhead may be reduced by not using the RLC header) in the system information or the RRC message (e.g., RRCSetup, RRCResume, RRCReconfiguration, RRCRelease, or a newly defined RRC message) or the control message for the MBS channel for the fourth bearer structure.

Alternatively, in the system information or the RRC message (e.g., RRCSetup, RRCResume, RRCReconfiguration, RRCRelease, or a newly defined RRC message) or the control message for the MBS channel for the fourth bearer structure, it is possible to prevent transmission delay of MBS data by configuring an out-of-order delivery function in the PDCP layer. As another method, in the fourth bearer structure for the MBS bearer, if HARQ retransmission or HARQ ACK/NACK indication procedure or HARQ processing procedure is not performed or configured not to be performed, or RLC UM mode (or RLC TM mode) is configured, it may be possible to prevent MBS data transmission delay by allowing the PDCP layer to perform out-of-order delivery function by default (e.g., always set the out-of-order delivering indicator to True), or by setting the PDCP reordering timer value (t-reordering) to 0 and by not performing the realignment procedure (without triggering the reordering timer or by setting the reordering timer value to 0, the received data is transferred to the upper layer immediately after data processing (e.g., PDCP header removal, decryption procedure, integrity verification procedure, or header decompression procedure) of the receiving PDCP layer without waiting for the data of the PDCP serial number (or COUNT value) corresponding to the gap) even if there is a gap in the PDCP serial number (or COUNT value).

If the HARQ retransmission or HARQ processing procedure is not performed for MBS data, and the RLC retransmission procedure is not performed, in case of data loss, transmission delay may be caused because the reordering function in the PDCP layer triggers a reordering timer due to a gap in the PDCP serial number (or COUNT value), and waits for data corresponding to the gap as long as the reordering timer value. As another method, if HARQ retransmission, HARQ ACK/NACK indication procedure, or HARQ processing procedure is performed or is configured to be performed, the PDCP layer may basically perform a PDCP reordering function, determine the PDCP reception window size (e.g., PDCP serial number length 16 bits, window size 2^(16−1)) based on the PDCP serial number length, and drive a reordering timer.

Alternatively, in the fourth bearer structure, SDAP layer configuration information may be configured in system information, an RRC message (e.g., RRCSetup, RRCResume, RRCReconfiguration, RRCRelease, or a newly defined RRC message), or a control message for an MBS channel, and QoS flow and bearer mapping information may be configured or reconfigured. In addition, in the SDAP layer configuration information, the presence or absence of an SDAP header for downlink data, or the presence or absence of an SDAP header for uplink data may be configured. In addition, it may be possible to support a reconfiguration or switching procedure between a unicast bearer or a multicast bearer configured in the fourth bearer structure g-04b or g-04c using the QoS flow and the mapping information of the bearer, or a reconfiguration or switching procedure between a unicast bearer having a fourth bearer structure g-04a or a multicast bearer having a fourth bearer structure g-04a may be supported.

Alternatively, if the configuration information of the SDAP layer is not configured for the third bearer structure in the system information, the RRC message (e.g., RRCSetup, RRCResume, RRCReconfiguration, RRCRelease, or a newly defined RRC message), or the control message for the MBS channel, the SDAP layer may transfer the data of the fourth bearer directly to the MBS application layer without processing (e.g., bypass) the data. In addition, in the SDAP configuration information for the bearer, the QoS flow for the MBS service may be mapped to the bearer to support MBS services. MBS data that may be received or transmitted in the above fourth bearer structure may have a structure of g-41, g-42, g-43, or g-44. For example, MBS data that may be received or transmitted in the above fourth bearer structure may have a structure of g-41, g-42, g-43, or g-44 according to the configuration information of the system information, the RRC message (e.g., RRCSetup, RRCResume, RRCReconfiguration, RRCRelease, or a newly defined RRC message), or the control message for the MBS channel.

As described above, the overhead due to the header may be reduced. In the above, when it is configured to perform the transmission of HARQ ACK or NACK of the MAC layer, the HARQ retransmission procedure, or the HARQ processing procedure in the system information, RRC message (e.g., RRCSetup, RRCResume, RRCReconfiguration, RRCRelease, or a newly defined RRC message), or the control message for the MBS channel, or when it is configured as an indicator, transmission resource (e.g., time or frequency resource, transport channel, frequency interval, etc.) information for transmitting HARQ ACK or NACK may be transmitted together. When the RRC connected mode, RRC inactive mode, or RRC idle mode UE is configured to perform HARQ ACK or NACK transmission, the HARQ retransmission procedure, or the HARQ processing procedure in the above, HARQ ACK or NACK may be transmitted using the transmission resource (e.g., physical transmission resources) configured above after receiving downlink MBS data.

In the above, if the base station detects even one NACK in the transmission resource, or detects that at least one UE has transmitted a NACK, the base station may retransmit the MBS data. Alternatively, retransmission may be performed so that all UEs may receive the MBS data through the MBS channel. As another method, RRC connected mode, RRC inactive mode, or RRC idle mode UE may define MAC control information (or RLC control information, PDCP control information, or RRC message) after receiving the downlink MBS data, and transmit the MAC control information (or RLC control information, PDCP control information, or RRC message) including the UE identifier, the MBS service identifier, the logical channel identifier, the RNTI identifier, or the bearer identifier so that the base station may indicate which UE did not successfully receive the data (for example, the MAC control information (or RLC control information, PDCP control information, or RRC message) may be transmitted in the transmission resource configured above).

In the above, the base station may retransmit the MBS data only to the RRC connected mode, RRC idle mode, or RRC inactive mode UE indicating that the NACK has been transmitted or failed to be successfully received in the transmission resource. As another method, in the above, if the base station detects even one NACK in the transmission resource, or detects that at least one UE has transmitted a NACK, the base station may retransmit the MBS data. Alternatively, retransmission may be performed so that all UEs may receive the MBS data through the MBS channel. In addition, in the above, the bearer structure of g-04c allows the UE to receive the MBS service through the MAC layer or RLC layer for master cell group and the MAC layer or the RLC layer for the secondary cell group when the dual connectivity access technology is configured or supported.

In addition, in the above, for the UE in which the g-04c bearer structure or the MBS bearer provided in the disclosure is configured, when the base station configures (or indicates) the handover procedure with an RRC message, in the RRC message, it may be possible to reduce the complexity of UE implementation by limiting that DAPS (dual active protocol stack) configuration information (e.g., daps-config) may not be configured for the g-04c bearer structure or the MBS bearer provided in the disclosure. For example, the DAPS (dual active protocol stack) configuration information (e.g., daps-config) may not be applied or may not be configured for the bearer structure of g-04c or the MBS bearer (or bearer for multicast service or MBS bearer supported by RRC idle mode or RRC disabled mode) provided in the disclosure. As another method, in the RRC message, DAPS (dual active protocol stack) configuration information (e.g., daps-config) may be configured for the MBS bearer (e.g., MBS bearer for unicast service or MBS bearer for RRC connected mode) provided in the disclosure, thereby reducing the data service interruption time in the handover procedure.

When the UE receives the system information in the above, when the UE tries to receive the service of interest or has the service of interest or decides the service of interest, when the UE is in or enters a cell or area supporting the MBS service in system information, when the UE configures or connects the MBS service (or session), when the UE receives configuration information or bearer configuration information for MBS service in system information, RRC message (e.g., RRCSetup, RRCResume, RRCReconfiguration, RRCRelease, or a newly defined RRC message), or control message (e.g., transmitted from the MBS control data channel) for MBS channel, or when broadcast, the UE may configure a unicast bearer, a multicast bearer, or an MBS bearer for receiving the MBS service having the above-provided bearer structure.

If the base station configures the fourth bearer structure g-04a, g-04b, or g-04c provided in the disclosure to the UE, the first RLC layer for the multicast service and the second RLC layer for the unicast service are configured in one PDCP layer, and the base station may support a service with low transmission delay and no or little data loss because it is possible to dynamically switch to a multicast method or a unicast method considering the transmission resource or scheduling resource of the base station or the mobility of the UE, and to support the MBS service to the UE.

MBS service data received by the first RLC layer for multicast service in the fourth bearer structure g-04a, g-04b, or g-04c provided in the disclosure are data (e.g., data having a logical channel identifier corresponding to the multicast service, data received from a transmission resource allocated for the multicast service, or data received according to the DCI indication of the PDCCH scrambled by the RNTI identifier for the multicast service) received from a transmission resource for supporting multicast service for a plurality of UEs, and multiple UEs may receive the data (e.g., common MBS data) from the same transmission resource, and may receive and process the data with a first RLC layer for a multicast service configured in each UE.

In addition, MBS service data received by the second RLC layer for unicast service in the fourth bearer structure g-04a, g-04b, or g-04c provided in the disclosure are data (e.g., data having a logical channel identifier corresponding to the unicast service, data received from a transmission resource allocated for the unicast service, or data received according to the DCI indication of the PDCCH scrambled by the RNTI identifier for the unicast service) received from a transmission resource for supporting unicast service of each UE, and the one UE (one UE corresponding to the unicast service or receiving (or configured to receive) the unicast service) may receive the data from the transmission resource, and may receive and process the data with a second RLC layer for a unicast service configured in the UE. For example, for the unicast service, each UE may receive unicast data for each UE in different transmission resources (transmission resources for each UE) rather than the same transmission resource.

Accordingly, different UEs may receive data (for example, data having a logical channel identifier corresponding to the unicast service of the UE, data received from a transmission resource allocated for the unicast service of the UE, or data received according to the DCI indication of the PDCCH scrambled by the RNTI identifier for the unicast service of the UE) for each UE in each transmission resource allocated to receive different unicast services, respectively, and process the data in the second RLC layer for the unicast service configured in each UE.

Accordingly, when the base station supports the MBS service by configuring the fourth bearer structure g-04a, g-04b, or g-04c provided in the disclosure to a plurality of UEs, the base station may transmit the same MBS service data to a plurality of UEs through one transmission resource in the multicast method (each UE may receive the MBS service data from the RLC layer for the multicast service (or the RLC layer configured with a logical channel identifier corresponding to the multicast service)), or the base station may transmit MBS service data to each UE in different transmission resources in the unicast method (each UE may receive the MBS service data from the RLC layer for the unicast service (or the RLC layer configured with the logical channel identifier corresponding to the unicast service)). Accordingly, when the MBS service is provided to a plurality of UEs in the multicast method, transmission resources may be saved and transmission resources may be efficiently used. On the other hand, if the MBS service is provided to each UE in the unicast method, it is possible to support the MBS service that satisfies the QoS or requirements requested by each UE.

For example, the fourth bearer structure g-04a, g-04b, or g-04c provided in the disclosure is configured to a plurality of UEs, and the base station may transmit a common control message or a request message (for example, whether the MBS service is received or preferred, or whether it is currently being received, or whether the MBS service type is switched (e.g., PTM to PTP or PTP to PTM conversion) or frequency measurement result request) to a plurality of UEs receiving the MBS service at a time through an RLC layer (or RLC layer configured with logical channel identifier corresponding to multicast service) for a multicast service in a common transmission resource, so the transmission resources may be saved. In addition, the base station may transmit an individual control message or request message (for example, whether the MBS service is received or preferred, or whether it is currently being received, or whether the MBS service type is switched (e.g., PTM to PTP or PTP to PTM conversion) or frequency measurement result request) to each UE receiving the MBS service from each transmission resource allocated to each UE to the RLC layer (or RLC layer configured with logical channel identifier corresponding to multicast service) for the unicast service, so each UE may be individually controlled and scheduled.

In addition, in the above, the base station may increase the reliability of the MBS service of the UE by transmitting the duplicate MBS data service through the RLC layer (or RLC layer configured with logical channel identifier corresponding to multicast service) for the multicast service or the RLC layer (or RLC layer configured with logical channel identifier corresponding to unicast service) for the unicast service to the UEs in which the fourth bearer structure g-04a, g-04b, or g-04c is configured, and may reduce the possibility of data loss. In the above, redundant packet transmission may be performed in an upper layer (e.g., a PDCP layer).

The fourth bearer structure g-04a, g-04b, or g-04c provided in the disclosure may be usefully used in switching or changing procedures (e.g., switching from multicast service (PTM) to unicast service (PTP) or from unicast service (PTP) to multicast service (PTM)) of the MBS service type. For example, the base station may instruct the MBS service type switching or changing procedure with respect to the configured MBS bearer to the UE in which the fourth bearer structure is configured or receiving the MBS service based on RRC message, MBS control message, MAC control information, PDCP control data, or RLC control data. As another method, if data is received from the RLC layer for the multicast service configured in the MBS bearer, the UE may determine that the switch from the unicast service (PTP) to the multicast service (PTM) is instructed by the base station, or if data is received from the RLC layer for the unicast service configured in the MBS bearer, the UE may determine that the switch from the multicast service (PTM) to the unicast service (PTP) is instructed by the base station (UE autonomous MBS bearer switching).

In one embodiment of (1), if switching from multicast service (PTM) to unicast service (PTP) is indicated in the above instruction, the UE may perform the following example procedures (e.g., PDCP reconfiguration procedure or RLC reconfiguration procedure) for the MBS bearer in order to continuously receive the MBS service without error or data loss or to prevent a problem in the reception window operation.

In one example, in the fourth bearer structure, the UE may use the window variables (e.g., RX_NEXT (a variable indicating the COUNT value of data (PDCP SDU) expected to be received next), RX_DELIV (a variable indicating the COUNT value of the first data (PDCP SDU) not delivered to the upper layer or data still waiting to be received), or RX_REORD (a variable indicating the next COUNT value (or the COUNT value incremented by 1) of the COUNT value of the data (PDCP data PDU) that triggered the PDCP reordering timer) in the RLC layer for the multicast service or the PDCP layer connected to the RLC layer for the unicast service without performing the initialization procedure or without initializing the PDCP reordering timer. Because, if the UE does not initialize the window variables as described above or uses the PDCP reordering timer as it is without initializing (if the PDCP reordering timer is running, keep the same running) the PDCP reordering timer, because the COUNT value (or PDCP serial number) of the data by the window variables is maintained, data loss may be minimized by transmitting information (e.g., PDCP status report) on data that has not been retransmitted or received to the base station to recover from data loss.

As another method, in the above, in order to facilitate synchronization of window variables with the base station and to reduce data transmission delay, the UE may perform a PDCP re-establishment procedure or PDCP data recovery procedure in the PDCP layer, initialize the window variables, or stop (or initialize) the PDCP reordering timer, perform data processing on the stored (or received) data, and transfers the data to an upper layer. In the above, the window variables may be initialized to a value of 0, or the window variables may be initialized based on received data to facilitate management of the base station window variable (for example, even if the base station does not initialize the window variable, the UE may synchronize the window variable by itself based on the received data).

For example, the RX_NEXT variable may be initialized with a combination of the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_DELIV variable may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_REORD value may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication (as another method, the initialization of the RX_REORD variable may be omitted so that the reordering timer operates in the above). As another method, RX_DELIV may be initialized to a value obtained by subtracting the reception window size (or half the size of the reception window) from the RX_NEXT value and adding 1. As another method, the window variables may be initialized to reference values or initial values for the variables included in the indication information (RRC message, system information, MAC control information, or PDCP control data) indicated by the base station in order to facilitate implementation of the base station.

In one example, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to unicast service) for unicast service. In the above, upon receiving the PDCP status report, based on the received report, the base station may retransmit data through the RLC layer for the unicast service. If the UE transmits the PDCP status report through the RLC layer for the unicast service as described above, the base station may easily distinguish the PDCP status report which UE the PDCP status report is for. Alternatively, if retransmission is performed through the RLC layer for unicast service, transmission resource waste may be prevented by performing retransmission through individual transmission resources (as another method, in the above, the UE may transmit a PDCP status report from the RLC layer for multicast). As another method, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to multicast service) for multicast service. In the above, upon receiving the PDCP status report, based on the received report, the base station may retransmit data through the RLC layer for the multicast service or the unicast service. If the UE transmits the PDCP status report through the RLC layer for the multicast service as described above, the base station may easily identify the PDCP status report of all UEs.

In one example, the UE may still receive data in the RLC layer for the multicast service in the fourth bearer structure. This is because the UE may receive data transmitted late. As another method, by releasing or re-establishing (initializing window variables or discarding stored partitioned data) the RLC layer, it is possible to facilitate synchronization of window variables of the RLC layer of the base station and to quickly discard unnecessary data.

In one example, in the above, the UE may use the window variables (for example, in UM mode, RX_Next_Reassembly (a variable indicating the smallest (or fastest) RLC serial number value still under consideration for reassembly), RX_Timer_Trigger (a variable indicating the RLC serial number that is 1 greater than or next to the RLC serial number that triggered the RLC reassembly timer), or RX_Next_Highest (a variable indicating the RLC serial number that is 1 greater than or next to the highest RLC serial number among the received data (UMD PDU)), or for example, in UM mode, RX_Next (a variable indicating the value of the RLC serial number that is 1 greater than or next to the RLC serial number of the last data (RLC SDU) completely received in order), RX_Next_Status_Trigger (a variable indicating the RLC serial number that is 1 greater than or next to the RLC serial number that triggered the RLC reassembly timer), or RX_Highest_Status (a variable indicating the highest RLC serial number that may be indicated as ACK_SN (a variable indicating the RLC serial number of the next data (RLC SDU) that has not been reported as lost in the RLC status report or has not yet been received) in RLC status report)) as they are without performing an initialization procedure or without initializing the RLC reassembly timer in the RLC layer (or RLC layer configured with logical channel identifier corresponding to unicast service) for unicast service. This is because, if the window variables are not initialized or the RLC reassembly timer is not initialized (if the RLC reassembly timer is running, keep the same running) as described above, and the RLC serial number of the data is maintained by the window variables, it is easy to implement a UE or a base station (e.g., no additional procedures required).

As another method, in the above, in order to facilitate synchronization of window variables with the base station and to reduce data transmission delay, the UE may initialize the RLC re-establishment (or establishment) procedure or the window variables in the RLC layer or stop (or initialize) the RLC re-assembly timer. In the above, the window variables may be initialized to a value of 0, or the window variables may be initialized based on received data to facilitate management of the base station window variable (for example, even if the base station does not initialize the window variable, the UE may synchronize the window variable by itself based on the received data).

For example, in the UM mode, because the RLC serial number is included only for the divided data, the UE may process the data immediately for complete data that does not include the RLC serial number and deliver the data to an upper layer and update the window variable based on the RLC serial number of the received divided data. For example, RX_Next_Reassembly may be initialized with the RLC serial number of the data (RLC SDU, UMD PDU, or RLC SDU segment) received first after the above indication and including the RLC serial number, RX_Next_Highest may be initialized with the RLC serial number of the data (RLC SDU, UMD PDU, or RLC SDU segment) received first after the above indication and including the RLC serial number, or RX_Next_Trigger may be initialized with the RLC serial number of the data (RLC SDU, UMD PDU, or RLC SDU segment) received first after the above indication and including the RLC serial number (in the above, because the variable of RX_Timer_Trigger does not significantly affect window operation (because it causes unnecessary processing), the initialization of the variable may be omitted).

Alternatively, for example, in the AM mode, because RLC serial number is included for all data (RLC data PDU or RLC SDU) RX_Next, RX_Next_Status_Trigger, or RX_Highest_Status may be initialized with the RLC serial number of the first received data (RLC SDU or UMD PDU or RLC SDU segment) after the above indication (in the above, because the variable of RX_Timer_Trigger does not significantly affect window operation (because it causes unnecessary processing), the initialization of the variable may be omitted). As another method, the window variables may be initialized to reference values or initial values for the variables included in the indication information (RRC message, system information, MAC control information, or PDCP control data) indicated by the base station in order to facilitate implementation of the base station. As another method, in the above, for the RLC layer configured to the RLC AM mode, an RLC re-establishment procedure may be performed in order to minimize the complexity of the ARQ operation.

In one example, after that, the UE may start receiving data from the RLC layer for the unicast service (or the RLC layer configured with the logical channel identifier corresponding to the unicast service).

In one embodiment, if switching from unicast service (PTP) to multicast service (PTM) is indicated in the above instruction, the UE may perform the following example procedures in order to continuously receive the MBS service without error or data loss or to prevent a problem in the reception window operation.

In one example, in the fourth bearer structure, the UE may use the window variables (e.g., RX_NEXT (a variable indicating the COUNT value of data (PDCP SDU) expected to be received next), RX_DELIV (a variable indicating the COUNT value of the first data (PDCP SDU) not delivered to the upper layer or data still waiting to be received), or RX_REORD (a variable indicating the next COUNT value (or the COUNT value incremented by 1) of the COUNT value of the data (PDCP data PDU) that triggered the PDCP reordering timer) in the RLC layer for the multicast service or the PDCP layer connected to the RLC layer for the unicast service without performing the initialization procedure or without initializing the PDCP reordering timer. Because, if the UE does not initialize the window variables as described above or uses the PDCP reordering timer as it is without initializing (if the PDCP reordering timer is running, keep the same running) the PDCP reordering timer, because the COUNT value (or PDCP serial number) of the data by the window variables is maintained, data loss may be minimized by transmitting information (e.g., PDCP status report) on data that has not been retransmitted or received to the base station to recover from data loss.

As another method, in the above, in order to facilitate synchronization of window variables with the base station and to reduce data transmission delay, the UE may perform a PDCP re-establishment procedure or PDCP data recovery procedure in the PDCP layer, initialize the window variables, or stop (or initialize) the PDCP reordering timer, perform data processing on the stored (or received) data, and transfers the data to an upper layer. In the above, the window variables may be initialized to a value of 0, or the window variables may be initialized based on received data to facilitate management of the base station window variable (for example, even if the base station does not initialize the window variable, the UE may synchronize the window variable by itself based on the received data).

For example, the RX_NEXT variable may be initialized with a combination of the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_DELIV variable may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_REORD value may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication (as another method, the initialization of the RX_REORD variable may be omitted so that the reordering timer operates in the above).

As another method, RX_DELIV may be initialized to a value obtained by subtracting the reception window size (or half the size of the reception window) from the RX_NEXT value and adding 1. As another method, the window variables may be initialized to reference values or initial values for the variables included in the indication information (RRC message, system information, MAC control information, or PDCP control data) indicated by the base station in order to facilitate implementation of the base station.

In one example, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to unicast service) for unicast service. In the above, upon receiving the PDCP status report, based on the received report, the base station may retransmit data through the RLC layer for the unicast service. If the UE transmits the PDCP status report through the RLC layer for the unicast service as described above, the base station may easily distinguish the PDCP status report which UE the PDCP status report is for. Alternatively, if retransmission is performed through the RLC layer for unicast service, transmission resource waste may be prevented by performing retransmission through individual transmission resources (as another method, in the above, the UE may transmit a PDCP status report from the RLC layer for multicast).

As another method, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to multicast service) for multicast service. In the above, upon receiving the PDCP status report, based on the received report, the base station may retransmit data through the RLC layer for the multicast service or the unicast service. If the UE transmits the PDCP status report through the RLC layer for the multicast service as described above, the base station may easily identify the PDCP status report of all UEs.

In one example, the UE may still receive data in the RLC layer for the unicast service in the fourth bearer structure. This is because the UE may receive data transmitted late. As another method, by releasing or re-establishing (initializing window variables or discarding stored partitioned data) the RLC layer, it is possible to facilitate synchronization of window variables of the RLC layer of the base station and to quickly discard unnecessary data.

In one example, in the above, the UE may use the window variables (for example, in UM mode, RX_Next_Reassembly (a variable indicating the smallest (or fastest) RLC serial number value still under consideration for reassembly), RX_Timer_Trigger (a variable indicating the RLC serial number that is 1 greater than or next to the RLC serial number that triggered the RLC reassembly timer), or RX_Next_Highest (a variable indicating the RLC serial number that is 1 greater than or next to the highest RLC serial number among the received data (UMD PDU)), or for example, in UM mode, RX_Next (a variable indicating the value of the RLC serial number that is 1 greater than or next to the RLC serial number of the last data (RLC SDU) completely received in order), RX_Next_Status_Trigger (a variable indicating the RLC serial number that is 1 greater than or next to the RLC serial number that triggered the RLC reassembly timer), or RX_Highest_Status (a variable indicating the highest RLC serial number that may be indicated as ACK_SN (a variable indicating the RLC serial number of the next data (RLC SDU) that has not been reported as lost in the RLC status report or has not yet been received) in RLC status report)) as they are without performing an initialization procedure or without initializing the RLC reassembly timer in the RLC layer (or RLC layer configured with logical channel identifier corresponding to unicast service) for multicast service. This is because, if the window variables are not initialized or the RLC reassembly timer is not initialized (if the RLC reassembly timer is running, keep the same running) as described above, and the RLC serial number of the data is maintained by the window variables, it is easy to implement a UE or a base station (e.g., no additional procedures required).

As another method, in the above, in order to facilitate synchronization of window variables with the base station and to reduce data transmission delay, the UE may initialize the RLC re-establishment (or establishment) procedure or the window variables in the RLC layer or stop (or initialize) the RLC re-assembly timer. In the above, the window variables may be initialized to a value of 0, or the window variables may be initialized based on received data to facilitate management of the base station window variable (for example, even if the base station does not initialize the window variable, the UE may synchronize the window variable by itself based on the received data). For example, in the UM mode, because the RLC serial number is included only for the divided data, the UE may process the data immediately for complete data that does not include the RLC serial number and deliver the data to an upper layer and update the window variable based on the RLC serial number of the received divided data.

For example, RX_Next_Reassembly may be initialized with the RLC serial number of the data (RLC SDU, UMD PDU, or RLC SDU segment) received first after the above indication and including the RLC serial number, RX_Next_Highest may be initialized with the RLC serial number of the data (RLC SDU, UMD PDU, or RLC SDU segment) received first after the above indication and including the RLC serial number, or RX_Next_Trigger may be initialized with the RLC serial number of the data (RLC SDU, UMD PDU, or RLC SDU segment) received first after the above indication and including the RLC serial number (in the above, because the variable of RX_Timer_Trigger does not significantly affect window operation (because it causes unnecessary processing), the initialization of the variable may be omitted). Alternatively, for example, in the AM mode, because RLC serial number is included for all data (RLC data PDU or RLC SDU) RX_Next, RX_Next_Status_Trigger, or RX_Highest_Status may be initialized with the RLC serial number of the first received data (RLC SDU or UMD PDU or RLC SDU segment) after the above indication (in the above, because the variable of RX_Timer_Trigger does not significantly affect window operation (because it causes unnecessary processing), the initialization of the variable may be omitted).

As another method, the window variables may be initialized to reference values or initial values for the variables included in the indication information (RRC message, system information, MAC control information, or PDCP control data) indicated by the base station in order to facilitate implementation of the base station. As another method, in the above, for the RLC layer configured to the RLC AM mode, an RLC re-establishment procedure may be performed in order to minimize the complexity of the ARQ operation.

In one example, after that, the UE may start receiving data from the RLC layer (or the RLC layer configured with the logical channel identifier corresponding to the unicast service) for the multicast service.

The fourth bearer structure g-04a, g-04b, or g-04c provided in the disclosure may be efficiently used to support an MBS service without data loss or less data loss even in a handover procedure. For example, when the UE performs a handover procedure to the target base station according to the instruction (e.g., handover command message (RR- CReconfiguration)) of the source base station while receiving the MBS service (multicast service or unicast service) through the MBS bearer in which the fourth bearer structure is configured from the source base station, the UE may maintain the fourth bearer structure for the MBS bearer, or may be reconfigured or newly configured to the fourth bearer structure. For example, in order to continue receiving the MBS service based on the handover command message while receiving the MBS service from the source base station through the MBS bearer configured in the structure of g-04a, g-04b, or g-04c in the source base station, the MBS bearer may be reconfigured to the g-04a or g-04b or g-04c structure, or a new MBS bearer may be configured. As described above, when the MBS bearer is reconfigured or newly configured (e.g., PDCP re-establishment procedure, RLC re-establishment procedure, PDCP reconfiguration procedure, or RLC reconfiguration procedure) due to the handover procedure, the UE may perform the following procedures.

In one embodiment, if the UE receives a handover command message (RRCReconfiguration message, e.g., RRC message including reconfigurationWithsync indicator) from the source base station and the message includes configuration information for establishing or reconfiguring the MBS bearer, or if the PDCP layer re-establishment indicator (reestablishPDCP) for the MBS bearer is included, or if the PDCP layer recovery indicator (recoverPDCP) for the MBS bearer is included, or if instructed to reconfigure the PDCP layer for the MBS bearer, or if an instruction to re-establish or release any RLC layer for the MBS bearer is included, the UE may perform the following example procedures for the MBS bearer in order to continuously receive the MBS service without error or data loss or to prevent a problem in the reception window operation.

In one example, in the fourth bearer structure, the UE may use the window variables (e.g., RX_NEXT (a variable indicating the COUNT value of data (PDCP SDU) expected to be received next), RX_DELIV (a variable indicating the COUNT value of the first data (PDCP SDU) not delivered to the upper layer or data still waiting to be received), or RX_REORD (a variable indicating the next COUNT value (or the COUNT value incremented by 1) of the COUNT value of the data (PDCP data PDU) that triggered the PDCP reordering timer) in the RLC layer for the multicast service or the PDCP layer connected to the RLC layer for the unicast service without performing the initialization procedure or without initializing the PDCP reordering timer. Because, if the UE does not initialize the window variables as described above or uses the PDCP reordering timer as it is without initializing (if the PDCP reordering timer is running, keep the same running) the PDCP reordering timer, because the COUNT value (or PDCP serial number) of the data by the window variables is maintained, data loss may be minimized by transmitting information (e.g., PDCP status report) on data that has not been retransmitted or received to the base station to recover from data loss.

As another method, in the above, in order to facilitate synchronization of window variables with the base station and to reduce data transmission delay, the UE may perform a PDCP re-establishment procedure or PDCP data recovery procedure in the PDCP layer, initialize the window variables, or stop (or initialize) the PDCP reordering timer, perform data processing on the stored (or received) data, and transfers the data to an upper layer. In the above, the window variables may be initialized to a value of 0, or the window variables may be initialized based on received data to facilitate management of the base station window variable (for example, even if the base station does not initialize the window variable, the UE may synchronize the window variable by itself based on the received data).

For example, the RX_NEXT variable may be initialized with a combination of the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_DELIV variable may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication, or the RX_REORD value may be initialized with a combination of the RX_NEXT value initialized above or the PDCP serial number+1 or an HFN value (or the previously used HFN value, the HFN value determined by the UE implementation, or the HFN value included in the indication) initialized to 0 of the data (PDCP data PDU or PDCP SDU) received for the first time after the indication (as another method, the initialization of the RX_REORD variable may be omitted so that the reordering timer operates in the above).

As another method, RX_DELIV may be initialized to a value obtained by subtracting the reception window size (or half the size of the reception window) from the RX_NEXT value and adding 1. As another method, the window variables may be initialized to reference values or initial values for the variables included in the indication information (RRC message, system information, MAC control information, or PDCP control data) indicated by the base station in order to facilitate implementation of the base station.

In one example, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to unicast service) for unicast service. In the above, upon receiving the PDCP status report, based on the received report, the base station may retransmit data through the RLC layer for the unicast service. If the UE transmits the PDCP status report through the RLC layer for the unicast service as described above, the base station may easily distinguish the PDCP status report which UE the PDCP status report is for.

Alternatively, if retransmission is performed through the RLC layer for unicast service, transmission resource waste may be prevented by performing retransmission through individual transmission resources (as another method, in the above, the UE may transmit a PDCP status report from the RLC layer for multicast). As another method, upon receiving the indication, the UE reports whether data is successfully received or not to the base station, so that the base station may perform retransmission to reduce loss, the PDCP status report may be configured and transmitted to the RLC layer (or RLC layer configured with logical channel identifier corresponding to multicast service) for multicast service. In the above, upon receiving the PDCP status report, based on the received report, the base station may retransmit data through the RLC layer for the multicast service or the unicast service. If the UE transmits the PDCP status report through the RLC layer for the multicast service as described above, the base station may easily identify the PDCP status report of all UEs.

In one example, upon receiving the indication in the above, the UE may still receive data in the RLC layer for the unicast service or in the RLC layer for the multicast service in the fourth bearer structure. This is because the UE may receive data transmitted late. As another method, by releasing or re-establishing (initializing window variables or discarding stored partitioned data) the RLC layer, it is possible to facilitate synchronization of window variables of the RLC layer of the base station and to quickly discard unnecessary data.

In one example, upon receiving the indication in the above, the UE may use the window variables (for example, in UM mode, RX_Next_Reassembly (a variable indicating the smallest (or fastest) RLC serial number value still under consideration for reassembly), RX_Timer_Trigger (a variable indicating the RLC serial number that is 1 greater than or next to the RLC serial number that triggered the RLC reassembly timer), or RX_Next_Highest (a variable indicating the RLC serial number that is 1 greater than or next to the highest RLC serial number among the received data (UMD PDU)), or for example, in UM mode, RX_Next (a variable indicating the value of the RLC serial number that is 1 greater than or next to the RLC serial number of the last data (RLC SDU) completely received in order), RX_Next_Status_Trigger (a variable indicating the RLC serial number that is 1 greater than or next to the RLC serial number that triggered the RLC reassembly timer), or RX_Highest_Status (a variable indicating the highest RLC serial number that may be indicated as ACK_SN (a variable indicating the RLC serial number of the next data (RLC SDU) that has not been reported as lost in the RLC status report or has not yet been received) in RLC status report)) as they are without performing an initialization procedure or without initializing the RLC reassembly timer in the RLC layer for multicast service or in the RLC layer (or RLC layer configured with logical channel identifier corresponding to unicast service) for unicast service. This is because, if the window variables are not initialized or the RLC reassembly timer is not initialized (if the RLC reassembly timer is running, keep the same running) as described above, and the RLC serial number of the data is maintained by the window variables, it is easy to implement a UE or a base station (e.g., no additional procedures required).

As another method, in the above, in order to facilitate synchronization of window variables with the base station and to reduce data transmission delay, the UE may initialize the RLC re-establishment (or establishment) procedure or the window variables in the RLC layer or stop (or initialize) the RLC re-assembly timer. In the above, the window variables may be initialized to a value of 0, or the window variables may be initialized based on received data to facilitate management of the base station window variable (for example, even if the base station does not initialize the window variable, the UE may synchronize the window variable by itself based on the received data). For example, in the UM mode, because the RLC serial number is included only for the divided data, the UE may process the data immediately for complete data that does not include the RLC serial number and deliver the data to an upper layer and update the window variable based on the RLC serial number of the received divided data.

For example, RX_Next_Reassembly may be initialized with the RLC serial number of the data (RLC SDU, UMD PDU, or RLC SDU segment) received first after the above indication and including the RLC serial number, RX_Next_Highest may be initialized with the RLC serial number of the data (RLC SDU, UMD PDU, or RLC SDU segment) received first after the above indication and including the RLC serial number, or RX_Next_Trigger may be initialized with the RLC serial number of the data (RLC SDU, UMD PDU, or RLC SDU segment) received first after the above indication and including the RLC serial number (in the above, because the variable of RX_Timer_Trigger does not significantly affect window operation (because it causes unnecessary processing), the initialization of the variable may be omitted).

Alternatively, for example, in the AM mode, because RLC serial number is included for all data (RLC data PDU or RLC SDU) RX_Next, RX_Next_Status_Trigger, or RX_Highest_Status may be initialized with the RLC serial number of the first received data (RLC SDU or UMD PDU or RLC SDU segment) after the above indication (in the above, because the variable of RX_Timer_Trigger does not significantly affect window operation (because it causes unnecessary processing), the initialization of the variable may be omitted). As another method, the window variables may be initialized to reference values or initial values for the variables included in the indication information (RRC message, system information, MAC control information, or PDCP control data) indicated by the base station in order to facilitate implementation of the base station. As another method, in the above, for the RLC layer configured to the RLC AM mode, an RLC re-establishment procedure may be performed in order to minimize the complexity of the ARQ operation.

In one example, after that, the UE may start receiving data from the RLC layer (or the RLC layer configured with the logical channel identifier corresponding to the unicast service) for the multicast service.

Figure 8:
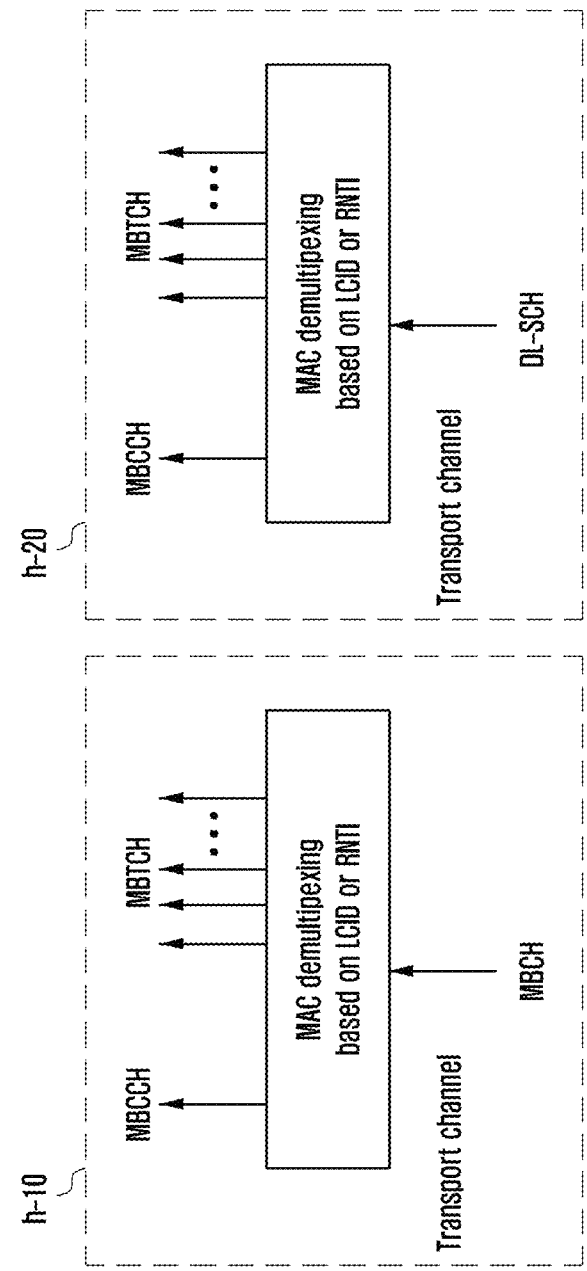
FIG. 8 is a diagram illustrating a method of demultiplexing received MBS data in a MAC layer when a UE in RRC connected mode, RRC inactive mode, or RRC idle mode receives the MBS data (e.g., MBS control data or MBS user data or general data other than MBS data) through a multicast bearer or a unicast bearer supporting the MBS service with the bearer structure provided in FIG. 7 according to various embodiments of the present disclosure.

FIG. 8 is a diagram illustrating a method of demultiplexing received MBS data in a MAC layer when a UE in RRC connected mode, RRC inactive mode, or RRC idle mode receives the MBS data (e.g., MBS control data or MBS user data or general data other than MBS data) through a multicast bearer or a unicast bearer supporting the MBS service with the bearer structure provided in FIG. 7 according to various embodiments of the present disclosure. In addition, a method for the UE to transmit uplink MBS data is also provided. (e.g., MBS control data, MBS user data, or general data other than MBS data)

In FIG. 8, one method or a plurality of methods among the following methods may be applied to the method of receiving MBS data or the method of receiving MBS data and demultiplexing the MBS data. As another method, different methods may be applied according to whether the UE is in an RRC connected mode, an RRC inactive mode, or an RRC idle mode among the following methods.

In one embodiment of MBS reception method 1-1 h-10, in the MBS reception method 1-1 h-10 of FIG. 8, a separate physical channel or transport channel (e.g., MBCH and MBCH channel) for the MBS service may be configured, and a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header is always attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively.

In addition, different logical channel identifiers may be allocated to each MBS service serviced in the MBS user data channel. In the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each logical channel identifier corresponding to the first identifier or the second identifier of each MBS service may be configured or broadcast. In the above, the first identifier may indicate a public land mobile network (PLMN) serving the MBS or may indicate an MBS service type or session. In the above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). In the above, a logical channel identifier for the MBS control data channel, the MBS user data channel, or each service of the MBS user data channel may be allocated as one combination of predetermined bits (e.g., 6 bits) in the first logical channel identifier space.

Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, in the above, a logical channel identifier for the MBS control data channel, the MBS user data channel, or each service of the MBS user data channel may be allocated as one combination of predetermined bits (e.g., 6 bits) in the second logical channel identifier space. Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space.

In the above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer, or may be distinguished by using different RNTIs. Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer. The MBS reception method 1-1 may be applied to an RRC connected mode, RRC inactive mode, or RRC idle mode UE.

In one embodiment of MBS reception method 1-2 h-10, in the MBS reception method 1-2 h-10 of FIG. 8, a separate physical channel or transport channel (e.g., MBCH and MBCH channel) for the MBS service may be configured, and a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header is attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively.

In addition, different logical channel identifiers may be allocated to each MBS service serviced in the MBS user data channel. In addition, different RNTI identifiers may be allocated to the MBS control data channel (e.g., MBCCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier may allocate the same logical channel identifier to the MBS control data channel, the MBS user data channel, or each MBS service serviced in the MBS user data channel. As another method, the same RNTI identifiers may be allocated to the MBS control data channel (e.g., MBCCH and MBS control channel), the MBS user data channel, or each MBS service serviced in the MBS user data channel, and in more detail, the classification of the channel or data may be distinguished by allocating different logical channel identifiers to the MBS control data channel (e.g., MBCCH and MBS control channel), the MBS user data channel, or each MBS service serviced in the MBS user data channel. In the above, the RNTI identifier for the MBS service may be configured differently from the RNTI identifier for the DL-SCH (e.g., C-RNTI, MCS-C-RNTI, CS-RNTI, etc.).

As another method, in the above, the RNTI identifier (e.g., C-RNTI, MCS-C-RNTI, CS-RNTI, etc.) for the MBS service may be configured to be the same as the RNTI identifier for the DL-SCH, and differentiation may be performed with a logical channel identifier. In addition, for each MBS service serviced in the MBS user data channel, in the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each logical channel identifier or each RNTI identifier corresponding to the first identifier or the second identifier of each MBS service may be configured or broadcast. In the above, the first identifier may indicate a public land mobile network (PLMN) serving the MBS or may indicate an MBS service type or session. In the above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). In the above, a logical channel identifier for the MBS control data channel, the MBS user data channel, or each service of the MBS user data channel may be allocated as one combination of predetermined bits (e.g., 6 bits) in the first logical channel identifier space.

Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, in the above, a logical channel identifier for the MBS control data channel, the MBS user data channel, or each service of the MBS user data channel may be allocated as one combination of predetermined bits (e.g., 6 bits) in the second logical channel identifier space.

Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. In the above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer, or may be distinguished by using different RNTIs. Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer. The MBS reception method 1-2 may be applied to an RRC connected mode, RRC inactive mode, or RRC idle mode UE.

In one embodiment of MBS reception method 1-3 h-10, in the MBS reception method 1-3 h-10 of FIG. 8, a separate physical channel or transport channel (e.g., MBCH and MBCH channel) for the MBS service may be configured, and a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header may be not attached to MBS data transmitted for the MBS service, and the MBS control data channel (e.g., MBCCH and MBS control channel) or the MBS user data channel (e.g., MBTCH and MBS traffic channel) may be differentiated from each other based on the RNTI identifier. In addition, different RNTI identifiers may be allocated to the MBS control data channel (e.g., MBCCH and MBS control channel) or the MBS user data channel (e.g., MBTCH and MBS traffic channel).

In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier does not need to be configured for the MBS control data channel, the MBS user data channel, or each MBS service serviced in the MBS user data channel, and there is no need to include a MAC header in the MBS data. In addition, for each MBS service serviced in the MBS user data channel, in the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each RNTI identifier corresponding to the first identifier or the second identifier of each MBS service may be configured or broadcast.

In the above, the first identifier may indicate a public land mobile network (PLMN) serving the MBS or may indicate an MBS service type or session. In the above, the second identifier may indicate a more specific session or type of MBS service. Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, or RNTI identifier, and the data may be transmitted to a corresponding upper layer. The MBS reception method 1-3 may be applied to an RRC connected mode, RRC inactive mode, or RRC idle mode UE.

In one embodiment of MBS reception method 2-1 h-20, in the MBS reception method 2-1 h-20 of FIG. 8, a physical channel or transport channel (e.g., MBCH, MBCH channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header is always attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively.

In addition, different logical channel identifiers may be allocated to each MBS service serviced in the MBS user data channel. In the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each logical channel identifier corresponding to the first identifier or the second identifier of each MBS service may be configured or broadcast. In the above, the first identifier may indicate a public land mobile network (PLMN) serving the MBS or may indicate an MBS service type or session. In the above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). In the above, a logical channel identifier for the MBS control data channel, the MBS user data channel, or each service of the MBS user data channel may be allocated as one combination of predetermined bits (e.g., 6 bits) in the first logical channel identifier space.

Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, in the above, a logical channel identifier for the MBS control data channel, the MBS user data channel, or each service of the MBS user data channel may be allocated as one combination of predetermined bits (e.g., 6 bits) in the second logical channel identifier space.

Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. In the above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer, or may be distinguished by using different RNTIs. Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer. The MBS reception method 2-1 may be applied to an RRC connected mode, RRC inactive mode, or RRC idle mode UE.

In one embodiment of MBS reception method 2-2 h-20, in the MBS reception method 2-2 h-20 of FIG. 8, a physical channel or transport channel (e.g., MBCH, MBCH channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header is attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively.

In addition, different logical channel identifiers may be allocated to each MBS service serviced in the MBS user data channel. In addition, different RNTI identifiers may be allocated to the MBS control data channel (e.g., MBCCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier may allocate the same logical channel identifier to the MBS control data channel, the MBS user data channel, or each MBS service serviced in the MBS user data channel. As another method, the same RNTI identifiers may be allocated to the MBS control data channel (e.g., MBCCH and MBS control channel), the MBS user data channel, or each MBS service serviced in the MBS user data channel, and in more detail, the classification of the channel or data may be distinguished by allocating different logical channel identifiers to the MBS control data channel (e.g., MBCCH and MBS control channel), the MBS user data channel, or each MBS service serviced in the MBS user data channel.

In the above, the RNTI identifier for the MBS service may be configured differently from the RNTI identifier for the DL-SCH (e.g., C-RNTI, MCS-C-RNTI, CS-RNTI, etc.). As another method, in the above, the RNTI identifier (e.g., C-RNTI, MCS-C-RNTI, CS-RNTI, etc.) for the MBS service may be configured to be the same as the RNTI identifier for the DL-SCH, and differentiation may be performed with a logical channel identifier. In addition, for each MBS service serviced in the MBS user data channel, in the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each logical channel identifier or each RNTI identifier corresponding to the first identifier or the second identifier of each MBS service may be configured or broadcast.

In the above, the first identifier may indicate a public land mobile network (PLMN) serving the MBS or may indicate an MBS service type or session. In the above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). In the above, a logical channel identifier for the MBS control data channel, the MBS user data channel, or each service of the MBS user data channel may be allocated as one combination of predetermined bits (e.g., 6 bits) in the first logical channel identifier space. Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space.

As another method, in order to double the logical channel identifier space, in the above, a logical channel identifier for the MBS control data channel, the MBS user data channel, or each service of the MBS user data channel may be allocated as one combination of predetermined bits (e.g., 6 bits) in the second logical channel identifier space. Alternatively, MAC control information (MAC CE, control element, e.g., MAC CE to instruct the network to stop receiving MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. In the above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer, or may be distinguished by using different RNTIs.

Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer. The MBS reception method 2-2 may be applied to an RRC connected mode, RRC inactive mode, or RRC idle mode UE.

In one embodiment of MBS reception method 2-3 h-20, in the MBS reception method 2-3 h-20 of FIG. 8, a physical channel or transport channel (e.g., MBCH, MBCH channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header may be not attached to MBS data transmitted for the MBS service, and the MBS control data channel (e.g., MBCCH and MBS control channel) or the MBS user data channel (e.g., MBTCH and MBS traffic channel) may be differentiated from each other based on the RNTI identifier. In addition, different RNTI identifiers may be allocated to the MBS control data channel (e.g., MBCCH and MBS control channel) or the MBS user data channel (e.g., MBTCH and MBS traffic channel).

In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier does not need to be configured for the MBS control data channel, the MBS user data channel, or each MBS service serviced in the MBS user data channel, and there is no need to include a MAC header in the MBS data. In addition, for each MBS service serviced in the MBS user data channel, in the system information, RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcast, and each RNTI identifier corresponding to the first identifier or the second identifier of each MBS service may be configured or broadcast. In the above, the first identifier may indicate a public land mobile network (PLMN) serving the MBS or may indicate an MBS service type or session. In the above, the second identifier may indicate a more specific session or type of MBS service.

Accordingly, when the MAC layer of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, or RNTI identifier, and the data may be transmitted to a corresponding upper layer. The MBS reception method 2-3 may be applied to an RRC connected mode, RRC inactive mode, or RRC idle mode UE.

Figure 9:
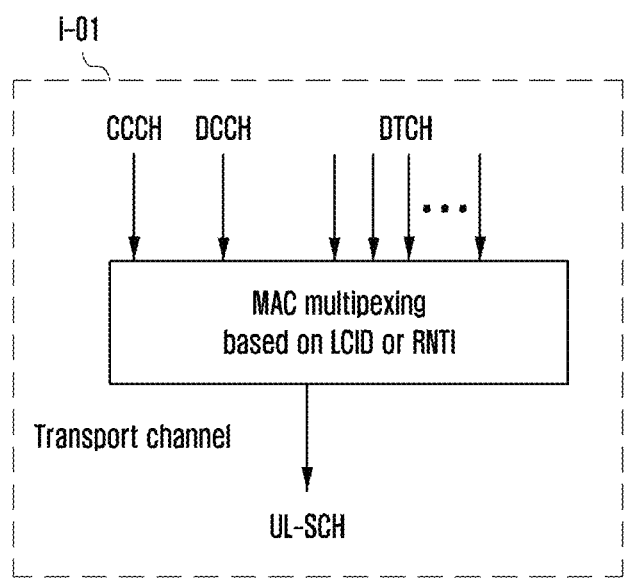
FIG. 9 is a diagram illustrating a method of multiplexing MBS data to be transmitted in a MAC layer when a UE in RRC connected mode, RRC inactive mode, or RRC idle mode transmits the MBS data (e.g., MBS control data or MBS user data or general data other than MBS data) through a multicast bearer or a unicast bearer supporting the MBS service with the bearer structure provided in FIG. 7 according to various embodiments of the present disclosure.

FIG. 9 is a diagram illustrating a method of multiplexing MBS data to be transmitted in a MAC layer when a UE in RRC connected mode, RRC inactive mode, or RRC idle mode transmits the MBS data (e.g., MBS control data or MBS user data or general data other than MBS data) through a multicast bearer or a unicast bearer supporting the MBS service with the bearer structure provided in FIG. 7 according to various embodiments of the present disclosure.

In FIG. 9, one method or a plurality of methods among the following methods may be applied to the method of transmitting MBS data or the method of transmitting MBS data and multiplexing the MBS data. As another method, different methods may be applied according to whether the UE is in an RRC connected mode, an RRC inactive mode, or an RRC idle mode among the following methods.

In one embodiment of MBS transmission method 1 i-01, in a case where a UE receiving the MBS service by the methods provided in FIG. 8 needs to transmit uplink MBS data due to a network request or the necessity of the UE itself, the UE or the UE in the RRC connected mode, the RRC inactive mode, or the RRC idle mode may transmit uplink MBS data to the base station or the network. In the above, the network or the base station may transmit or configure an indication (e.g., stopping or resuming services) for the MBS service status or a response request (for example, whether the UE is receiving a specific MBS service, whether the UE wants or is interested in receiving a specific MBS service, preference between multicast bearer and unicast bearer, or information or indicator requesting whether a bearer prefers to switch (whether the UE wants to receive the MBS service through a multicast bearer or through a unicast bearer)) for the MBS service by transmitting a network request included in the MBS data (e.g., MBS control data, MBS user data, RRC message, RLC control data (RLC control PDU), PDCP control data (PDCP control PDU), MAC control data (MAC CE, control element), or a newly defined message) to the UE.

In the above, the base station or the network may transmit MBS data including the network request at a separate downlink channel, a physical channel for MBS service, transport channel (e.g., MBCH and MBCH channel), or a separate transmission resource (frequency, time resource, transmission period, bandwidth part (or bandwidth part identifier), bandwidth, dedicated frequency (frequency information or SCell identifier), subcarrier spacing, etc.) configured in the system information, RRC message (e.g., RRCSetup, RRCResume, RRCReconfiguration, RRCRelease, or a newly defined RRC message), or control message (e.g., transmitted from the MBS control data channel) for MBS channel as suggested in FIG. 8 so that the UEs in the RRC connected mode, RRC inactive mode, or RRC idle mode may receive the MBS data. By transmitting as described above, MBS data may be transmitted with one transmission resource, and a plurality of UEs may receive the MBS data, thereby preventing waste of transmission resources and efficiently using the transmission resource.

As another method, in the above, the base station or the network may transmit MBS data including the network request through downlink channel (e.g., DL-SCH channel, CCCH, or DCCH channel), separate transmission resource (frequency, time resource, transmission period, bandwidth part (or bandwidth part identifier), bandwidth, dedicated frequency (frequency information or SCell identifier), subcarrier spacing, etc.), SRB0 (CCCH, common control channel), or SRB1 (DCCH, downlink control channel) configured in system information or RRC message (e.g., RRCSetup, RRCResume, RRCReconfiguration, RRCRelease, or a newly defined RRC message) as suggested in FIG. 8 and transmit and receive only RRC connected mode UEs receiving the MBS, respectively.

In the above, the uplink MBS data MBS data may be MBS control data, MBS user data, RRC message, RLC control data (RLC control PDU), PDCP control data (PDCP control PDU), MAC control data (MAC CE, control element), or a newly defined message. In the first MBS transmission method, the UE may transmit the uplink MBS data through a separate uplink channel configured in system information, an RRC message (e.g., RRCSetup, RRCResume, RRCReconfiguration, RRCRelease, or a newly defined RRC message), or a control message (e.g., transmitted from the MBS control data channel) for an MBS channel, a physical channel for MBS service, a transport channel (e.g., UL-MBCH and MBS channel), or a separate transmission resource (frequency, time resource, transmission period, bandwidth part (or bandwidth part identifier), bandwidth, dedicated frequency (frequency information or SCell identifier), subcarrier spacing, etc.).

For example, the UE may include a MAC header in the uplink MBS data, configure the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header to match the purpose (MBS control data, MBS user data, or MBS user data for a specific MBS service) of the uplink MBS data, and transmit the uplink MBS data. An RLC header, a PDCP header, or an SDAP header may also be included according to which bearer structure among the bearer structures provided in FIG. 7 is configured. As another method, the UE may transmit the uplink MBS data from the uplink transmission resource indicated by the PDCCH with an RNTI identifier (RNTI configured for MBS user data (channel) or MBS user data (channel) for a specific MBS service) suitable for the purpose (MBS control data, MBS user data, or MBS user data for a specific MBS service) of the uplink MBS data. Because the uplink MBS data nay be identified by an RNTI identifier, the uplink MBS data may not include a MAC header or a logical channel identifier.

As another method, the MAC header may be included in the uplink MBS data, the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header may be configured to match the purpose (MBS control data, MBS user data, or MBS user data for a specific MBS service) of the uplink MBS data, and the uplink MBS data may be transmitted. An RLC header, a PDCP header, or an SDAP header may also be included according to which bearer structure among the bearer structures provided in FIG. 7 is configured.

In one embodiment of MBS transmission method 2 i-01, in a case where a UE receiving the MBS service by the methods provided in FIG. 8 needs to transmit uplink MBS data due to a network request or the necessity of the UE itself, only the UE in the RRC connected mode may transmit uplink MBS data to the base station or the network. In the above, the network or the base station may transmit or configure an indication (e.g., stopping or resuming services) for the MBS service status or a response request (for example, whether the UE is receiving a specific MBS service, whether the UE wants or is interested in receiving a specific MBS service, preference between multicast bearer and unicast bearer, or information or indicator requesting whether a bearer prefers to switch (whether the UE wants to receive the MBS service through a multicast bearer or through a unicast bearer)) for the MBS service by transmitting a network request included in the MBS data (e.g., MBS control data, MBS user data, RRC message, RLC control data (RLC control PDU), PDCP control data (PDCP control PDU), MAC control data (MAC CE, control element), or a newly defined message) to the UE.

In the above, the base station or the network may transmit MBS data including the network request at a separate downlink channel, a physical channel for MBS service, transport channel (e.g., MBCH and MBCH channel), or a separate transmission resource (frequency, time resource, transmission period, bandwidth part (or bandwidth part identifier), bandwidth, dedicated frequency (frequency information or SCell identifier), subcarrier spacing, etc.) configured in the system information, RRC message (e.g., RRCSetup, RRCResume, RRCReconfiguration, RRCRelease, or a newly defined RRC message), or control message (e.g., transmitted from the MBS control data channel) for MBS channel as suggested in FIG. 8 so that the UEs in the RRC connected mode, RRC inactive mode, or RRC idle mode may receive the MBS data. By transmitting as described above, MBS data may be transmitted with one transmission resource, and a plurality of UEs may receive the MBS data, thereby preventing waste of transmission resources and efficiently using the transmission resource.

As another method, in the above, the base station or the network may transmit MBS data including the network request through downlink channel (e.g., DL-SCH channel, CCCH, or DCCH channel), separate transmission resource (frequency, time resource, transmission period, bandwidth part (or bandwidth part identifier), bandwidth, dedicated frequency (frequency information or SCell identifier), subcarrier spacing, etc.), SRB0 (CCCH, common control channel), or SRB1 (DCCH, downlink control channel) configured in system information or RRC message (e.g., RRCSetup, RRCResume, RRCReconfiguration, RRCRelease, or a newly defined RRC message) as suggested in FIG. 8 and transmit and receive only RRC connected mode UEs receiving the MBS, respectively. In the above, the uplink MBS data MBS data may be MBS control data, MBS user data, RRC message, RLC control data (RLC control PDU), PDCP control data (PDCP control PDU), MAC control data (MAC CE, control element), or a newly defined message.

In the second MBS transmission method, the UE in the RRC connected mode may transmit the uplink MBS data through a separate uplink channel or a physical channel or a transport channel (e.g., UL-SCH, Uplink shared channel, and channel for general data service) or a separate transmission resource (frequency, time resource, transmission period, bandwidth part (or bandwidth part identifier), bandwidth, dedicated frequency (frequency information or SCell identifier), subcarrier spacing, etc.) or a transmission resource allocated to a PDCCH scrambled by an RNTI identifier (e.g., C-RNTI) allocated to an RRC connected mode UE configured in the system information, RRC message (e.g., RRCSetup, RRCResume, RRCReconfiguration, RRCRelease, or a newly defined RRC message), or control message for MBS channel (e.g., transmitted from the MBS control data channel). In the above, in a case where uplink MBS data is transmitted through a transmission resource allocated to a PDCCH scrambled by an RNTI identifier (e.g., C-RNTI) allocated to an RRC connected mode UE, the RRC connected mode UE may transmit uplink MBS data through SRB0 (CCCH, common control channel), SRB1 (DCCH, downlink control channel) or DRB.

For example, the RRC connected mode UE may include a MAC header in the uplink MBS data, configure the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header to match the purpose (MBS control data, MBS user data, or MBS user data for a specific MBS service) of the uplink MBS data, and transmit the uplink MBS data. An RLC header, a PDCP header, or an SDAP header may also be included according to which bearer structure among the bearer structures provided in FIG. 7 is configured.

As another method, the RRC connected mode UE may transmit the uplink MBS data from the uplink transmission resource indicated by the PDCCH with an RNTI identifier (RNTI configured for MBS user data (channel) or MBS user data (channel) for a specific MBS service) suitable for the purpose (MBS control data, MBS user data, or MBS user data for a specific MBS service) of the uplink MBS data. Because the uplink MBS data nay be identified by an RNTI identifier, the uplink MBS data may not include a MAC header or a logical channel identifier. As another method, the MAC header may be included in the uplink MBS data, the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header may be configured to match the purpose (MBS control data, MBS user data, or MBS user data for a specific MBS service) of the uplink MBS data, and the uplink MBS data may be transmitted. An RLC header, a PDCP header, or an SDAP header may also be included according to which bearer structure among the bearer structures provided in FIG. 7 is configured.

In the following of the disclosure, signaling procedures for the base station or the network to support the MBS service to the UE and the UE to receive the MBS service are provided. As suggested in the following of the disclosure, the base station may provide the MBS service to the UE through one signaling procedure among various signaling procedures, or the UE may receive the MBS service.

Figure 10:
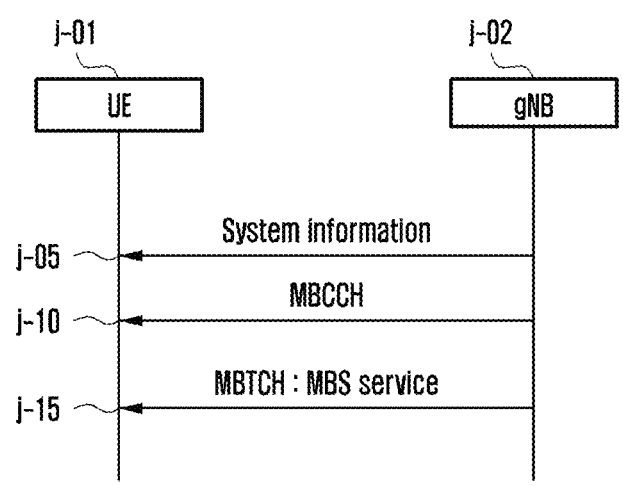
FIG. 10 is a diagram illustrating a first signaling procedure for MBS service according to various embodiments of the present disclosure.

FIG. 10 is a diagram illustrating a first signaling procedure for MBS service support according to various embodiments of the present disclosure.

The first signaling procedure for MBS service support provided in the disclosure may be characterized in that the MBS service is supported to the UE based on system information.

In FIG. 10, the UE j-01 may select a suitable cell by performing a cell selection or reselection procedure in the RRC idle mode or RRC inactive mode and camps on, then in the RRC idle mode, RRC inactive mode, or RRC connected mode, the UE may receive system information j-05, and may receive configuration information for the MBS service from the system information. The configuration information for the MBS service may include one or more of the following configuration information. For example, the network may transmit one or more of the following configuration information to support the MBS service in the system information:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information.

In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

If the configuration information for the MBS service is not broadcast in the system information in one cell camped on in the above, the UE may transmit a message or an indicator requesting to broadcast system information for the MBS service to the base station, cell, or network in one camped on cell. Upon receiving the message or indicator, the base station or the network may broadcast or transmit configuration information for the MBS service as system information. Accordingly, the base station may prevent wastage of transmission resources that may occur by always broadcasting MBS service-related system information unnecessarily in the system information.

The UE receiving the system information j-05 in the above may receive MBS data (MBS control data or MBS user data) in a transmission resource through which an MBS control data channel or an MBS user data channel for an MBS service of interest is transmitted by searching or determining the MBS service that the UE is interested in or wants to receive through storing or applying the MBS service-related configuration information. When the UE receives the system information in the above, when the UE tries to receive the service of interest or has the service of interest or decides the service of interest, when the UE is in or enters a cell or area supporting the MBS service in system information, when the UE configures or connects the MBS service (or session), when the UE receives configuration information or bearer configuration information for MBS service in system information, RRC message (e.g., RRC-Setup, RRCResume, RRCReconfiguration, RRCRelease, or a newly defined RRC message), or control message (e.g., transmitted from the MBS control data channel) for MBS channel, or when broadcast, the UE may configure a unicast bearer, a multicast bearer, or an MBS bearer for receiving the MBS service having the above-provided bearer structure.

In the above, the UE may receive MBS data (e.g., MBS control data) through the MBS control data channel j-10 or the transmission resource for the MBS service of interest to receive MBS service-related configuration information.

The MBS service-related configuration information may be transmitted including one or more of the following configuration information to support the MBS service:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted;

Configuration information for the MBS service supported by the current cell. For example, it is possible to configure or broadcast a list of MBS services, or a first identifier (e.g., temporary mobile group identity (TMGI)) or a second identifier (e.g., session identity)

for each MBS service, and each logical channel identifier, each bearer identifier, or each RNTI identifier information corresponding to the first identifier or the second identifier of each MBS service may be configured or broadcast. As another method, the first identifier (e.g., temporary mobile group identity (TMGI)) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

Upon receiving the MBS service-related configuration information in the above, the UE may receive MBS data by applying the method provided in FIG. 7 or FIG. 8 of the disclosure to receive the MBS service j-15 through the MBS user data service channel by identifying and using the first identifier, the second identifier, the RNTI identifier, or the logical channel identifier configured or allocated for the MBS service that the UE is interested in or wants to receive to receive.

Figure 11:
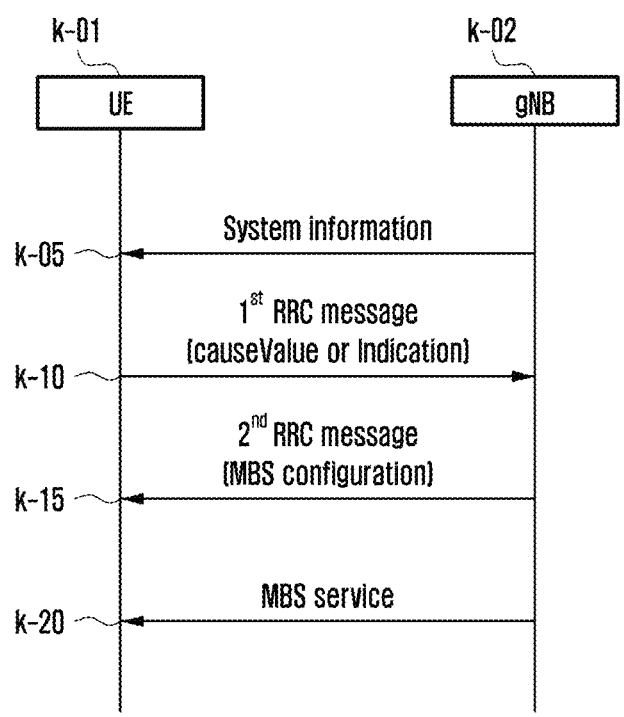
FIG. 11 is a diagram illustrating a second signaling procedure for MBS service according to various embodiments of the present disclosure.

FIG. 11 is a diagram illustrating a second signaling procedure for MBS service support according to various embodiments of the present disclosure.

The second signaling procedure for MBS service support provided in the disclosure may be characterized in identifying whether the UE is interested in or broadcasts the MBS service based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the second signaling procedure, the UE may maintain the RRC idle mode, the RRC connected mode, or the RRC inactive mode (for example, the MBS service may be received without switching the RRC mode). As another method, the UE may be characterized in indicating to the base station the MBS service that the UE is interested in or wants to receive, or transmitting an indication to receive the MBS service to the base station (or network) and entering the RRC connected mode from the RRC idle mode or RRC inactive mode to receive MBS service-related configuration information from the base station (or network). Alternatively, after receiving the MBS service-related configuration information in the above, the UE may receive the MBS service in the RRC connected mode or the MBS service in the RRC idle mode or RRC inactive mode.

In FIG. 11, the UE k-01 may select a suitable cell by performing a cell selection or reselection procedure in the RRC idle mode or RRC inactive mode and camps on, then in the RRC idle mode, RRC inactive mode, or RRC connected mode, the UE k-01 may receive system information k-05, and may receive configuration information for the MBS service from the system information. The configuration information for the MBS service may include one or more of the following configuration information.

For example, the network may transmit one or more of the following configuration information to support the MBS service in the system information:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS Control Data Channel (MBCCH), or MBS User Data Channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

If the configuration information for the MBS service is not broadcast in the system information in one cell camped on in the above, the UE k-01 may transmit a message or an indicator requesting to broadcast system information for the MBS service to the base station k-02, cell, or network in one camped on cell. Upon receiving the message or indicator, the base station k-02 or the network may broadcast or transmit configuration information for the MBS service as system information. Accordingly, the base station k-02 may prevent wastage of transmission resources that may occur by always broadcasting MBS service-related system information unnecessarily in the system information.

A UE k-01 that has received or identified MBS service-related information as the system information above, a UE that has identified that the MBS service of interest is broadcast in the current cell through the system information, or a UE k-01 that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, other existing RRC message, MAC control information, RLC control information, or PDCP control information. The UE k-01 may include an indicator that attempts to receive an MBS service in the first RRC message, or include an indicator indicating reception of the NMBS service as a reason for configuring an RRC connection with the network, or may indicate by including the first identifier or the second identifier, the logical channel identifier, the RNTI identifier, or the bearer identifier of the NBS service that the UE k-01 is interested in or that the UE intends to receive.

In the above, in the first RRC message, the UE k-01 may include an indicator indicating the type (e.g., unicast bearer or multicast bearer) or structure of a bearer that may be applied or that may be established or used for the NBS service or the type (e.g., unicast bearer or multicast bearer) or structure of a preferred bearer, or an indicator indicating in which RRC mode (RRC connected mode, RRC idle mode, or RRC disabled mode) the UE k-01 wants to receive the NBS service. Alternatively, in the above, the UE k-01 may transmit an indicator for an MBS service that is no longer interested, an NBS service that is about to stop receiving, or an NBS service that has stopped receiving or an indicator to change NBS service to another MBS service to the base station k-02, cell or network by including in the first RRC message.

In the above, the indicator included in the first RRC message by the UE k-01 may be determined or indicated based on the system information received from the step k-05. In addition, the UE k-01 may include UE capability information in the first RRC message. For example, when the UE k-01 is about to receive the NBS service, the UE k-01 may include a function supported by the UE capability, configurable configuration information, or a function or configuration information implemented in the UE in the first RRC message, and notify the base station k-02. In the above, if the UE k-01 has previously established a connection or is storing the UE identifier allocated from the network, or if the UE identifier is indicated in the upper layer (e.g., NAS layer or RRC layer), the UE k-01 may transmit the first RRC message including the UE identifier to allow the network to distinguish or identify the UE.

For example, the base station k-02 or network may identify the UE based on the UE identifier included above and retrieve and identify the UE capability information from the core network, or may retrieve and identify the configuration information of the UE from the base station with which the connection was previously configured. When the UE k-01 receives the system information in the above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station k-02 receives the first RRC message in the procedure k-10 above, the base station k-02 may identify the MBS service or UE capability information that the UE k-01 is interested in or intends to receive.

The base station k-02 or the network may transmit a second RRC message k-15 to the UE k-01 in order to support or configure the MBS service to the UE k-01 k-15. The second RRC message may be an RRC message for a newly defined MBS service, or may be defined as an RRCRelease message, an RRCReconfiguration message, or another existing RRC message.

The second RRC message may include configuration information for MBS service, configuration information for the MBS service indicated by the UE k-01 in the first RRC message, bearer configuration information, unicast bearer or multicast bearer for receiving MBS service, or MBS bearer configuration information.

The second RRC message may include one or more of the following configuration information for MBS service support and may be transmitted:
Whether to support MBS service;
Configuration information for a physical channel or downlink or uplink transport channel (e.g., MBCH, MBCCH, MBTCH, or DL-SCH) for MBS service;
Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or
Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

- Indicator configuration information indicating whether a bearer or a bearer identifier supporting (transmitting or receiving) the MBS service is a unicast bearer or a multicast bearer;
- Indicator or configuration information to transition to RRC idle mode, RRC inactive mode, or RRC connected mode;
- MBS service configuration information or bearer configuration information suggested above for receiving MBS service in RRC idle mode;
- MBS service configuration information or bearer configuration information suggested above for receiving MBS service in RRC inactive mode;
- MBS dedicated carrier or cell (Cell, SCell, or PCell) related information for MBS service (e.g., frequency, time resource, or cell identifier);
- MBS dedicated bandwidth part information (e.g., downlink bandwidth part or uplink bandwidth part information) or bandwidth part identifier information for MBS service; and/or
- Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

The UE k-01 receiving the second RRC message in the above may receive MBS data (MBS control data or MBS user data) in a transmission resource through which an MBS control data channel or an MBS user data channel for an MBS service of interest is transmitted by searching or determining the MBS service that the UE is interested in or wants to receive through storing or applying the MBS service-related configuration information. When the UE k-01 receives the system information in the above, when the UE tries to receive the service of interest or has the service of interest or decides the service of interest, when the UE is in or enters a cell or area supporting the MBS service in system information, when the UE configures or connects the MBS service (or session), when the UE receives configuration information or bearer configuration information for MBS service in system information, RRC message (e.g., RRCSetup, RRCResume, RRCReconfiguration, RRCRelease, or a newly defined RRC message), or control message (e.g., transmitted from the MBS control data channel) for MBS channel, or when broadcast, the UE may configure a unicast bearer, a multicast bearer, or an MBS bearer for receiving the MBS service having the above-provided bearer structure.

In the above, the UE k-01 may receive MBS data (e.g., MBS control data) through the MBS control data channel or the transmission resource for the MBS service of interest to receive MBS service-related configuration information.

Upon receiving the MBS service-related configuration information in the above, the UE k-01 may receive MBS data by applying the method provided in FIG. 7 or FIG. 8 of the disclosure to receive the MBS service k-20 through the MBS user data service channel by identifying and using the first identifier, the second identifier, the RNTI identifier, or the logical channel identifier configured or allocated for the MBS service that the UE is interested in or wants to receive to receive.

In the above, it may be characterized in that the ciphering procedure or the integrity protection procedure is not applied to the first RRC message or the second RRC message. As another method, in order to enhance security, it may be characterized in that the ciphering procedure or the integrity protection procedure is not applied to the first RRC message or the second RRC message, and the ciphering procedure or the integrity protection procedure is applied to the first RRC message or the second RRC message. As another method, in order to more enhance security, it may be characterized in that the ciphering procedure or the integrity protection procedure is applied to the first RRC message or the second RRC message, and the ciphering procedure or the integrity protection procedure is applied to the first RRC message or the second RRC message.

Figure 12:
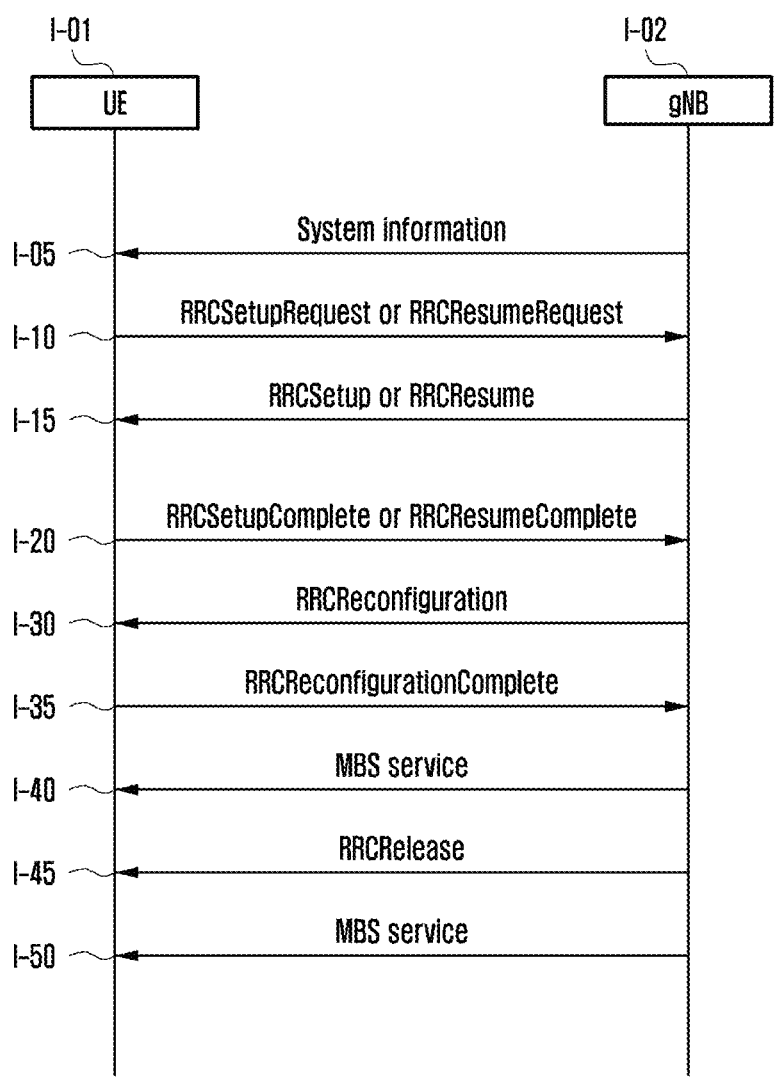
FIG. 12 is a diagram illustrating a third signaling procedure for MBS service according to various embodiments of the present disclosure.

FIG. 12 is a diagram illustrating a third signaling procedure for MBS service support according to various embodiments of the present disclosure.

The third signaling procedure for MBS service support provided in the disclosure may be characterized in identifying whether the UE is interested in or broadcasts the MBS service based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the third signaling procedure, the UE may maintain the RRC idle mode, the RRC connected mode, or the RRC inactive mode. As another method, the UE may be characterized in indicating to the base station the MBS service that the UE is interested in or wants to receive, or transmitting an indication to receive the MBS service to the base station (or network) and entering the RRC connected mode from the RRC idle mode or RRC inactive mode to receive MBS service-related configuration information from the base station (or network). Alternatively, after receiving the MBS service-related configuration information in the above, the UE may receive the MBS service in the RRC connected mode or the MBS service in the RRC idle mode or RRC inactive mode.

In FIG. 12, the UE l-01 may select a suitable cell by performing a cell selection or reselection procedure in the RRC idle mode or RRC inactive mode and camps on, then in the RRC idle mode, RRC inactive mode, or RRC connected mode, the UE may receive system information l-05, and may receive configuration information for the MBS service from the system information. The configuration information for the MBS service may include one or more of the following configuration information.

For example, the network may transmit one or more of the following configuration information to support the MBS service in the system information:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

If the configuration information for the MBS service is not broadcast in the system information in one cell camped on in the above, the UE 1-01 may transmit a message or an indicator requesting to broadcast system information for the MBS service to the base station 1-02, cell, or network in one camped on cell. Upon receiving the message or indicator, the base station 1-02 or the network may broadcast or transmit configuration information for the MBS service as system information. Accordingly, the base station 1-02 may prevent wastage of transmission resources that may occur by always broadcasting MBS service-related system information unnecessarily in the system information.

A UE 1-01 that has received or identified MBS service-related information as the system information above, a UE 1-01 that has identified that the MBS service of interest is broadcast in the current cell through the system information, or a UE 1-01 that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, or other existing RRC message. The UE may include an indicator that attempts to receive an MBS service in the first RRC message, or include an indicator indicating reception of the MBS service as a reason for configuring an RRC connection with the network.

Alternatively, in the above, if the UE 1-01 has previously established a connection or is storing the UE identifier (e.g., a UE identifier allocated from the core network (5G-S-TMSI) or a UE identifier for RRC connection resumption allocated from a base station (short I-RNTI or I-RNTI)) allocated from the network, or if the UE identifier is indicated in the upper layer (e.g., NAS layer or RRC layer), the UE may transmit the first RRC message including the UE identifier to allow the network to distinguish or identify the UE. For example, the base station 1-02 or network may identify the UE based on the UE identifier included above and retrieve and identify the UE capability information from the core network, or may retrieve and identify the configuration information of the UE or UE capability information from the base station with which the connection was previously configured. When the UE 1-01 receives the system information in the above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station 1-02 receives the first RRC message in the procedure 1-10 above, the base station 1-02 may identify the MBS service or UE capability information that the UE 1-01 is interested in or intends to receive.

The base station 1-02 or the network may transmit a second RRC message 1-15 to the UE 1-01 in order to support or configure the MBS service to the UE 1-01 1-15. The second RRC message may be an RRC message for a newly defined MBS service, or may be defined as an RRCRelease message, an RRCReconfiguration message, or another existing RRC message.

The second RRC message may include configuration information for MBS service, configuration information for the MBS service indicated by the UE 1-01 in the first RRC message, bearer configuration information, unicast bearer or multicast bearer for receiving MBS service, or MBS bearer configuration information.

The second RRC message may include one or more of the following configuration information for MBS service support and may be transmitted:
  Whether to support MBS service;
  Configuration information for a physical channel or downlink or uplink transport channel (e.g., MBCH, MBCCH, MBTCH, or DL-SCH) for MBS service;
  Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or
  Configuration information for the MBS service supported by the current cell. For example, it is possible to configure or broadcast a list of MBS services, or a first identifier (e.g., TMGI) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:
  Indicator configuration information indicating whether a bearer or a bearer identifier supporting (transmitting or receiving) the MBS service is a unicast bearer or a multicast bearer;
  MBS dedicated carrier or cell (Cell, SCell, or PCell) related information for MBS service (e.g., frequency, time resource, or cell identifier);
  MBS dedicated bandwidth part information (e.g., downlink bandwidth part or uplink bandwidth part information) or bandwidth part identifier information for MBS service; and/or
  Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

When the UE 1-01 receives the system information in the above, when the UE tries to receive the service of interest or has the service of interest or decides the service of interest, when the UE is in or enters a cell or area supporting the MBS service in system information, when the UE configures or connects the MBS service (or session), when the UE receives configuration information or bearer configuration information for MBS service in system information, RRC message (e.g., RRCSetup, RRCResume, RRCReconfiguration, RRCRelease, or a newly defined RRC message), or control message (e.g., transmitted from the MBS control data channel) for MBS channel, or when broadcast, the UE may configure a unicast bearer, a multicast bearer, or an MBS bearer for receiving the MBS service having the above-provided bearer structure.

When the UE 1-01 receives the second RRC message, the UE may apply the configuration information included in the second RRC message and transmit a third RRC message (e.g., RRCSetupComplete or RRCResumeComplete) to the base station or the network in response to the second RRC message 1-20.

In the third RRC message, the UE 1-01 may include an indicator that attempts to receive the MBS service in the first RRC message. Alternatively, the third RRC message may include an indicator indicating reception of the MBS service as a reason for configuring an RRC connection with the network, or may indicate by including the first identifier or the second identifier, the logical channel identifier, the RNTI identifier, or the bearer identifier of the MBS service that the UE 1-01 is interested in or that the UE 1-01 intends to receive. In the above, in the first RRC message, the UE 1-01 may include an indicator indicating the type (e.g., unicast bearer or multicast bearer) or structure of a bearer that may be applied or that may be established or used for the MBS service or the type (e.g., unicast bearer or multicast bearer) or structure of a preferred bearer, or an indicator indicating in which RRC mode (RRC connected mode, RRC idle mode, or RRC disabled mode) the UE 1-01 wants to receive the MBS service.

Alternatively, in the above, the UE 1-01 may transmit an indicator for an MBS service that is no longer interested, an MBS service that is about to stop receiving, or an MBS service that has stopped receiving or an indicator to change MBS service to another MBS service to the base station 1-02 by including in the first RRC message. In the above, the indicator included in the first RRC message by the UE 1-01 may be determined or indicated based on the system information received from the 1-05.

In order to support the MBS service to the UE based on the preference, the indicated indicator, or base station 1-02 implementation reported by the UE 1-01 in the above, or to configure or reconfigure a bearer for the MBS service that the UE 1-01 is receiving, or to configure or reconfigure MBS service-related configuration information, the base station may transmit the fourth RRC message (e.g., RRCReconfiguration, 1-30) to the UE 1-01. For example, the fourth RRC message may include configuration information (e.g., an indicator to switch from a unicast bearer to a multicast bearer, an indicator to switch from a multicast bearer to a unicast bearer, or corresponding bearer configuration information) for changing the bearer type, logical channel identifier information changed or updated for each MBS service, RNTI identifier information, first identifier or second identifier information for MBS service, etc.

The fourth RRC message may include the following configuration information or some of the information:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

Indicator configuration information indicating whether a bearer or a bearer identifier supporting (transmitting or receiving) the MBS service is a unicast bearer or a multicast bearer;

Indicator or configuration information to transition to RRC idle mode, RRC inactive mode, or RRC connected mode;

MBS service configuration information or bearer configuration information suggested above for receiving MBS service in RRC idle mode;

MBS service configuration information or bearer configuration information suggested above for receiving MBS service in RRC inactive mode;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

After receiving the fourth RRC message and the UE 1-01 stores or applies the MBS service related configuration information, the UE 1-01 may configure and transmit a fifth RRC message (e.g., RRCReconfigurationComplete, 1-35) to the base station 1-02 in order to indicate successful configuration or reconfiguration.

Upon receiving the MBS service-related configuration information in the above, in the RRC connected mode, the UE 1-01 may receive MBS data by applying the method provided in FIG. 7 or FIG. 8 of the disclosure to receive the MBS service 1-40 through the MBS user data service channel by identifying and using the first identifier, the second identifier, the RNTI identifier, or the logical channel identifier configured or allocated for the MBS service that the UE is interested in or wants to receive to receive.

In the above, the UE 1-01 may receive MBS data (e.g., MBS control data) through the MBS control data channel or the transmission resource for the MBS service of interest to receive MBS service-related configuration information.

In the above, in a case (e.g., according to the implementation of the base station, according to the request of the UE, or the instruction of the UE) where the base station 1-02 attempts to transition the UE 1-01 to the RRC inactive mode or the RRC idle mode, the base station 1-03 may configure and transmit a sixth RRC message (e.g., RRCRelease message, 1-45) to the UE 1-01 to make the transition to the RRC idle mode or RRC inactive mode. The sixth RRC message 1-45 may include the following configuration information or some of the information for the UE 1-01 to continue receiving MBS service even in RRC idle mode or RRC inactive mode:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

Indicator configuration information indicating whether a bearer or a bearer identifier supporting (transmitting or receiving) the MBS service is a unicast bearer or a multicast bearer;

Indicator or configuration information to transition to RRC idle mode, RRC inactive mode, or RRC connected mode;

MBS service configuration information or bearer configuration information suggested above for receiving MBS service in RRC idle mode;

MBS service configuration information or bearer configuration information suggested above for receiving MBS service in RRC inactive mode;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

Upon receiving the MBS service-related configuration information in the above, in the RRC idle mode or RRC inactive mode, the UE 1-01 may receive MBS data by applying the method provided in FIG. 7 or FIG. 8 of the disclosure to receive the MBS service 1-50 through the MBS user data service channel by identifying and using the first identifier, the second identifier, the RNTI identifier, or the logical channel identifier configured or allocated for the MBS service that the UE is interested in or wants to receive to receive.

In the above, the UE 1-01 may transmit the first RRC message 1-10 to receive the MBS service, receive the second RRC message 1-15, transmit the message of a third RRC message 1-20 again, receive the fourth RRC message, transmit the fifth RRC message, and receive the MBS service in the RRC connected mode. Alternatively, after that, the UE may receive the sixth RRC message 1-45 and receive the MBS service in RRC idle mode or RRC inactive mode.

As another method, in the above, the UE 1-01 may transmit the first RRC message 1-10 to receive the MBS service, receive the second RRC message 1-15 (switching to the RRC connected mode), transmit the message of a third RRC message 1-20 again, receive the sixth RRC message 1-45 and receive the MBS service in RRC idle mode or RRC inactive mode by switching to the RRC idle mode or the RRC inactive mode.

In the above, it may be characterized in that the ciphering procedure or the integrity protection procedure is not applied to the first RRC message or the second RRC message. As another method, in order to enhance security, it may be characterized in that the ciphering procedure or the integrity protection procedure is not applied to the first RRC message or the second RRC message, and the ciphering procedure or the integrity protection procedure is applied to the first RRC message or the second RRC message. As another method, in order to more enhance security, it may be characterized in that the ciphering procedure or the integrity protection procedure is applied to the first RRC message or the second RRC message, and the ciphering procedure or the integrity protection procedure is applied to the first RRC message or the second RRC message. In the above, the ciphering procedure or the integrity protection procedure may be applied to the third RRC message. In addition, the ciphering procedure or the integrity protection procedure may be applied to the fourth RRC message, the fifth RRC message, or the sixth RRC message.

Figure 13:
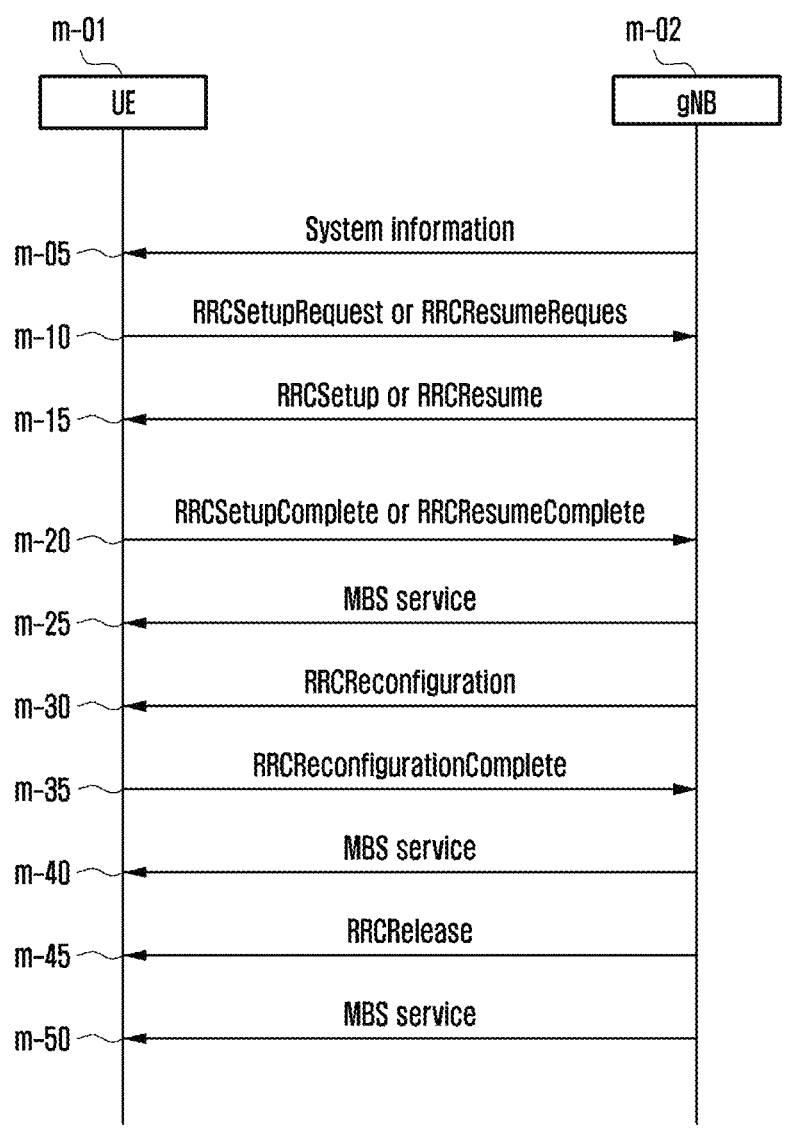
FIG. 13 is a diagram illustrating a fourth signaling procedure for MBS service according to various embodiments of the present disclosure.

FIG. 13 is a diagram illustrating a fourth signaling procedure for MBS service according to various embodiments of the present disclosure.

The fourth signaling procedure for MBS service support provided in the disclosure may be characterized in identifying whether the UE is interested in or broadcasts the MBS service based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the fourth signaling procedure, the UE may maintain the RRC idle mode, the RRC connected mode, or the RRC inactive mode. As another method, the UE may be characterized in indicating to the base station the MBS service that the UE is interested in or wants to receive, or transmitting an indication to receive the MBS service to the base station (or network) and entering the RRC connected mode from the RRC idle mode or RRC inactive mode to receive MBS service-related configuration information from the base station (or network). Alternatively, after receiving the MBS service-related configuration information in the above, the UE may receive the MBS service in the RRC connected mode or the MBS service in the RRC idle mode or RRC inactive mode.

In FIG. 13, the UE m-01 may select a suitable cell by performing a cell selection or reselection procedure in the RRC idle mode or RRC inactive mode and camps on, then in the RRC idle mode, RRC inactive mode, or RRC connected mode, may receive system information m-05. In addition, the UE m-01 and may receive configuration information for the MBS service from the system information. The configuration information for the MBS service may include one or more of the following configuration information. For example, the network (e.g., base station m-02) may transmit one or more of the following configuration information to support the MBS service in the system information:

Whether to support MBS service;
Configuration information for a physical channel or downlink or uplink transport channel (e.g., MBCH, MBCCH, MBTCH, or DL-SCH) for MBS service;
Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or
Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;
MBS dedicated carrier or cell (Cell, SCell, or PCell) related information for MBS service (e.g., frequency, time resource, or cell identifier);
MBS dedicated bandwidth part information (e.g., downlink bandwidth part or uplink bandwidth part information) or bandwidth part identifier information for MBS service; and/or
Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

If the configuration information for the MBS service is not broadcast in the system information in one cell camped on in the above, the UE may transmit a message or an indicator requesting to broadcast system information for the MBS service to the base station, cell, or network in one camped on cell. Upon receiving the message or indicator, the base station or the network may broadcast or transmit configuration information for the MBS service as system information. Accordingly, the base station may prevent wastage of transmission resources that may occur by always broadcasting MBS service-related system information unnecessarily in the system information.

A UE that has received or identified MBS service-related information as the system information above, a UE that has identified that the MBS service of interest is broadcast in the current cell through the system information, or a UE that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, or other existing RRC message. The UE may include an indicator that attempts to receive an MBS service in the first RRC message, or include an indicator indicating reception of the MBS service as a reason for configuring an RRC connection with the network, or may indicate by including the first identifier or the second identifier, the logical channel identifier, the RNTI identifier, or the bearer identifier of the MBS service that the UE is interested in or that the UE intends to receive.

In the above, in the first RRC message, the UE may include an indicator indicating the type (e.g., unicast bearer or multicast bearer) or structure of a bearer that may be applied or that may be established or used for the MBS service or the type (e.g., unicast bearer or multicast bearer) or structure of a preferred bearer, or an indicator indicating in which RRC mode (RRC connected mode, RRC idle mode, or RRC disabled mode) the UE wants to receive the MBS service. Alternatively, in the above, the UE may transmit an indicator for an MBS service that is no longer interested, an MBS service that is about to stop receiving, or an MBS service that has stopped receiving or an indicator to change MBS service to another MBS service by including the indicator for the MBS service that is no longer interested, the MBS service that is about to stop receiving, or the MBS service that has stopped receiving or the indicator to change MBS service to another MBS service in the first RRC message.

In the above, the indicator included in the first RRC message by the UE may be determined or indicated based on the system information received from the m-05. In addition, the UE may report the MBS service-related UE capability information to the base station or the network through a separate RRC message. For example, in a case where the base station transmits an RRC message asking for UE capability information to the UE, when the UE tries to receive the MBS service in response to the RRC message asking for the UE capability information, the UE may include and transmit a function supported by the UE capability, configurable configuration information, or a function or configuration information implemented in the UE in the UE capability response RRC message to the base station or the network. In the above, if the UE has previously established a connection or is storing the UE identifier (e.g., a UE identifier allocated to the core network (5G-S-TMSI) or a UE identifier for RRC connection resumption allocated from a base station (short I-RNTI or I-RNTI)) allocated from the network, or if the UE identifier is indicated in the upper layer (e.g., NAS layer or RRC layer), the UE may transmit the first RRC message including the UE identifier to allow the network to distinguish or identify the UE.

For example, the base station or network may identify the UE based on the UE identifier included above and retrieve and identify the UE capability information from the core network, or may retrieve and identify the configuration information of the UE or the UE capability information from the base station with which the connection was previously configured. When the UE receives the system information in the above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station receives the first RRC message in the procedure m-10 above, the base station may identify the MBS service or UE capability information that the UE is interested in or intends to receive.

The base station m-02 or the network may transmit a second RRC message m-15 to the UE m-01 in order to support or configure the MBS service to the UE m-01 m-15. The second RRC message may be an RRC message for a newly defined MBS service, or may be defined as an RRCRelease message, an RRCReconfiguration message, or another existing RRC message.

The second RRC message may include configuration information for MBS service, configuration information for the MBS service indicated by the UE m-01 in the first RRC message, bearer configuration information, unicast bearer or multicast bearer for receiving MBS service, or MBS bearer configuration information.

The second RRC message may include one or more of the following configuration information for MBS service support and may be transmitted:

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

The UE receiving the second RRC message in the above may receive MBS data (MBS control data or MBS user data) in a transmission resource through which an MBS control data channel or an MBS user data channel for an MBS service of interest is transmitted by searching or determining the MBS service that the UE is interested in or wants to receive through storing or applying the MBS service-related configuration information. When the UE receives the system information in the above, when the UE tries to receive the service of interest or has the service of interest or decides the service of interest, when the UE is in or enters a cell or area supporting the MBS service in system information, when the UE configures or connects the MBS service (or session), when the UE receives configuration information or bearer configuration information for MBS service in system information, RRC message (e.g., RRCSetup, RRCResume, RRCReconfiguration, RRCRelease, or a newly defined RRC message), or control message (e.g., transmitted from the MBS control data channel) for MBS channel, or when broadcast, the UE may configure a unicast bearer, a multicast bearer, or an MBS bearer for receiving the MBS service having the above-provided bearer structure.

In the above, upon receiving the second RRC message, the UE m-01 may apply the configuration information included in the second RRC message and transmit a third RRC message (e.g., RRCSetupComplete or RRCResumeComplete) to the base station m-02 or network in response thereto m-20.

In the above, the UE m-01 may receive MBS service-related configuration information from the base station m-02 by receiving MBS data (e.g., MBS control data) through the MBS control data channel or transmission resource for an MBS service of interest.

Upon receiving the MBS service-related configuration information in the above, the UE m-01 may receive MBS data by applying the method provided in FIG. 7 or FIG. 8 of the disclosure to receive the MBS service m-25 through the MBS user data service channel by identifying and using the first identifier, the second identifier, the RNTI identifier, or the logical channel identifier configured or allocated for the MBS service that the UE is interested in or wants to receive to receive.

The base station m-02 may transmit a fourth RRC message (e.g., RRCReconfiguration, m-30) to the UE m-01 in order to reconfigure the bearer for which the UE m-01 is receiving the MBS service or reconfiguration information related to the MBS service based on the preference reported by the UE m-01 or the indicated indicator or base station implementation in the above. For example, the fourth RRC message may include configuration information (e.g., an indicator to switch from a unicast bearer to a multicast bearer, an indicator to switch from a multicast bearer to a unicast bearer, or corresponding bearer configuration information) for changing the bearer type, logical channel identifier information changed or updated for each MBS service, RNTI identifier information, first identifier or second identifier information for MBS service, etc.

After receiving the fourth RRC message and the UE m-01 stores or applies the MBS service related configuration information, the UE m-01 may configure and transmit a fifth RRC message (e.g., RRCReconfigurationComplete, m-35) to the base station m-02 in order to indicate successful reconfiguration.

In the above, the UE m-01 may receive MBS data (e.g., MBS control data) through the MBS control data channel or the transmission resource for the MBS service of interest to receive MBS service-related configuration information.

Upon receiving the MBS service-related configuration information in the above, the UE m-01 may receive MBS data by applying the method provided in FIG. 7 or FIG. 8 of the disclosure to receive the MBS service m-40 through the MBS user data service channel by identifying and using the first identifier, the second identifier, the RNTI identifier, or the logical channel identifier configured or allocated for the MBS service that the UE is interested in or wants to receive to receive.

In the above, in a case (e.g., according to the implementation of the base station, according to the request of the UE, or the instruction of the UE) where the base station m-02 attempts to transition the UE m-01 to the RRC inactive mode or the RRC idle mode, the base station m-02 may configure and transmit a sixth RRC message (e.g., RRCRelease message, m-45) to the UE m-01 to make the transition to the RRC idle mode or RRC inactive mode. The sixth RRC message l-45 may include the following configuration information or some of the information for the UE m-01 to continue receiving MBS service even in RRC idle mode or RRC inactive mode.

Whether to support MBS service;

Configuration information for a physical channel or downlink or uplink transport channel (e.g., MBCH, MBCCH, MBTCH, or DL-SCH) for MBS service;

Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted; and/or Configuration information for the MBS service supported by the current cell. For example, it is possible to configure or broadcast a list of MBS services, or a first identifier (e.g., TMGI, temporary mobile group identity) or a second identifier (e.g., session identity) for each MBS service, and each logical channel identifier, each bearer identifier, or each RNTI identifier information corresponding to the first identifier or the second identifier of each MBS service may be configured or broadcast. As another method, the first identifier (e.g., TMGI, temporary mobile group identity) or the second identifier (e.g., session identity) or the RNTI identifier for the MBS service may be configured or broadcast for each bearer (or bearer identifier), each logical channel, each RLC configuration information, or each PDCP configuration information. In the above, the first identifier may indicate a public land mobile network (PLMN) serving the MBS or may indicate an MBS service type or session. In the above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcast, or transmitted.

In the bearer structure provided in FIG. 7, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK in the above, indicator configuration information indicating whether to use the RLC sequence delivery function, configuration information for the RLC reorder timer value, or indicator configuration information on whether to use the PDCP out-of-order delivery function may be included. In the above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer, or indicator configuration information on whether to use the PDCP out-of-order delivery function may be configured for each MBS service or for each bearer.

As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer;

Indicator configuration information indicating whether a bearer or a bearer identifier supporting (transmitting or receiving) the MBS service is a unicast bearer or a multicast bearer;

Indicator or configuration information to transition to RRC idle mode, RRC inactive mode, or RRC connected mode;

MBS service configuration information or bearer configuration information suggested above for receiving MBS service in RRC idle mode;

MBS service configuration information or bearer configuration information suggested above for receiving MBS service in RRC inactive mode;

MBS dedicated carrier or cell (Cell, SCell, or PCell) related information for MBS service (e.g., frequency, time resource, or cell identifier);

MBS dedicated bandwidth part information (e.g., downlink bandwidth part or uplink bandwidth part information) or bandwidth part identifier information for MBS service; and/or Indicator (in the disclosure, a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure In the above configuration information, the PDCP serial number or RLC serial number length may also be set, and as another method, a default length for the RLC serial number or PDCP serial number may be determined.

In the above configuration information, whether the RLC layer of the bearer supporting the MBS service supports or enables uni-directional communication or supports or enables bi-directional communication may also be configured as an indicator.

Upon receiving the MBS service-related configuration information in the above, the UE m-01 may receive MBS data by applying the method provided in FIG. 7 or FIG. 8 of the disclosure to receive the MBS service m-50 through the MBS user data service channel by identifying and using the first identifier, the second identifier, the RNTI identifier, or the logical channel identifier configured or allocated for the MBS service that the UE is interested in or wants to receive to receive.

In the above, the UE m-01 may transmit the first RRC message m-10 to receive the MBS service, receive the second RRC message m-15, transmit the message of a third RRC message m-20 again, receive the fourth RRC message, transmit the fifth RRC message, and receive the MBS service in the RRC connected mode. Alternatively, after that, the UE may receive the sixth RRC message m-45 and receive the MBS service in RRC idle mode or RRC inactive mode.

As another method, in the above, the UE m-01 may transmit the first RRC message m-10 to receive the MBS service, receive the second RRC message m-15 (switching to the RRC connected mode), transmit the message of a third RRC message m-20 again, receive the sixth RRC message m-45 and receive the MBS service in RRC idle mode or RRC inactive mode by switching to the RRC idle mode or the RRC inactive mode.

In the above, it may be characterized in that the ciphering procedure or the integrity protection procedure is not applied to the first RRC message or the second RRC message. As another method, in order to enhance security, it may be characterized in that the ciphering procedure or the integrity protection procedure is not applied to the first RRC message or the second RRC message, and the ciphering procedure or the integrity protection procedure is applied to the first RRC message or the second RRC message. As another method, in order to more enhance security, it may be characterized in that the ciphering procedure or the integrity protection procedure is applied to the first RRC message or the second RRC message, and the ciphering procedure or the integrity protection procedure is applied to the first RRC message or the second RRC message. In the above, a ciphering procedure or an integrity protection procedure may be applied to the third RRC message. In addition, the ciphering procedures or the integrity protection procedures may be applied to the fourth RRC message, the fifth RRC message, or the sixth RRC message.

The next-generation mobile communication system of the disclosure may support the first signaling procedure, the second signaling procedure, the third signaling procedure, or the fourth signaling procedure for supporting the MBS service provided in the disclosure.

Figure 14:
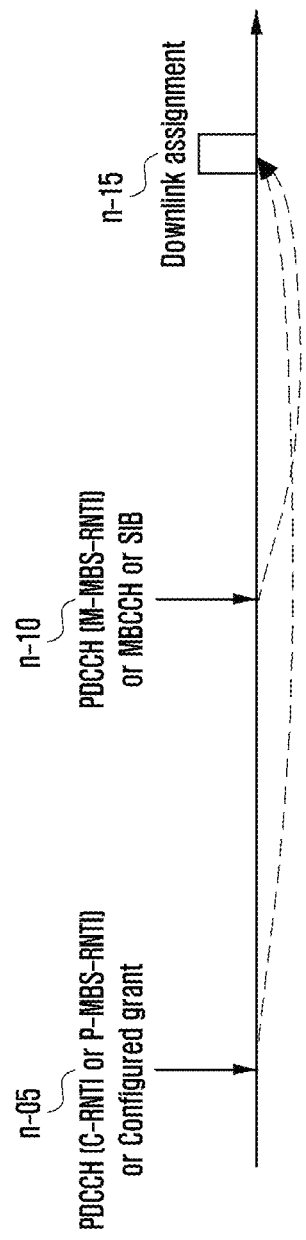
FIG. 14 illustrates a case in which normal data and MBS data collide or overlap when a UE receives a general data service and an MBS service in an RRC connected mode according to various embodiments of the present disclosure.

FIG. 14 of the disclosure illustrates a case in which normal data and MBS data collide or overlap when a UE receives a general data service and an MBS service in an RRC connected mode according to various embodiments of the present disclosure.

In FIG. 14, the RRC connected mode UE receiving the general data service or the MBS service may receive the first scheduling information n-05 for the general data service and the second scheduling information n-10 for the MBS service data.

In the above, the first scheduling information may indicate a time resource or a frequency resource through which downlink general data is transmitted in the downlink control information (DCI) of the PDCCH scrambled by the first RNTI identifier (e.g., C-RNTI, RNTI identifier for general data scheduling). As another method, in the above, the first scheduling information may be indicated as a time resource or a frequency resource configured for downlink general data transmission in the RRC message. As another method, in the above, the first scheduling information may be indicated as a periodic time resource or frequency resource configured for downlink general data transmission in the RRC message, or may be indicated by activating or deactivating the periodic time resource or frequency resource with DCI of the PDCCH.

In the above, the second scheduling information may indicate a time resource or a frequency resource through which downlink MBS service data is transmitted in the downlink control information (DCI) of the PDCCH scrambled by the second RNTI identifier (e.g., MBS-RNTI, RNTI identifier for MBS service data scheduling, or RNTI identifier for each MBS service). As another method, in the above, the second scheduling information may be indicated by a time resource or a frequency resource configured for downlink MBS service data transmission in system information or an RRC message or a control channel or control message for MBS. As another method, in the above, the second scheduling information may be indicated as a periodic time resource or frequency resource configured for downlink MBS service data transmission in system information or RRC message or a control channel or control message for MBS, or may be indicated by activating or deactivating the periodic time resource or frequency resource with DCI of the PDCCH.

In the above, when the UE receives the first scheduling information and the second scheduling information, if the downlink time resource or frequency resource indicated by the first scheduling information or the second scheduling information is the same, overlap, or conflict occurs, the UE needs a method for how to process the first scheduling information and the second scheduling information.

Accordingly, in the following of the disclosure, when the UE receives the first scheduling information and the second scheduling information, if the downlink time resource or frequency resource indicated by the first scheduling information and the second scheduling information are the same, overlap, or conflict occurs, the UE provides methods for how to process the first scheduling information and the second scheduling information.

In one embodiment of first method, if the time resource or frequency resource indicated by the first scheduling information received by the UE and the second scheduling information are the same, overlap, or conflict occurs, the UE may receive general data from the time resource or the frequency resource according to the first scheduling information. In addition, the UE may not receive or ignore the MBS service data indicated by the second scheduling information, or may not consider the second scheduling information. As another method, if a transmission resource (e.g., PUCCH) for transmitting HARQ ACK or NACK for downlink MBS service data indicated in the second scheduling information is configured or configured to transmit HARQ ACK or NACK, the UE may request retransmission by indicating that the MBS service data has not been successfully received (NACK), and the downlink MBS service data not received in the above may be received through retransmission later.

In one embodiment of second method, if the time resource or frequency resource indicated by the first scheduling information received by the UE and the second scheduling information are the same, overlap, or conflict occurs, the UE may receive MBS service data from the time resource or the frequency resource according to the second scheduling information. In addition, the UE may not receive or ignore the general data indicated by the first scheduling information, or may not consider the first scheduling information. However, the UE may request retransmission by indicating that it has not successfully received (NACK) in the transmission resource (e.g., PUCCH) transmitting the HARQ ACK or NACK for the downlink general data indicated in the first scheduling information. The UE may receive the downlink general data that has not been received in the above through retransmission later.

In one embodiment of third method, if the UE capability supports the simultaneous reception of different data in the same transmission resource with time resource or frequency resource, the UE may receive both general data or MBS service data indicated by the first scheduling information and the second scheduling information. For example, when the UE capability has a plurality of antennas or the UE satisfies a high requirement, the third method may be applied.

In one embodiment of fourth method, in the above, whether the UE performs the first method, the second method, or the third method may be configured or indicated by the base station by an indicator in the RRC message or system information.

In one embodiment of fifth method, the base station may multiplex and transmit different general data and MBS service data into one data (e.g., MAC PDU) in the same time resource or transmission resource of the same frequency resource. For example, in the transmission resource of the same time resource or the same frequency resource, the UE may receive one data (e.g., MAC PDU), and general data and MBS service data may be multiplexed in the one data. In one data, each general data may be distinguished by a logical channel identifier (e.g., identifier included in MAC header) corresponding to each general data, and each MBS service data may be distinguished by a logical channel identifier (e.g., identifier included in MAC header) corresponding to each MBS service data. In the above, when the UE receives the one data and performs data processing, the data (or by demultiplexing) corresponding to the logical channel identifier configured in the UE may be received and transmitted to an upper layer (e.g., RLC layer or upper layer) corresponding to the logical channel identifier, and data corresponding to the logical channel identifier not configured in the UE may be discarded FIG. 15 in the disclosure provides a signaling procedure for efficiently supporting an MBS service according to various embodiments of the present disclosure. For example, the disclosure provides a signaling procedure o-05 in which the UE receiving the MBS service data transmits feedback to the base station, a signaling procedure o-10) in which a UE receiving MBS service data receives an MBS service related control message from a base station, or signaling procedures o-20 and o-25 in which the base station transmits an MBS service-related control message to the UE and the UE transmits a response to the MBS service support.

Figure 15:
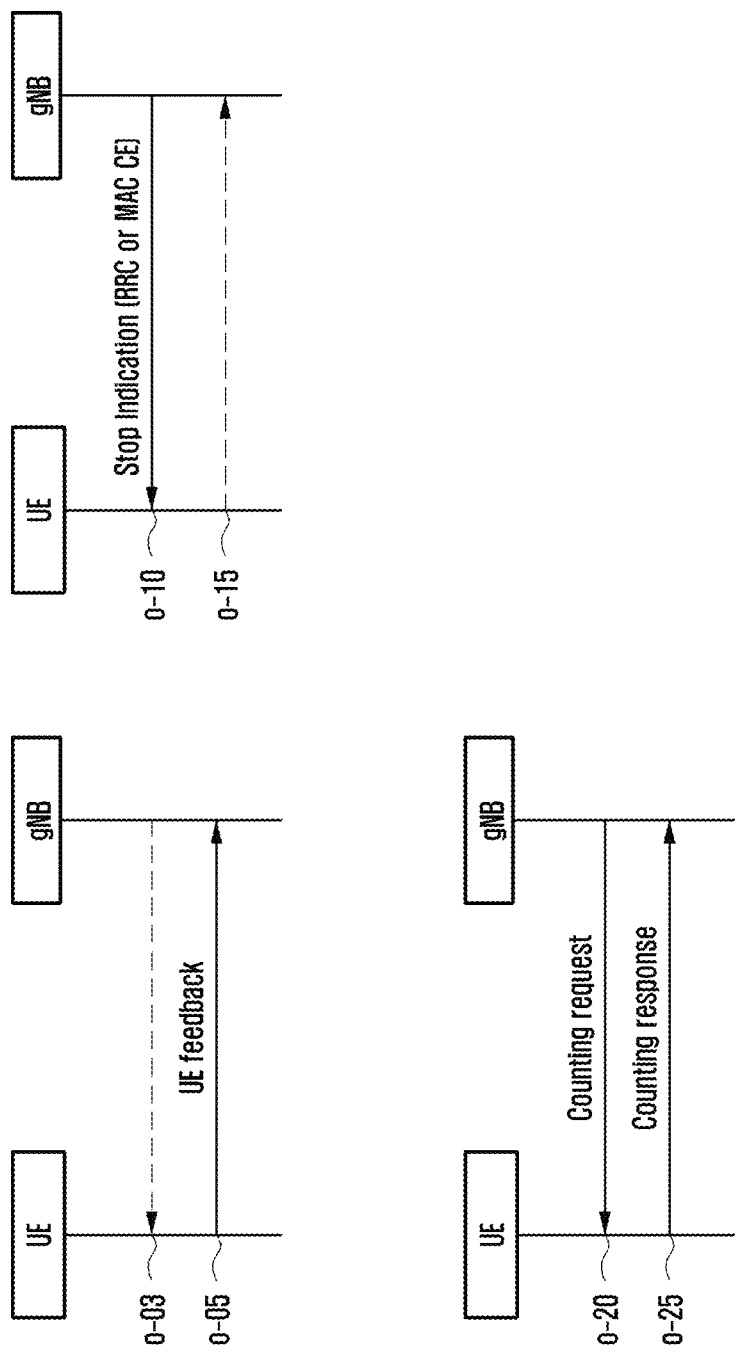
FIG. 15 illustrates a signaling procedure for efficiently supporting an MBS service according to various embodiments of the present disclosure.

In o-05 of FIG. 15, the UE receiving the MBS service data may transmit feedback or indication information of the UE for the MBS service to the network or the base station o-05. For example, when a certain event occurs, when there is a service the UE is interested in (or intend to receive), when the services the is UE interested in (or intend to receive) have changed, the UE intends to receive to stop receiving services of interest (or intend to receive), when the UE intends to stop the MBS service, or the UE intends to change the method of receiving the MBS service or the RRC mode or bearer, the UE may transmit feedback or indication information of the UE for the MBS service to the network or the base station o-05. As another method, the UE may transmit the feedback or indication information when requested by the network o-03.

In the above, the information transmitted by the UE to the base station for the MBS service may include some or a plurality of pieces of information among the following information:

Information on the MBS service that the UE is interested in or intends to receive service (e.g., a first identifier or a second identifier for the MBS service, a logical channel identifier, or an RNTI identifier or a bearer identifier);

RRC connection state preferred by the UE when receiving MBS service or receiving configuration (e.g., RRC idle mode, RRC connected mode, or RRC inactive mode);

Bearer structure or configuration information preferred by the UE when receiving or configuring an MBS service (e.g., a preference for a unicast bearer or a multicast bearer, a preference structure among the bearer structures described in FIG. 7, a preference for a function to be configured, etc.);

A type of service preferred by the UE when receiving MBS service or configuration (e.g., unicast service (dedicated service or unicast service) or multicast service (multicast or broadcast or common service);

An indicator that the UE receiving the MBS service no longer intends to receive the MBS service, an indicator to stop receiving the MBS service, an indicator to continue receiving the MBS service, an indicator for requesting a change of the MBS service to another MBS service (or a first identifier or a second identifier for another MBS service or a logical channel identifier or a bearer identifier or an RNTI identifier), or an indicator that the UE is interested in the MBS service;

An indicator indicating that the reception quality of the MBS service is good or bad from the point of view of the UE;

A changed UE feedback information if there is changed information (or updated or changed feedback) when compared with the MBS service information (or the feedback information) (e.g., an indicator for an MBS service of interest or information that may be reported by the UE provided above) last transmitted or responded to by the UE to the network; and/or An indicator that MBS service data has been successfully received or an indicator that it has not been successfully received, for example, HARQ ACK or NACK feedback.

In the above, when the UE transmits the information for the MBS service to the base station, it may be characterized in that the UE may transmit only in the RRC connected mode. For example, in a case where the base station requests the information from the UE in the RRC connected mode or the UE needs to transmit the information, the UE may configure the information in RRC message, MAC control information, RLC control information, or PDCP control information through an SRB, DRB, or MBS bearer (unicast bearer or multicast bearer) configured in the UE in the RRC connected mode and transmit the information. As another method, in a case where the base station requests the information from the UE in the RRC idle mode or RRC inactive mode or the UE needs to transmit the information, the UE may configure the information in RRC message, MAC control information, RLC control information, or PDCP control information through an SRB, DRB, or MBS bearer (unicast bearer or multicast bearer) configured in the UE in the RRC connected mode and transmit the information by establishing a connection with the network (trigger RRC connection procedure or RRC connection resume procedure) and switching to RRC connected mode.

As another method, in the above, when the UE transmits the information on the MBS service to the base station, the UE in the RRC connected mode, RRC inactive mode, or RRC idle mode may be characterized in that the UE may transmit feedback or indication information of the UE from the transmission resource indicated by the system information, the transmission resource configured by the RRC message, or the PDCCH including the RNTI identifier indicating the MBS service to the indicated transmission resource. The base station may more efficiently manage resources for the MBS service by transmitting the feedback as described above by the UE.

In o-10 of FIG. 15, the base station may transmit control information on the MBS service to UEs receiving the MBS service data. In the above, the control information for the MBS service may be transmitted through a channel or transmission resource for the MBS service, an RRC message, MAC control information, RLC control information, or PDCP control information o-10.

In the above, the control information on the MBS service may include some or a plurality of information among the following information:

An indicator to stop receiving MBS service;

An indicator that the base station stops the MBS service or an indicator to stop receiving the MBS service;

An identifier for the MBS service that the identifier intends to stop or that the identifier intends to stop receiving the service, for example, including the first identifier, the second identifier, logical channel identifier, RNTI identifier, or bearer identifier corresponding to the MBS service, which MBS service is to be stopped or which MBS service reception is to be stopped may be instructed to the UE in more detail. As another method, the control information may be indicated by transmitting the PDCCH scrambled by the RNTI identifier corresponding to the MBS service. As another method, in order to indicate a plurality of MBS services, the first identifier, the second identifier, the logical channel identifier, the RNTI identifier, or the bearer identifier may be included and transmitted in a list.

In order to indicate which MBS service is to be stopped or which MBS service reception is to be stopped to the UE in more detail, each the first identifier value or the second identifier value indicating MBS services configured in the MBS service list configured by system information or RRC message is mapped with a natural number value in an ascending order and a natural number value is inserted, or MBS service may be indicated by the bitmap by mapping each first identifier value or the second identifier value to a bitmap.

The time when MBS service reception starts to stop or the time when MBS service reception stops may be indicated in units of time (subframe or time slot or symbol). For example, in the above, it is possible to indicate what time unit from the period in which the MBS service is transmitted. As another method, in the above, it is possible to indicate how many time units after the time when the control information is received.

When the base station transmits the control information on the MBS service to the UE in the above, it may be characterized in that the base station may transmit to the UE in RRC inactive mode, RRC idle mode, or RRC connected mode. For example, the base station may transmit the information to the UE in the RRC inactive mode, RRC idle mode, or RRC connected mode by configuring the information in an RRC message, MAC control information, RLC control information, or PDCP control information through an SRB, DRB, or MBS bearer (unicast bearer or multicast bearer) configured in the UE. As another method, in the above, it may be characterized in that the base station may transmit the control information on the MBS service to the UE in the RRC connected mode, RRC inactive mode, or RRC idle mode from the transmission resource indicated by the system information, the transmission resource configured by the RRC message, or the PDCCH including the RNTI identifier indicating the MBS service to the indicated transmission resource.

In the above, if the UE receives the control information from the base station o-10, the UE may transmit the corresponding feedback to the base station as feedback information or indication information suggested in FIG. 15-05 o-15.

In the above, if the UE receives the control information from the base station o-10, if there is an MBS service that the UE is interested in, or if the UE still intends to receive the MBS service, the UE may receive the MBS configuration information again, configure the MBS configuration information again, and continue to receive the MBS service as the UE receives or requests configuration information from the base station so that the UE may receive the MBS service again by receiving MBS service-related control information again (e.g., system information, RRC message, or MBS service control message) or performing (or triggering) an RRC connection procedure or RRC connection resumption procedure as suggested in FIG. 11, 12, 13, or 14.

As another method, in the above, if the UE receives the control information from the base station o-10, if the UE is not in the RRC connected mode but is in the RRC idle mode or RRC inactive mode, if there is an MBS service that the UE is interested in, or if the UE still intends to receive the MBS service, the UE may receive the MBS configuration information again, configure the MBS configuration information again, and continue to receive the MBS service as the UE receives or requests configuration information from the base station so that the UE may receive the MBS service again by receiving MBS service-related control information again (e.g., system information, RRC message, or MBS service control message) or performing (or triggering) an RRC connection procedure or RRC connection resumption procedure as suggested in FIG. 11, 12, 13, or 14.

As described above, the base station transmits control information to the UE, so that the base station may more efficiently manage resources for the MBS service.

In o-20 and o-25 of FIG. 15, the base station may configure and transmit a message requesting whether the MBS service is being received to the UEs receiving the MBS service data to identify how many UE receive the MBS service, or a response to count the number of UEs receiving the MBS service o-20. The UE that has received a message requesting a response to count whether the MBS service is being received or the number of UEs receiving the MBS service in the above may configure a response message and transmit the response message to the base station o-25.

In the above, the message requesting a response to count whether the base station is receiving the MBS service or the number of UEs receiving the MBS service may be transmitted to the RRC idle mode, RRC inactive mode, or RRC connected mode UE, or the RRC idle mode, RRC inactive mode, or RRC connected mode UE may receive the request message. In addition, when the UE receiving the request message is in RRC idle mode, RRC inactive mode, or RRC connected mode, the UE may configure a response message to the request message and transmit the response message to the RRC message, MAC control information, RLC control information, or PDCP control information through the SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service.

As another method, in the above, the message requesting a response to count whether the base station is receiving the MBS service or the number of UEs receiving the MBS service may be transmitted to the RRC idle mode, RRC inactive mode, or RRC connected mode UE, or the RRC idle mode, RRC inactive mode, or RRC connected mode UE may receive the request message. In addition, among the UEs receiving the request message, the UEs in the RRC connected mode may configure a response message to the request message and transmit the response message to the RRC message, MAC control information, RLC control information, or PDCP control information through the SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service. As another method, among the UEs receiving the request message, the UEs in the RRC idle mode or RRC inactive mode may perform the RRC connection procedure or the RRC connection resume procedure to switch to the RRC connected mode and may transmit the response message to an RRC message, MAC control information, RLC control information, or PDCP control information through an SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service FIG. 16 is a diagram illustrating a method of indicating each MBS service for a plurality of MBS services according to various embodiments of the present disclosure.

Figure 16:
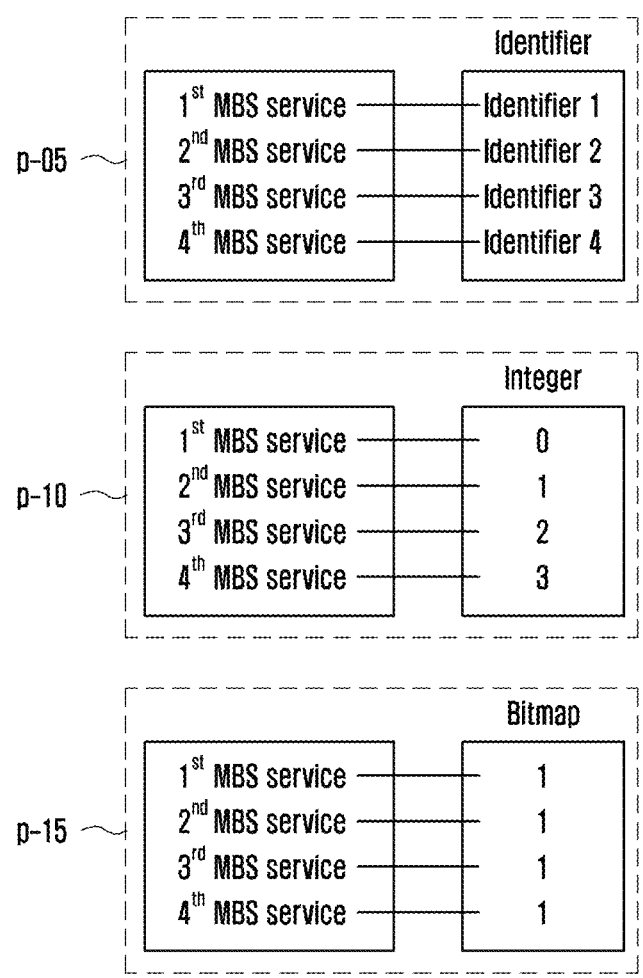
FIG. 16 is a diagram illustrating a method of indicating each MBS service for a plurality of MBS services according to various embodiments of the present disclosure.

As illustrated in p-05 in FIG. 16, each MBS service may have a mapping relationship with a first identifier or a second identifier for the MBS service, a logical channel identifier, an RNTI identifier, or a bearer identifier, or each identifier may be allocated to each MBS service.

Each MBS service may be distinguished as illustrated in p-05, and a specific MBS service may be identified and indicated by the identifier. For example, different identifiers may be mapped for different services. However, because the length of the identifiers are long, indicating each MBS service with the first identifier or the second identifier, the logical channel identifier, the RNTI identifier, or the bearer identifier as described above may not be an efficient method in terms of overhead.

In the disclosure, in the system information, RRC message, or MBS control message, as illustrated in p-10, a list of supported MBS services or a list of configured MBS services may be broadcast, promised, or configured, and an integer value may be allocated or mapped to each MBS service configured in the list for MBS services. As another method, integer values may be mapped or allocated in ascending order (or in descending order) of each identifier value for the MBS service included in the list for the MBS services. In addition, when indicating a specific MBS service, the overhead may be reduced by indicating a specific MBS service with an integer value. For example, in a case of indicating a plurality of MBS services, the plurality of MB S services may be indicated by including each integer value for the plurality of MBS services or by including an integer value in the list.

As another method, in the disclosure, in the system information, RRC message, or MBS control message, as illustrated in p-15, a list of supported MBS services or a list of configured MBS services may be broadcast, promised, or configured, and each MBS service configured in the list for the MBS services may be allocated or mapped to each bit of the bitmap. As another method, each bit of the bitmap may be mapped or allocated in ascending order (or in descending order) of each identifier value for the MBS service included in the list for the MBS services. In addition, when indicating a specific MBS service, the overhead may be reduced by indicating a specific MBS service with each bit of the bitmap (for example, each service may be indicated with a value of 1 or 0). For example, in a case of indicating a plurality of MBS services, the plurality of MBS services may be indicated by configuring bit values for the plurality of MBS services or in the bitmap.

The method of indicating each MBS service in FIG. 16 may be utilized or extended and applied in various signaling methods of the disclosure.

For example, in o-20 and o-25 of FIG. 15, the base station may configure and transmit a message requesting whether the MBS service is being received to the UEs receiving the MBS service data to identify how many UE receive the MBS service, or a response to count the number of UEs receiving the MBS service, and when the UE that has received a message requesting a response may configure a response message and transmit the response message to the base station, the following may be applied.

Specifically, a message requesting whether the MBS service is being received or a response to count the number of UEs receiving the MBS service and a response message thereof may be configured or generated by one of the following methods.

Method 1: As illustrated in p-05 in FIG. 16, each MBS service may have a mapping relationship with a first identifier or a second identifier for the MBS service, a logical channel identifier, an RNTI identifier, or a bearer identifier, or each identifier may be allocated to each MBS service. In the same method as in p-05, the base station may configure a list of the identifiers corresponding to MBS services that the identifiers intend to know how many UEs receive the MBS service, and include the list in a request message and transmit the list to the UE. The request message may be transmitted to UEs receiving the MBS service or may be received by UEs receiving the MBS service, and UEs receiving each MBS service included in the request message may respond to the request by configuring whether the UEs are interested or receiving the MBS service in the response message. As another method, when configuring the request message in the above, by applying the method as illustrated in p-10, an integer value may be allocated or mapped to each MBS service in the list for MBS services configured by system information, RRC message, or MBS control message. For example, integer values may be mapped or allocated in ascending order (or in descending order) of each identifier value for MBS services included in the list of MBS services.

In addition, when indicating MBS services that intend to know how many UEs receive MBS services in the request message, MBS services that want to know how many UEs receive the MBS service may be indicated by including the mapped or allocated integer value(s) in the request message or in the list. As another method, when configuring the request message in the above, by applying the method as illustrated in p-15, the UE may allocate or map each MBS service to each bit of the bitmap in the list for MBS services configured with system information, RRC message, or MBS control message. For example, each bit of the bitmap may be mapped or allocated in ascending order (or in descending order) of each identifier value for the MBS service included in the list for the MBS services. In addition, when indicating MBS services to know how many UEs receive the MBS service in the request message, the overhead may be reduced by indicating a specific MBS service with each bit of the bitmap (for example, each service may be indicated with a value of 1 or 0).

In addition, in a case of indicating a plurality of MBS services, the plurality of MBS services may be indicated by configuring bit values for the plurality of MBS services or in the bitmap. The UEs receiving each MBS service included in the request message may respond to the request by configuring whether the UEs are interested or receiving the MBS service in the response message. When configuring the response message in the above, because each MBS service may have a mapping relationship with a first identifier or a second identifier, a logical channel identifier, an RNTI identifier, or a bearer identifier for the MBS service in a list of MBS services included in the request message, system information, an RRC message, or a list of MBS services configured by an MBS control message, the UE may configure the identifiers corresponding to the MBS services that the UE is interested in or intends to receive in a list, include the list in a response message, and transmit the list to the base station by applying the method as illustrated in p-05. When configuring the response message in the above, in a list of MBS services included in the request message, system information, an RRC message, or a list of MBS services configured by an MBS control message, the UE may allocate or map an integer value to each MBS service by applying the method as illustrated in p-10.

For example, integer values may be mapped or allocated in ascending order (or in descending order) of each identifier value for MBS services included in the list of MBS services. In addition, when indicating the MBS service that the UE is interested in or intends to receive in the response message, the UE may indicate to the base station the MBS services that the UE is interested in or intends to receive by including the mapped or allocated integer value(s) in the response message or in the list, thereby reducing overhead. In addition, in a case of indicating a plurality of MBS services, the plurality of MBS services may be indicated by including each integer value for the plurality of MBS services or by including an integer value in the list. As another method, when composing a response message by applying the method illustrated in p-15 in the above, the UE may allocate or map each MBS service to each bit of the bitmap in the list of MBS services included in the request message or the list of MBS services configured with system information, RRC message, or MBS control message.

For example, each bit of the bitmap may be mapped or allocated in ascending order (or in descending order) of each identifier value for the MBS service included in the list for the MBS services. In addition, when indicating MBS services that the UE is interested in or intends to receive in the request message, the overhead may be reduced by indicating a specific MBS service with each bit of the bitmap (for example, each service may be indicated with a value of 1 or 0). In addition, in a case of indicating a plurality of MBS services, the plurality of MBS services may be indicated by configuring bit values for the plurality of MBS services or in the bitmap.

In one embodiment of Method 2, the base station may configure and transmit a request message to the UEs to configure and send the MBS service that the UEs are interested in or intend to receive in a request message may be transmitted to the UEs. The request message may be transmitted to UEs receiving the MBS service or may be received by UEs receiving the MBS service, and the request message may include an indicator for transmitting by configuring in the response message whether the UEs receiving the MBS service are interested in or receiving the MBS service. The UEs receiving each MBS service included in the request message may respond to the request by configuring whether the UEs are interested or receiving the MBS service in the response message. When configuring the response message in the above, because each MBS service may have a mapping relationship with a first identifier or a second identifier, a logical channel identifier, an RNTI identifier, or a bearer identifier for the MBS service in system information, an RRC message, or a list of MBS services configured by an MBS control message, the UE may configure the identifiers corresponding to the MBS services that the UE is interested in or intends to receive in a list, include the list in a response message, and transmit the list to the base station by applying the method as illustrated in p-05.

As another method, when configuring the response message in the above, in system information, an RRC message, or a list of MBS services configured by an MBS control message, the UE may allocate or map an integer value to each MBS service by applying the method as illustrated in p-10. For example, integer values may be mapped or allocated in ascending order (or in descending order) of each identifier value for MBS services included in the list of MBS services. In addition, when indicating the MBS service that the UE is interested in or intends to receive in the response message, the UE may indicate to the base station the MBS services that the UE is interested in or intends to receive by including the mapped or allocated integer value(s) in the response message or in the list, thereby reducing overhead. In addition, in a case of indicating a plurality of MBS services, the plurality of MBS services may be indicated by including each integer value for the plurality of MBS services or by including an integer value in the list.

As another method, when composing a response message by applying the method illustrated in p-15 in the above, the UE may allocate or map each MBS service to each bit of the bitmap in the list of MBS services configured with system information, RRC message, or MBS control message. For example, each bit of the bitmap may be mapped or allocated in ascending order (or in descending order) of each identifier value for the MBS service included in the list for the MBS services. In addition, when indicating MBS services that the UE is interested in or intends to receive in the response message, the overhead may be reduced by indicating a specific MBS service with each bit of the bitmap (for example, each service may be indicated with a value of 1 or 0). In addition, in a case of indicating a plurality of MBS services, the plurality of MBS services may be indicated by configuring bit values for the plurality of MBS services or in the bitmap.

The methods p-05, p-10, and p-15 for indicating the MBS service in FIG. 16 may be extended and applied when indicating an MBS service of interest or configuring MBS service configuration information in the disclosure. For example, the methods may be extended and applied to the methods provided in FIG. 10, 11, 12, 13, or 15. The configuration information configured in the system information or the RRC message provided in the disclosure may include first discontinuous reception (DRX) configuration information (e.g., period, on-duration, offset, etc.) for a general data service. Accordingly, the UE may save UE power by monitoring the PDCCH in a specific section or not monitoring the PDCCH in a specific section based on the first DRX configuration information for the general data service.

The configuration information configured in the system information, the RRC message, or the MBS control data provided in the disclosure for the MBS service may include second discontinuous reception (DRX) configuration information (e.g., period, on-duration, offset, etc.) for an MBS service. Accordingly, the UE may save UE power by monitoring the PDCCH in a specific section or not monitoring the PDCCH in a specific section based on the second DRX configuration information for the general data service.

As described above, the base station may configure the first discontinuous reception (DRX) configuration information for the general data service or second DRX configuration information for the MBS service to the UE, and in a case where the first DRX configuration information or the second DRX configuration information is configured, the UE may independently operate the first DRX and the second DRX, and transmit or receive data accordingly. For example, when receiving or transmitting general data, the UE may operate the first DRX based on the first DRX configuration information to save power by reading or not reading the PDCCH. In addition, when receiving or transmitting MBS service data, the UE may operate the second DRX based on the second DRX configuration information to save power by reading or not reading the PDCCH.

As another method, when the UE receives the MBS service in the RRC connected mode, the first DRX and the second DRX may be operated, and data may be transmitted or received accordingly. For example, when receiving or transmitting general data, the UE may operate the first DRX based on the first DRX configuration information to save power by reading or not reading the PDCCH. In addition, when receiving or transmitting MBS service data, the UE may operate the second DRX based on the second DRX configuration information to save power by reading or not reading the PDCCH. In a case where the UE receives the MBS service in the RRC idle mode or RRC inactive mode, the second DRX may be operated, and data may be transmitted or received accordingly. For example, when receiving or transmitting MBS service data, the UE may operate the second DRX based on the second DRX configuration information to save power by reading or not reading the PDCCH. As another method, the UE may periodically wake up or activate to read the paging message by operating third DRX configuration information for receiving the paging message in the RRC idle mode or the RRC inactive mode to monitor the PDCCH of the base station.

Figure 17:
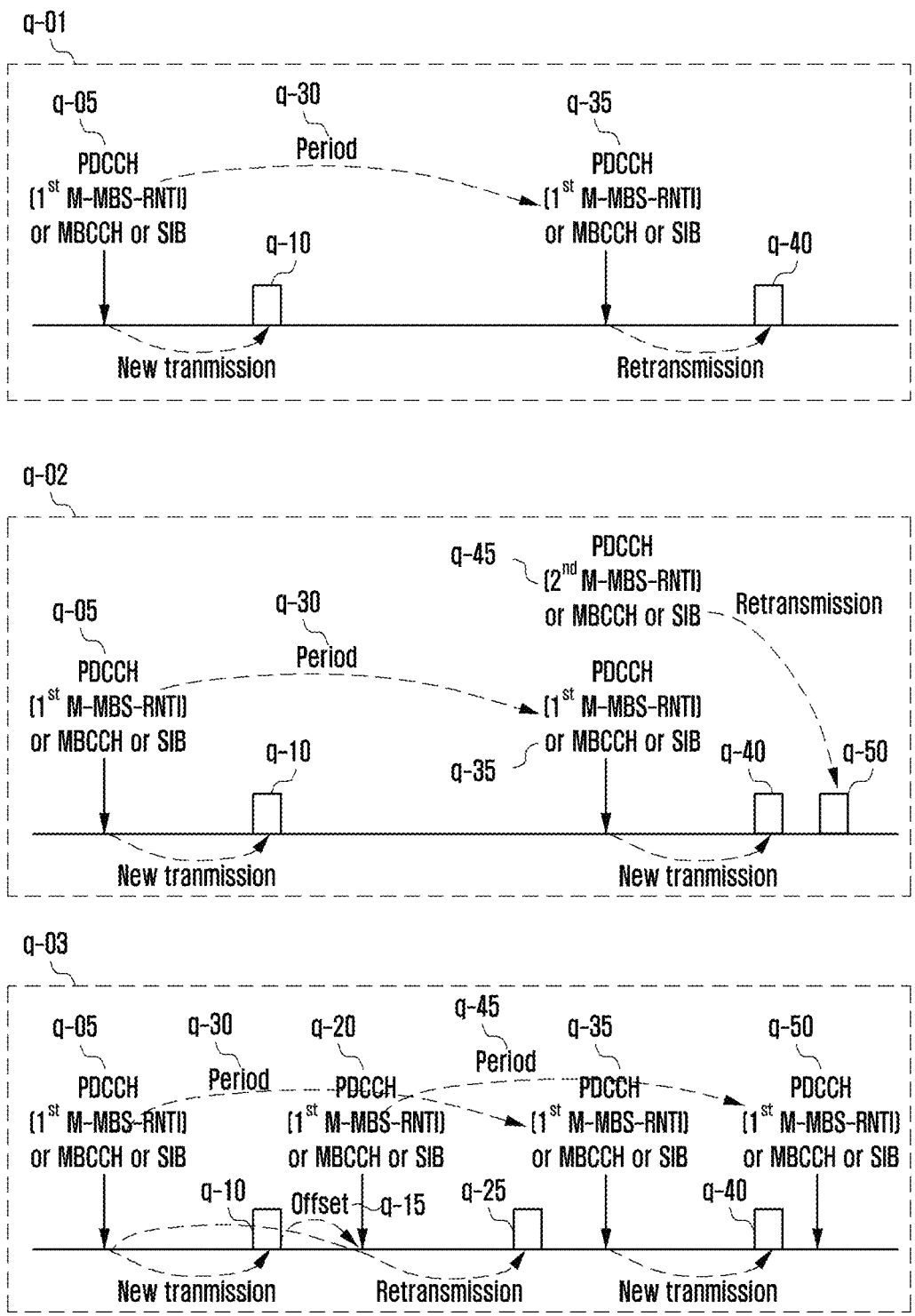
FIG. 17 is a diagram illustrating a method of retransmitting MBS service data according to various embodiments of the present disclosure.

FIG. 17 is a diagram illustrating a method of retransmitting MBS service data according to various embodiments of the present disclosure.

In FIG. 17, as suggested in the disclosure above (e.g., FIG. 7, FIG. 11, FIG. 12, or FIG. 13), in a case where the HARQ reordering or RLC reordering function, HARQ ACK or NACK transmission function, or HARQ process or HARQ retransmission function is configured by system information, RRC message, or MBS control message for the MBS service or a bearer supporting the MBS service, when receiving MBS service data, if MBS service data is not successfully received in the transmission resource indicated by the PDCCH (e.g., PDCCH scrambled by RNTI identifier for MBS service) or the transmission resource q-05 and q-10 (configuration information (period, on-duration (length of interval to read PDCCH), or offset) for separate DRX for time resource, frequency resource, period, offset, or MBS service as a transmission resource for MBS service configured in system information or RRC message) periodically configured for the MBS service, the UE may indicate NACK in the transmission resource (e.g., PUCCH) indicated by the PDCCH or the transmission resource configured in the system information, the RRC message, or the MBS control message. As another method, when the MBS service data is successfully received in the transmission resource indicated by the PDCCH (e.g., PDCCH scrambled by RNTI identifier for MBS service) or the periodically configured MBS service data, the ACK may be indicated.

In the above, a transmission resource periodically configured for the MBS service may be activated (or used) or deactivated (or stopped) by an RRC message, MAC control information, or an indicator of PDCCH. In the above, the transmission resource configuration information periodically configured for the MBS service to the UE may be stored and maintained even if the periodic transmission resource is deactivated by the RRC message, MAC control information, or PDCCH indicator. As another method, in the above, the transmission resource configuration information periodically configured for the MBS service to the UE may be released or discarded when the periodic transmission resource is deactivated by the RRC message, MAC control information, or PDCCH indicator.

As another method, in the above, the base station or the network may allocate different periodic transmission resources to a plurality of MBS services with an RRC message, and may instruct the UE to activate or deactivate with an indicator of MAC control information or an MBS service identifier (primary identifier, secondary identifier, logical channel identifier, or bearer identifier) in order to activate or deactivate the periodic transmission resource of each MBS service, or may activate or deactivate the periodic transmission resource of each MAC service as an indicator or bitmap (for example, it may be mapped in ascending order of identifiers) in the PDCCH. In the above, the transmission resource configuration information periodically configured for the MBS service to the UE may be stored and maintained even if the periodic transmission resource is deactivated by the RRC message, MAC control information, or PDCCH indicator. As another method, in the above, the transmission resource configuration information periodically configured for the MBS service to the UE may be released or discarded when the periodic transmission resource is deactivated by the RRC message, MAC control information, or PDCCH indicator.

As another method, in the above, when the MBS service data is not successfully received in the transmission resource indicated by the PDCCH (e.g., PDCCH scrambled by RNTI identifier for MBS service) or the periodically configured MBS service data, the UE may indicate to the base station which UE did not successfully receive the MBS service data, including an indicator or UE identifier indicating the UE with MAC control information, RLC control information, and PDCP control information. As another method, in a transmission resource preconfigured for each UE, each UE may indicate NACK to indicate to the base station which UE did not successfully receive the MBS service data.

In the above, the base station may configure the transmission resource indicating whether the UE has successfully received (ACK) or not received (NACK) the MBS service data as a common transmission resource for the UEs receiving the MBS service. In addition, the base station may perform retransmission on the MBS service data when at least one UE indicates NACK in the common transmission resource or when a certain UE indicates NACK. As another method, in a case where the MBS service data is not successfully received in the above, if a UE indicates to the base station the MBS service data has not been successfully received, the base station may perform retransmission only to the UE.

In the above, the base station may apply one of the following methods or a combination of the following methods to perform retransmission on MBS service data.

In one embodiment of retransmission method 1, in the above, the base station may transmit MBS service data in a transmission resource (time resource, frequency resource, subcarrier interval, DRX configuration information, etc.) or a set period configured by system information, RRC message, or MBS control data, or may indicate an MBS service data transmission resource with a PDCCH scrambled by an RNTI identifier indicating MBS service data, and transmit data from the transmission resource q-05, q-10, q-30, and q-35. In the above, the UE may receive MBS service data in a transmission resource (time resource, frequency resource, subcarrier interval, DRX configuration information, etc.) or a set period configured by system information, RRC message, or MBS control data, or may receive indication for an MBS service data transmission resource with a PDCCH scrambled by an RNTI identifier indicating MBS service data, and receive data from the transmission resource q-05, q-10, q-30, and q-35.

In the above, in a case where the UE does not successfully receive the MBS service data, the UE may indicate NACK in the transmission resource (e.g., PUCCH) indicated by the PDCCH, the transmission resource configured in the system information, the RRC message, or the MBS control message. In the above, when the base station receives an indication that the MBS service data has not been successfully received from a certain UE, the base station may perform a retransmission procedure. In the above, the retransmission procedure may be retransmit the MBS service data from the transmission resource (time resource, frequency resource, subcarrier interval, DRX configuration information, etc.) configured by system information, RRC message, or MBS control data or the configured period, or may indicate an MBS service data transmission resource with a PDCCH scrambled by an RNTI identifier indicating MBS service data and retransmit data from the transmission resource.

When performing the retransmission procedure in the above, the base station may transmit including an indicator indicating retransmission in PDCCH or MBS control data or RRC message indicating the transmission resource q-35 and q-40. For example, the base station may indicate whether to toggle the new data indicator (NDI) identifier (indicates new transmission if the NDI indicator is changed or retransmission if the NDI indicator has not changed). As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission.

In the above, when the UE receives MBS service data in system information, RRC message, transmission resource (time resource, frequency resource, subcarrier interval, DRX configuration information, etc.) configured by MBS control data, or in a configured period, or instructed for MBS service data transmission resources with a PDCCH scrambled by an RNTI identifier indicating MBS service data, if an indicator indicating retransmission is included or if retransmission is indicated, if the UE does not successfully receive the previously received MBS service data, the UE may receive the retransmission of the MBS service data, or if the UE successfully receives the previously received MBS service data, the UE may ignore or not receive the data or discard the data even if the UE receives the data (for example, the data may be discarded with a duplicate detection procedure in the MAC layer, the RLC layer, or the PDCP layer).

In one embodiment of retransmission method 2, in the above, the base station may transmit MBS service data in a transmission resource (time resource, frequency resource, subcarrier interval, DRX configuration information, etc.) or a set period configured by system information, RRC message, or MBS control data, or may indicate an MBS service data transmission resource with a PDCCH scrambled by an RNTI identifier indicating MBS service data, and transmit data from the transmission resource q-05, q-10, q-30, and q-35. In the above, the UE may receive MBS service data in a transmission resource (time resource, frequency resource, subcarrier interval, DRX configuration information, etc.) or a set period configured by system information, RRC message, or MBS control data, or may receive indication for an MBS service data transmission resource with a PDCCH scrambled by an RNTI identifier indicating MBS service data, and receive data from the transmission resource q-05, q-10, q-30, and q-35.

In the above, in a case where the UE does not successfully receive the MBS service data, the UE may indicate NACK in the transmission resource (e.g., PUCCH) indicated by the PDCCH, the transmission resource configured in the system information, the RRC message, or the MBS control message. In the above, when the base station receives an indication that the MBS service data has not been successfully received from a certain UE, the base station may perform a retransmission procedure. In the above, the retransmission procedure may be retransmit the MBS service data from the transmission resource (time resource, frequency resource, subcarrier interval, DRX configuration information, etc.) configured by system information, RRC message, or MBS control data or the configured period, or may indicate an MBS service data transmission resource with a PDCCH scrambled by an RNTI identifier indicating MBS service data and retransmit data from the transmission resource.

As another method, the base station may transmit MBS control data in a transmission resource (time resource, frequency resource, subcarrier interval, DRX configuration information, etc.) configured with system information, RRC message, MBS control data, or in a set period, or when indicating MBS service data transmission resource with PDCCH scrambled by RNTI identifier indicating MBS service data The base station may simultaneously indicate new MBS service data and retransmitted MBS service data with a plurality of PDCCHs (for example, a PDCCH scrambled by an RNTI identifier for new transmission or including an indicator indicating new transmission and a PDCCH scrambled by an RNTI identifier for retransmission or a PDCCH including an indicator indicating retransmission) or a plurality of RNTI identifiers (for example, scrambled by an RNTI identifier for new transmission or an indicator indicating new transmission and scrambled by an RNTI identifier for retransmission or an indicator indicating retransmission) or a plurality of MBS control data (indicates new transmission or retransmission) in the above, and may indicate a transmission resource through which new data is transmitted or retransmitted data is retransmitted to different transmission resources q-35, q-45, q-40, and q-50. When performing the retransmission procedure in the above, the base station may transmit including an indicator indicating retransmission in PDCCH or MBS control data or RRC message indicating the transmission resource q-35 and q-40. For example, the base station may indicate whether to toggle the new data indicator (NDI) identifier (indicates new transmission if the NDI indicator is changed or retransmission if the NDI indicator has not changed).

As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission. In the above, when the UE receives a plurality of MBS control data in system information, RRC message, transmission resource (time resource, frequency resource, subcarrier interval, DRX configuration information, etc.) configured by MBS control data, or in a configured period, or instructed for MBS service data transmission resources with a PDCCH scrambled by an RNTI identifier indicating a plurality of MBS service data, if an indicator indicating retransmission is included or if retransmission is indicated, if the UE does not successfully receive the previously received MBS service data, the UE may receive the retransmission of the MBS service data, or in a case where the new transmission is indicated in the above, the UE may also receive new data. Alternatively, if the UE successfully receives the previously received MBS service data, the UE may ignore or not receive the data for retransmission, or discard the data even if the UE receives the data (for example, the data may be discarded with a duplicate detection procedure in the MAC layer, the RLC layer, or the PDCP layer), or in a case where the new transmission is indicated in the above, the UE may also receive new data q-40 and q-50.

In one embodiment of retransmission method 3, in the above, the base station may transmit MBS service data in a transmission resource (time resource, frequency resource, subcarrier interval, DRX configuration information, etc.) or a set period configured by system information, RRC message, or MBS control data, or may indicate an MBS service data transmission resource with a PDCCH scrambled by an RNTI identifier indicating MBS service data, and transmit data from the transmission resource q-05, q-10, q-30, and q-35. In the above, the UE may receive MBS service data in a transmission resource (time resource, frequency resource, subcarrier interval, DRX configuration information, etc.) or a set period configured by system information, RRC message, or MBS control data, or may receive indication for an MBS service data transmission resource with a PDCCH scrambled by an RNTI identifier indicating MBS service data, and receive data from the transmission resource q-05, q-10, q-30, and q-35. In the above, in a case where the UE does not successfully receive the MBS service data, the UE may indicate NACK in the transmission resource (e.g., PUCCH) indicated by the PDCCH, the transmission resource configured in the system information, the RRC message, or the MBS control message.

In the above, when the base station receives an indication that the MBS service data has not been successfully received from a certain UE, the base station may perform a retransmission procedure. In the above, the transmission procedure for new data may be retransmit the MBS service data from the transmission resource (time resource, frequency resource, subcarrier interval, DRX configuration information, etc.) configured by system information, RRC message, or MBS control data or the configured period, or may indicate an MBS service data transmission resource with a PDCCH scrambled by an RNTI identifier indicating MBS service data and retransmit data from the transmission resource q-05, q-10, q-35, and q-40.

In the above, the retransmission procedure for data retransmission may transmit MBS control data in a separately configured transmission resource (time resource, frequency resource, subcarrier interval, DRX configuration information, offset, period, or new data transmission resource, offset with the period, period, etc. q-15 and q-45 configured to indicate a new data transmission resource) or in a configured period by configuring a separate transmission resource for retransmission in system information, RRC message, or MBS control data, or may indicate MBS service data to be retransmitted as PDCCH (e.g., scrambled by an RNTI identifier for retransmission, scrambled by an RNTI identifier for PDCCH, or MBS service including an indicator indicating retransmission), RNTI identifiers (e.g., an indicator scrambled by an RNTI identifier for retransmission or indicating retransmission), or MBS control data (indicate retransmission) for retransmission when indicating MBS service data transmission resource with PDCCH scrambled by RNTI identifier indicating MBS service data, and may indicate a transmission resource through which retransmitted data is retransmitted q-20, q-25, and q-50. When performing the retransmission procedure in the above, the base station may transmit including an indicator indicating retransmission in PDCCH or MBS control data or RRC message indicating the transmission resource q-35 and q-40.

For example, the base station may indicate whether to toggle the new data indicator (NDI) identifier (indicates new transmission if the NDI indicator is changed or retransmission if the NDI indicator has not changed). As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission. In the above, when the UE receives MBS service data in system information, RRC message, transmission resource (time resource, frequency resource, subcarrier interval, DRX configuration information, etc.) configured by MBS control data, or in a configured period, or instructed for MBS service data transmission resources with a PDCCH scrambled by an RNTI identifier indicating MBS service data, if the UE does not successfully receive the previously received MBS service data, the UE may be instructed to receive and may receive the retransmission of the MBS service data in a separate transmission resource (time resource, frequency resource, subcarrier interval, DRX configuration information, offset, period, or new data transmission resource, offset with the period, period, etc. q-15 and q-45 configured to indicate a new data transmission resource) configured for retransmission in system information, RRC message, or MBS control data or in a configured period.

Alternatively, if the UE successfully receives the previously received MBS service data, the UE may ignore or not receive the indication or data in a separate transmission resource configured for retransmission, or discard the indication or data even if the UE receives the indication or data (for example, the indication or data may be discarded with a duplicate detection procedure in the MAC layer, the RLC layer, or the PDCP layer). Alternatively, in the transmission resource configured for new transmission, new MBS service data transmission may be indicated and received q-20, q-25, q-35, and q-40.

In one embodiment of retransmission method 4, in the above, when transmitting new data or when using the first retransmission method, the second retransmission method, or the third retransmission method, it may be applied in multicast bearer or multicast MBS service support, or unicast bearer or unicast MBS service support. As another method, in the above, when transmitting new data or when using the first retransmission method, the second retransmission method, or the third retransmission method, it may be applied in multicast bearer or multicast MBS service support. As another method, in the above, when transmitting new data, it may be applied in multicast bearer or multicast MBS service support, and when applying the first retransmission method, the second retransmission method, or the third retransmission method for retransmission, it may be applied in unicast bearer or unicast MBS service support. For example, a procedure for retransmission may be applied and performed only to UEs that have not successfully received MBS service data.

In the following of the disclosure, when the UE receiving the MBS service stops the MBS service, when the UE does not want to receive the MBS service anymore, when the UE tries to release the bearer for receiving the MBS service, or when the UE releases the MBS bearer according to the configuration of the base station or the indication of the RRC message or the MBS control message, one method or a combined method among the following methods is provided as a reception operation of the UE.

Method 1: When releasing the MBS bearer (e.g., unicast bearer or multicast bearer) or receiving an instruction to release the MBS bearer, the UE may discard all the stored data if there is MBS service data stored (or if there is any data that has not yet been delivered to the upper layer) in the MBS bearer (e.g., MAC layer, RLC layer, or PDCP layer) and then may release the MBS bearer;

Method 2: When releasing the MBS bearer (e.g., unicast bearer or multicast bearer) or receiving an instruction to release the MBS bearer, the UE may perform data processing and transmit the data to the upper layer (for example, it may be delivered to the upper layer in the order of receipt or ascending serial number) if there is MBS service data stored (or if there is any data that has not yet been delivered to the upper layer) in the MBS bearer (e.g., MAC layer, RLC layer, or PDCP layer) and then may release the MBS bearer;

Method 3: When releasing the MBS bearer (e.g., unicast bearer or multicast bearer) or receiving an instruction to release the MBS bearer, the UE may perform data processing and transmit the data to the upper layer (for example, it may be delivered to the upper layer in the order of receipt or ascending serial number) if the reorder function is configured or performs the reorder function, the reorder timer may be stopped or reset, or if there is MBS service data stored (or if there is any data that has not yet been delivered to the upper layer) in the MBS bearer (e.g., MAC layer, RLC layer, or PDCP layer) and then may release the MBS bearer; and/or Method 4: When releasing the MBS bearer (e.g., unicast bearer or multicast bearer) or receiving an instruction to release the MBS bearer, the UE may perform a header decompression procedure on the MBS service data (for example, if the header decompression procedure has not been performed) and transmit the data to the upper layer (for example, it may be delivered to the upper layer in the order of receipt or ascending serial number) if the reorder function is configured or performs the reorder function or if header compression procedure (or data compression procedure) is configured, the reorder timer may be stopped or reset, or if there is MBS service data stored (or if there is any data that has not yet been delivered to the upper layer) in the MBS bearer (e.g., MAC layer, RLC layer, or PDCP layer) and then may release the MBS bearer.

Figure 18:
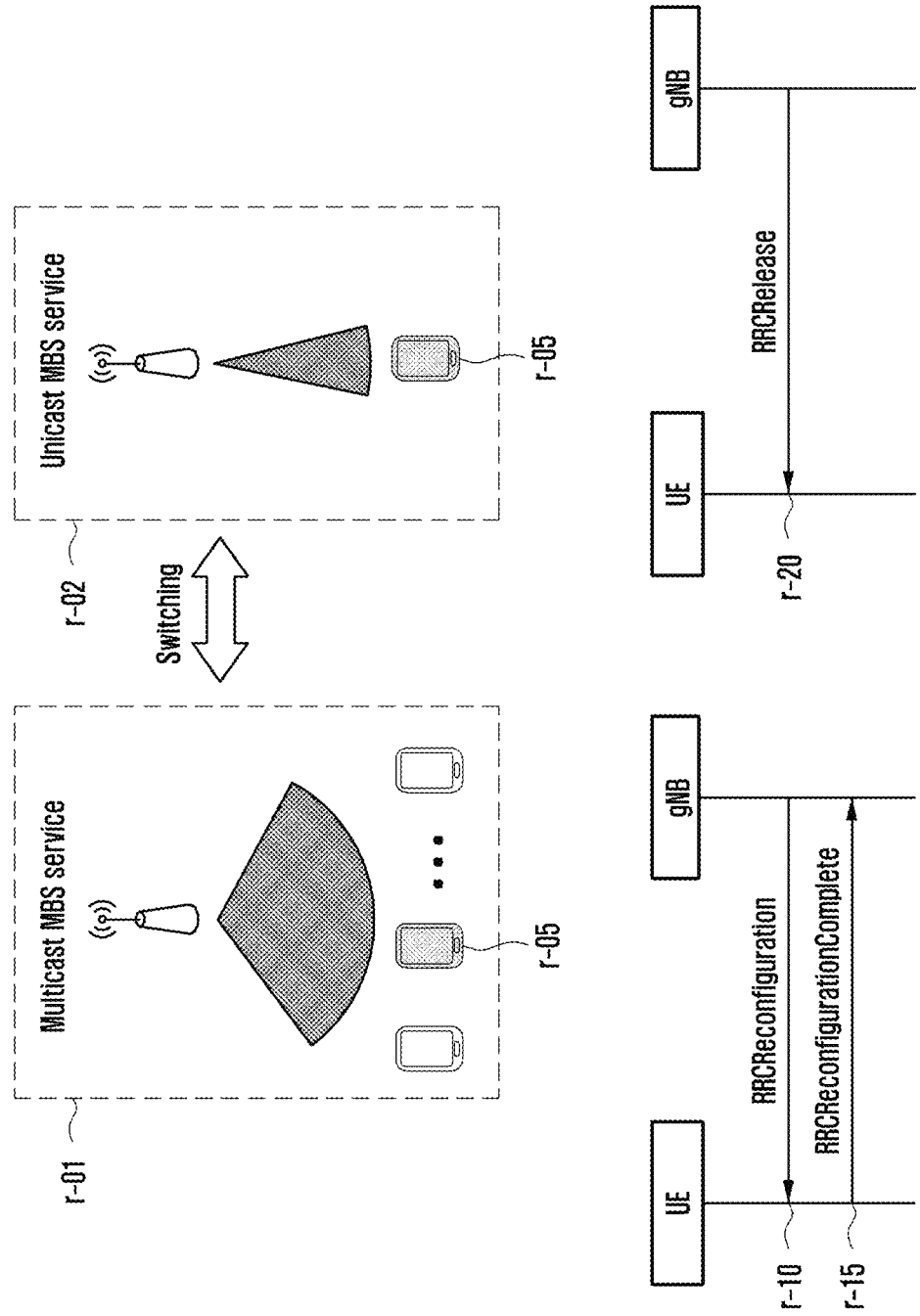
FIG. 18 is a diagram illustrating a first switching method for continuously supporting (transmitting or receiving) an MBS service by switching from a multicast service or a multicast bearer to a unicast service or a unicast bearer, or a second switching method for continuously supporting (transmitting or receiving) an MBS service by switching from a unicast service or a unicast bearer to a multicast service or a multicast bearer in an MBS service supporting method provided by the next-generation mobile communication system according to various embodiments of the present disclosure or access stratum (AS).

FIG. 18 is a diagram illustrating a first switching method for continuously supporting (transmitting or receiving) an MBS service by switching from a multicast service or a multicast bearer to a unicast service or a unicast bearer, or a second switching method for continuously supporting (transmitting or receiving) an MBS service by switching from a unicast service or a unicast bearer to a multicast service or a multicast bearer in an MBS service supporting method provided by the next-generation mobile communication system of the disclosure or access stratum (AS) according to various embodiments of the present disclosure.

In FIG. 18, the first switching method represents a method of switching a multicast service in which a plurality of UEs simultaneously receive MBS service data broadcast or transmitted by a base station for a certain MBS service as in r-01, into a unicast service, which is an MBS service in which the base station broadcasts or transmits MBS service data for the MBS service for one UE, as in r-02. In addition, the first switching method may be indicated by an indicator in system information or RRC message or MBS control information message or MAC control information or RLC control information or PDCP control information or PDCCH. For example, in a case where the UE receives the MBS service through a multicast bearer in a cell supporting the MBS service and moves to a cell that does not support the MBS service, the UE may receive the MBS service by switching to the unicast bearer upon request from the network or according to the instruction of the network.

In FIG. 18, as in r-02, the second switching method represents a method of switching a unicast service, which is an MBS service in which a base station broadcasts or transmits MBS service data for a certain MBS service for one UE into a multicast service in which a plurality of UEs simultaneously receive MBS service data broadcast or transmitted by a base station for the MBS service, as r-01. In addition, the second switching method may be indicated by an indicator in system information or RRC message or MBS control information message or MAC control information or RLC control information or PDCP control information or PDCCH.

As in r-01, when a plurality of UEs receive MBS service data broadcast or transmitted by a base station for a certain MBS service at the same time, a bearer through which each of the plurality of UEs receives the MBS service may be called a multicast bearer. In addition, as in r-02, when the base station broadcasts or transmits MBS service data for the MBS service for one UE, a bearer through which the UE receives the MBS service may be referred to as a unicast bearer.

The UE may receive the MBS service, based on the multicast service, multicast bearer, unicast service, or unicast bearer provided in the disclosure. For example, the UE r-05 may receive a service as a multicast service or a multicast bearer as in r-01 for the same MBS service, or may receive a service as a unicast service or a unicast bearer as in r-02. In another method, when receiving the MBS service as a multicast service according to the base station configuration or system information, RRC message, or MBS control message, as in r-01, the UE may receive a service by establishing or establishing or re-establishing a multicast bearer or by switching to a multicast bearer. Alternatively, when the UE receives the MBS service as a unicast service according to the base station configuration or system information or RRC message or MBS control message, as in r-02, the UE may receive a service by establishing, establishing, or re-establishing a unicast bearer or by switching to a unicast bearer. In another method, the UE may configure one MBS bearer for one MBS service, and may receive a multicast service or a unicast service through a bearer identifier or a logical channel identifier or an RNTI identifier corresponding to the one MBS bearer, or a first identifier or a second identifier for the MBS service, or a mapping relationship between the identifiers.

In the above, when the UE receives or tries to receive the MBS service, the UE may receive the MBS service, based on the multicast service or the multicast bearer or the unicast service or the unicast bearer according to the base station configuration or system information or the RRC message or the MBS control message.

The first switching method for continuously supporting (transmitting or receiving) the MBS service provided in the disclosure or the second switching method for continuously supporting (transmitting or receiving) the MBS service by switching may be performed in one or more of the following cases.

In a case where the first switching method or the second switching method satisfies one or more of the following conditions, the base station may indicate or trigger the UE with an indicator in base station configuration or system information or RRC message or MBS control message or MAC control information or RLC control information or PDCP control information or PDCCH, alternatively, in a case the UE satisfies one or more of the following predetermined conditions, the UE may perform by itself (e.g., without an instruction from the base station):

A case that the UE requests the first switching method or the second switching method from the network;

A case that the UE instructs the network to prefer a unicast service or a unicast bearer;

A case that the UE instructs the network to prefer a multicast service or a multicast bearer;

A case that the base station attempts to transition the UE to the RRC inactive mode or RRC idle mode;

A case that the UE attempts to receive the MBS service in RRC inactive mode or RRC idle mode;

A case that the base station tries to support the MBS service in the RRC inactive mode or RRC idle mode for the UE;

A case that the base station attempts to transition the UE to the RRC inactive mode, RRC idle mode, or RRC connected mode;

A case that the UE attempts to transition to RRC inactive mode, RRC idle mode, or RRC connected mode;

A case that the UE attempts to receive the MBS service in RRC inactive mode, RRC idle mode, or RRC connected mode;

A case that the base station tries to support the MBS service in the RRC inactive mode, RRC idle mode, or RRC connected mode for the UE;

A case that the UE detects or declares a wireless connection failure;

A case that the base station is necessary in consideration of network transmission resources or scheduling implementation;

A case that the UE is required based on UE capability or configuration information;

A case that the UE or current cell (base station) or area or system information may not support multicast service or multicast bearer;

A case that the UE or current cell (base station) or area or system information may not support unicast service or unicast bearer;

A case that the UE or current cell (base station) or area or system information may not support a multicast service or a multicast bearer for any service; and/or A case that the UE or current cell (base station) or area or system information may not support unicast service or unicast bearer for any service.

For example, the base station may allow the UE receiving the first MBS service in the RRC connected mode to receive the service as a multicast service or a multicast bearer. In a case where the RRC connected mode UE indicates that it wants to receive a unicast service or a unicast bearer service, the base station may reflect the preference of the UE and indicate the first switching method for continuously supporting (transmitting or receiving) the MBS service with an RRC message or MBS control message to provide the MBS service to the UE as a unicast service or unicast bearer. The reverse case of switching from a unicast service or unicast bearer to a multicast or multicast bearer in the above is also exemplified.

For example, the base station may allow the UE receiving the first MBS service in the RRC connected mode to receive the service as a unicast service or a unicast bearer. In a case where the RRC connected mode UE intends to transition to the RRC inactive mode or RRC idle mode, or a case that the UE intends to transition to the RRC inactive mode or RRC idle mode, the base station may continuously provide the MBS service to the UE as a multicast service or a multicast bearer by indicating a second switching method for continuously supporting (transmitting or receiving) the MBS service with an RRC message or an MBS control message. The reverse case of switching from a multicast service or a multicast bearer to a unicast or unicast bearer in the above is also exemplified.

For example, the base station may allow the UE receiving the first MBS service in the RRC connected mode to receive the service as a multicast service or a multicast bearer. In a case where handover is instructed to the RRC connected mode UE, a case that the target base station does not support the first MBS service as a multicast service or a multicast bearer or does not support the MBS service, the base station may indicate the UE with an RRC message or MBS control message for the first switching method to continuously support (transmit or receive) the MBS service to continuously provide the MBS service to the UE as a unicast service or a unicast bearer. The reverse case of switching from a unicast service or unicast bearer to a multicast or multicast bearer in the above is also exemplified.

For example, in a case where the UE wants to receive any MBS service in the RRC idle mode or RRC inactive mode, the UE may establish a connection with a base station according to system information or receive a service as a multicast service or a multicast bearer according to an indication of an RRC message or an MBS control message. In a case that the RRC inactive mode or RRC idle mode UE establishes a connection with the network for transmission or reception of general data or resumes the connection, the UE may indicate the first switching method for continuously supporting (transmitting or receiving) the MBS service according to the determination of the base station or the preference of the UE with an RRC message or an MBS control message to continue providing the MBS service to the UE with a unicast service or a unicast bearer. The reverse case of switching from a unicast service or unicast bearer to a multicast or multicast bearer in the above is also exemplified.

For example, in a case where the UE wants to receive any MBS service in the RRC idle mode or RRC inactive mode, the UE may establish a connection with the base station according to system information or receive a service as a multicast service or a multicast bearer according to an indication of an RRC message or an MBS control message. In a case where the RRC inactive mode or RRC idle mode UE moves and camps on another cell through a cell selection or reselection procedure, if the MBS service is not supported in the new cell or in the system information of the new cell (e.g., For example, indicated by an indicator) or if the MBS service is not supported as a multicast service or a multicast bearer (for example, indicated by an indicator), the UE may establish an RRC connection with the base station, and may continue to receive the NBS service as a unicast service or a unicast bearer according to the RRC message or the NBS control message for the first switching method for continuously supporting the MBS service according to the configuration or determination of the base station. The reverse case of switching from a unicast service or unicast bearer to a multicast or multicast bearer in the above is also exemplified.

The first switching method for continuously supporting (transmitting or receiving) the MBS service or the second switching method for continuously supporting (transmitting or receiving) the NBS service provided in the disclosure method may be performed by one or a combination of the following methods.

In one embodiment of first method, a bearer receiving each MBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. In the above, an indicator indicating whether a bearer receiving each MBS service is a unicast service, a unicast bearer, or a multicast service or a multicast bearer may be provided. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or multicast bearer corresponding to each MBS service. When supporting the MBS service in unicast, the base station may configure MBS service data corresponding to identifiers or indicators corresponding to the NBS service, and may transmit MBS service data by indicating transmission resources. In a case where the base station wants to support the MBS service through multicast, the base station may configure NBS service data corresponding to identifiers or indicators corresponding to the MBS service, and may transmit the MBS service data by indicating a transmission resource. As described above, the base station may apply the first switching method or the second switching method based on each other's identifiers or indicators. Therefore, when the UE receives data from the bearer configured for the MBS service, the UE may receive support for a unicast service or a multicast service for each MBS service by identifying the identifier or indicator and identifying the logical channel identifier, the bearer identifier, or the first identifier or the second identifier.

In one embodiment of second method, a bearer receiving each MBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. In the above, an indicator indicating whether a bearer receiving each MBS service is a unicast service, a unicast bearer, or a multicast service or a multicast bearer may be configured. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service. In the second method, a first identifier or a second identifier, a bearer identifier, or a logical channel identifier corresponding to each MBS service may be configured or allocated. The RNTI identifier may allocate a first RNTI identifier to the unicast service of the MBS service and a second RNTI identifier to the multicast service of the MBS service for each MBS service.

Therefore, when the base station supports the MBS service by unicast, the base station may configure MBS service data corresponding to the identifiers corresponding to the MBS service, scramble the PDCCH with the first RNTI identifier, and transmit the MBS service data by indicating the transmission resource. In a case that the base station wants to support the MBS service by multicast, the base station may configure MBS service data corresponding to the identifiers corresponding to the MBS service, and may transmit MBS service data by scrambling the PDCCH with the second RNTI identifier and indicating the transmission resource. As described above, the base station may apply the first switching method or the second switching method based on the different first or second RNTI identifiers. Therefore, the UE checks the first RNTI identifier or the second RNTI identifier when receiving data from the bearer configured for the MBS service, and may receive support for the unicast service or the multicast service by checking the logical channel identifier, the bearer identifier, the first identifier, or the second identifier.

In one embodiment of third method, a bearer receiving each MBS service may be established in system information or RRC message or MBS control message as suggested above of the disclosure, and a first identifier or a second identifier, a bearer identifier, a logical channel identifier, or an RNTI identifier corresponding to each NBS service may be configured or allocated. An indicator indicating whether a unicast service or a unicast bearer or a multicast service or a multicast bearer may be configured for a bearer that receives each NBS service. In another method, a first identifier or a second identifier or a bearer identifier or a logical channel identifier or an RNTI identifier may be established or allocated for a unicast service or unicast bearer corresponding to each NBS service, or a first identifier or a second identifier or a bearer identifier or a logical channel identifier or an RNTI identifier may be configured or allocated for a multicast service or a multicast bearer corresponding to each NBS service. In the third method, a first RNTI identifier may be configured or allocated for a unicast service of MBS services and a second RNTI identifier may be configured or allocated for a multicast service of the NMBS services.

Therefore, the UE may distinguish the unicast service or the multicast service based on the first RNTI identifier or the second RNTI identifier, or the base station may support a unicast service or a multicast service based on the first RNTI identifier or the second RNTI identifier. The base station may support a unicast service with a first RNTI identifier, and in the unicast service, each MBS service may generate and transmit NBS service data by distinguishing the unicast service or multicast service through a bearer identifier, a logical channel identifier, or a first identifier or a second identifier. Therefore, in a case where the UE receives the unicast service with the first RNTI identifier, the UE may receive and process each MBS service data in each MBS service bearer by distinguishing each NBS service based on the bearer identifier or logical channel identifier or the first identifier or the second identifier.

In addition, in the above, the base station may support a multicast service with a second RNTI identifier, and in the multicast service, the base station may generate and transmit NBS service data by distinguishing each NBS service through a bearer identifier, a logical channel identifier, or a first identifier or a second identifier. Therefore, in a case where the UE receives the multicast service with the second RNTI identifier, the UE may receive and process each NBS service data in each NBS service bearer by distinguishing each MBS service, based on the bearer identifier or logical channel identifier or the first identifier or the second identifier. Therefore, when the base station supports the MBS service by unicast, the base station may configure MBS service data corresponding to the identifiers corresponding to the MBS service, and may transmit MBS service data by scrambling the PDCCH with the first RNTI identifier and indicating the transmission resource. In a case where the base station wants to support the MBS service by multicast, the base station may configure MBS service data corresponding to the identifiers corresponding to the MBS service, scramble the PDCCH with the second RNTI identifier, and indicate the transmission resource to transmit MBS service data. As described above, the base station may apply the first switching method or the second switching method based on the different first or second RNTI identifiers. Therefore, when the UE receives data from the bearer configured for the MBS service, the UE may receive support for a unicast service or a multicast service by confirming the first RNTI identifier or the second RNTI identifier and confirming the logical channel identifier, the bearer identifier, or the first identifier or the second identifier.

In one embodiment of fourth method, a bearer receiving each MBS service may be established in system information or RRC message or MBS control message as suggested above of the disclosure, a first identifier or a second identifier, a bearer identifier, a logical channel identifier, or an RNTI identifier corresponding to each MBS service may be configured or allocated. An indicator indicating whether a bearer receiving each MBS service is a unicast service or a unicast bearer or a multicast service or a multicast bearer may be set. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service.

In the fourth method, a restriction or rule or mapping for receiving downlink data for the first identifier or second identifier or bearer identifier or logical channel identifier or RNTI identifier corresponding to each MBS service may be configured in system information or RRC message or MBS control message. For example, a downlink logical channel restriction method may be configured for each MBS service. For example, a rule or restriction (e.g., subcarrier interval or maximum PUSCH interval length or periodic transmission resource type or SCell identifier or bandwidth part identifier or periodic transmission resource group or physical layer priority indicator identifier) for receiving data may be configured for an identifier corresponding to each MBS service (e.g., a first identifier or a second identifier, or a logical channel identifier or a bearer identifier). That is, the base station may support the MBS service by mapping or configuring any MBS service or unicast or multicast service with respect to the first rule or restriction (subcarrier interval or maximum PUSCH interval length or periodic transmission resource type or SCell identifier or bandwidth part identifier or periodic transmission resource group or physical layer priority indicator identifier).

Accordingly, in a case where the first rule or restriction is configured, the UE may receive service support by processing the MBS service data received according to the first rule or restriction in the corresponding MBS service bearer. For example, the base station may support an MBS service for the first rule or restriction (subcarrier interval or maximum PUSCH interval length or periodic transmission resource type or SCell identifier or bandwidth part identifier or periodic transmission resource group or physical layer priority indicator identifier), and may transmit MBS service data in unicast. Accordingly, in a case where the first rule or restriction is set, the UE may receive service support by processing the MBS service data received according to the first rule or restriction in the corresponding MBS service bearer. For example, the base station supports which MBS service for the second rule or restriction (subcarrier interval or maximum PUSCH interval length or periodic transmission resource type or SCell identifier or bandwidth part identifier or periodic transmission resource group or physical layer priority indicator identifier), and may transmit MBS service data in multicast.

Therefore, in a case where the second rule or restriction is configured, the UE may receive service support by processing the MBS service data received according to the second rule or restriction in the corresponding MBS service bearer. Accordingly, in the fourth method, the base station may configure a corresponding rule or restriction and support the MBS service depending on which MBS service or RRC mode (e.g., RRC idle mode or RRC disabled mode or RRC connected mode) or unicast service or multicast service. Therefore, the base station may support the MBS service by configuring the corresponding dedicated transmission resource or dedicated carrier (cell) or dedicated bandwidth part identifier or dedicated sub-carrier interval or priority as a restriction or rule depending on which MBS service, unicast service, multicast service, or RRC mode of the UE, and the UE may receive each MBS service in unicast or multicast according to the restrictions or rules set above. The base station or the UE may perform the first switching method or the second switching method by configuring different rules or restrictions for each NBS service.

For example, a logical channel identifier of a certain MBS service may be mapped or configured to a first SCell identifier (or bandwidth part identifier) or a second SCell identifier (or bandwidth part identifier), and the base station may support the unicast service with the first SCell identifier (or bandwidth part identifier) and support the multicast service with the second SCell identifier (or bandwidth part identifier). In another method, the base station or UE may restrict the first SCell identifier (or bandwidth part identifier) to unicast services of all NMBS services, and may provide or receive a service by classifying different NBS service data based on the logical channel identifier (or barer identifier) for data received in the SCell corresponding to the first SCell identifier (or bandwidth part identifier). In addition, the base station or the UE may restrict the second SCell identifier (or bandwidth part identifier) for the multicast service of all MBS services, and data received in the SCell (or bandwidth part) corresponding to the second SCell identifier (or bandwidth part identifier) may be provided or received by classifying different MBS service data, based on the logical channel identifier (or bearer identifier). As described above, the base station or UE may support each NBS service, unicast service, or multicast service by configuring or mapping various restrictions or rules for each MBS service, or may support the MBS service in the RRC connected mode, the RRC idle mode, or the RRC inactive mode.

In one embodiment of fifth method, a bearer receiving each NBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. An indicator indicating whether a bearer receiving each NBS service is a unicast service or a unicast bearer or a multicast service or a multicast bearer may be configured. In another method, a first identifier or a second identifier or a bearer identifier or a logical channel identifier or an RNTI identifier may be configured or allocated for a unicast service or unicast bearer corresponding to each NBS service, or a first identifier or a second identifier or a bearer identifier or a logical channel identifier or an RNTI identifier may be configured or allocated for a multicast service or a multicast bearer corresponding to each NBS service.

In the fifth method, in the case of triggering or applying the first or second switching method to the first or second identifier or bearer identifier or logical channel identifier or RNTI identifier corresponding to each MBS service, through an RRC message or system information or MBS control message or MAC control information, the bearer for the MBS service may be released, a new MBS bearer may be established, and MBS service data may be received. For example, in a case where the first switching method is indicated for a certain MBS service in the above, the UE may release the multicast bearer being serviced, newly establish a unicast bearer for the MBS service (e.g., identifiers corresponding to the MBS service may also be newly established), and receive MBS service data.

For example, in a case where the second switching method is indicated for a certain MBS service in the above, the UE may release the unicast bearer being serviced, newly establish a multicast bearer for the MBS service (e.g., identifiers corresponding to the MBS service may also be newly established), and receive MBS service data. As another method, two unicast bearers and two multicast bearers may be configured for each MBS service, the MBS service may be received, and the first switching method or the second switching method may be applied. In the case that the switching method is applied in the above, an indicator indicating which data is the last data may be introduced so that the data are sequentially transferred to the upper layer during switching. As another method, the first switching method or the second switching method may be applied through QoS flow reconfiguration or remapping (configuring of mapping between QoS flow and bearer) in the SDAP layer for MBS bearers supporting each MBS service. In a case where the switching method is applied, an indicator indicating which data is the last data may be introduced so that the data is sequentially transferred to the upper layer when switching.

In the first switching method or the second switching method provided in the disclosure, in a case where the base station configures a timer value through an RRC message or system information or an MBS control message and the timer expires, the base station may perform or trigger the first switching method or the second switching method. The timer may be set for each bearer (e.g., unicast bearer, multicast bearer, or each MBS bearer), or each MBS service or each identifier. The timer may be started or restarted when a bearer is established or whenever MBS service data is received, and the timer may be stopped when the bearer is released, when the MBS service is stopped or reception is stopped, or when an indication that the MBS service is stopped is received. When the timer expires, the first switching method or the second switching method may be performed or triggered.

In the disclosure, when the MBS service is supported as a multicast service, the multicast service may be supported only in the default bandwidth part or the initial bandwidth part. As described above, if the MBS service is supported by multicast in the default bandwidth part or the initial bandwidth part, the RRC idle mode or RRC inactive mode UE may easily receive the MBS service support.

As another method, when the UE attempts to receive the MBS service in the RRC idle mode or RRC inactive mode, the UE may perform synchronization in an initial bandwidth part, camp on, read system information, and receive MBS data through the MBS bearer in the initial bandwidth part or in the bandwidth part indicated by system information, or in the bandwidth part configured by the base station in the RRC message after establishing the RRC connection.

In the following, the disclosure suggests a UE operation in a case where the base station instructs or triggers the first switching method or the second switching method or bearer release or bearer establishment to the UE as an indicator in the base station configuration or system information, RRC message, MBS control message, MAC control information, RLC control information, PDCP control information, or PDCCH, and the UE may perform one or a combination of the following methods as an operation of the UE.

In one embodiment of first method, when receiving the instruction, if there is MBS service data stored in the MBS bearer (e.g., MAC layer, RLC layer, or PDCP layer) (or if there is data that has not yet been delivered to an upper layer), the UE may discard all stored data. Alternatively, variable initialization (e.g., initialization to 0) or reset procedure (e.g., configuring to a specific value) may be performed in the RLC layer or the PDCP layer. As another method, the RLC layer may update the reception window variable (e.g., RX_NEXT or RX_NEXT_Highest, etc.) with the RLC serial number+1 of the received data. As another method, in the PDCP layer, the reception window variable (e.g., RX_NEXT or RX_DELIV or RX_REORD, etc.) may be updated to the PDCP serial number (or COUNT value)+1, or the HFN value may be set to 1.

In one embodiment of second method, upon receiving the indication, the UE may perform data processing and transfer to an upper layer (e.g., in the order received or in ascending order of serial number) in a case where there is MBS service data (or if there is data that has not yet been delivered to an upper layer) stored in the MBS bearer (e.g., MAC layer or RLC layer or PDCP layer). Alternatively, variable initialization (e.g., initialization to 0) or reset procedure (e.g., configuring to a specific value) may be performed in the RLC layer or the PDCP layer. As another method, the RLC layer may update the reception window variable (e.g., RX_NEXT or RX_NEXT_Highest, etc.) with the RLC serial number+1 of the received data. As another method, the PDCP layer may update the reception window variable (e.g., RX_NEXT or RX_DELIV or RX_REORD, etc.) to the PDCP serial number (or COUNT value)+1 of the received data, or the HFN value may be configured to 1.

In one embodiment of third method, upon receiving the instruction, the UE may stop or initialize the reordering timer in a case where the reordering function is configured in the MBS bearer (e.g., MAC layer or RLC layer or PDCP layer) or that the reordering function is performed, or the UE may also perform data processing and transfer to the upper layer if there is stored MBS service data (or if there is data that has not yet been delivered to the upper layer) (e.g., it may be transferred to upper layers in the order they are received or in ascending order of serial number). Alternatively, variable initialization (e.g., initialization to 0) or reset procedure (e.g., configuring to a specific value) may be performed in the RLC layer or the PDCP layer. As another method, the RLC layer may update the reception window variable (e.g., RX_NEXT or RX_NEXT_Highest, etc.) with the RLC serial number+1 of the received data. As another method, the PDCP layer may update the reception window variable (e.g., RX_NEXT or RX_DELIV or RX_REORD, etc.) to the PDCP serial number (or COUNT value)+1 of the received data, or the HFN value may be configured to 1.

In one embodiment of fourth method, when receiving the indication in the above, in a case where a reordering function is configured in the MBS bearer (e.g., MAC layer, RLC layer, or PDCP layer), or in a case where a reordering function is performed, or a header compression procedure (or data compression procedure) is configured, the UE may stop or initialize the reordering timer, in a case where there is stored MBS service data (or if there is data that has not yet been delivered to an upper layer), the UE may perform a header decompression procedure on the MBS service data (e.g., in a case where a header decompression procedure has not been performed), and deliver the same to an upper layer (e.g., may deliver the same to an upper layer in the order in which the MBS service data is received or in ascending order of the serial number). The UE may then release the MBS bearer. Alternatively, variable initialization (e.g., initialization to 0) or reset procedure (e.g., configuring to a specific value) may be performed in the RLC layer or the PDCP layer. As another method, the RLC layer may update the reception window variable (e.g., RX_NEXT or RX_NEXT_Highest, etc.) with the RLC serial number+1 of the received data. As another method, the PDCP layer may update the reception window variable (e.g., RX_NEXT or RX_DELIV or RX_REORD, etc.) to the PDCP serial number (or COUNT value)+1, or may configure the HFN value to 1.

When the first switching method or the second switching method or the bearer release or the bearer establishment provided in the disclosure is instructed or triggered, the UE may perform one or a combination of the above methods as an operation of the UE.

In the following of the disclosure, a method for supporting the mobility of a UE receiving an MBS service may be provided.

In a case where the base station or the network instructs the UE to handover with an RRC message (e.g., RRCReconfiguration), or transmits an RRC message (e.g., RRCRelease) to the RRC connected mode UE to transition to the RRC inactive mode or RRC idle mode, or in a case where the UE is supporting the MBS service as an MBS bearer, or in a case where the UE is receiving the MBS service through the MBS bearer, or in a case where the MBS bearer is a unicast bearer or a multicast bearer, the base station may transmit the RRC message including the indicator (e.g., a new indicator or a PDCP re-establishment indicator or a bearer (or PDCP) stop or release procedure indicator) to instruct the UE to perform the first switching method or the second switching method provided in the disclosure, or the UE operation (e.g., the first method or the second method or the third method or the fourth method) for bearer release or bearer configuration. In addition, the RRC message may include an indicator indicating whether to reconfigure, release, or maintain the MBS bearer previously configured in the UE, or whether to indicate the first switching or the second switching method, or information on reconfiguration (e.g., identifier information for transmission resources or MBS service) of an MBS bearer or information on a region (or a list of frequencies or cell identifiers) supporting the MBS service.

In another method, in a case where an indicator indicating handover is included in the received RRC message, or in a case where an indicator for transitioning to RRC inactive mode or RRC idle mode to the RRC connected mode UE is included, or in a case where the UE is supporting the MBS service with the MBS bearer, or in a case where the UE is receiving the MBS service with the MBS bearer (or in a case where the UE does not instruct the MBS service stop), or in a case where the MBS bearer is a unicast bearer or a multicast bearer, or in a case where an indicator (e.g., a new indicator or PDCP re-establishment indicator or bearer (or PDCP) stop or release procedure indicator for indicating the operation of the UE provided in the disclosure, or an indicator for instructing a first switching method or a second switching method or bearer release is included in the RRC message, in a case where the UE moves to an area in which the MBS service is not supported in system information, or in a case where the UE moves to an area in which the MBS service is supported in the system information, in a case where an upper layer (e.g., RRC layer) receives an indication that the data deactivation timer has expired from a lower layer (e.g., MAC layer), or in a case where the upper layer (e.g., RRC layer) receives an indication that the data deactivation timer has expired from the lower layer (e.g., MAC layer) and transitions to the RRC idle mode, it is possible to instruct the UE to perform the first switching method or the second switching method provided in the disclosure, or a UE operation (e.g., the first method or the second method or the third method or the fourth method) for bearer release or bearer establishment.

In addition, in the RRC message, an indicator indicating whether to reconfigure, release, or maintain the MBS bearer previously configured in the UE, or whether to indicate the first switching or the second switching method, or MBS bearer reconfiguration information (e.g., identifier information on transmission resources or MBS service) or information on a region (or a list of frequencies or cell identifiers) supporting the MBS service may be included.

Figure 19:
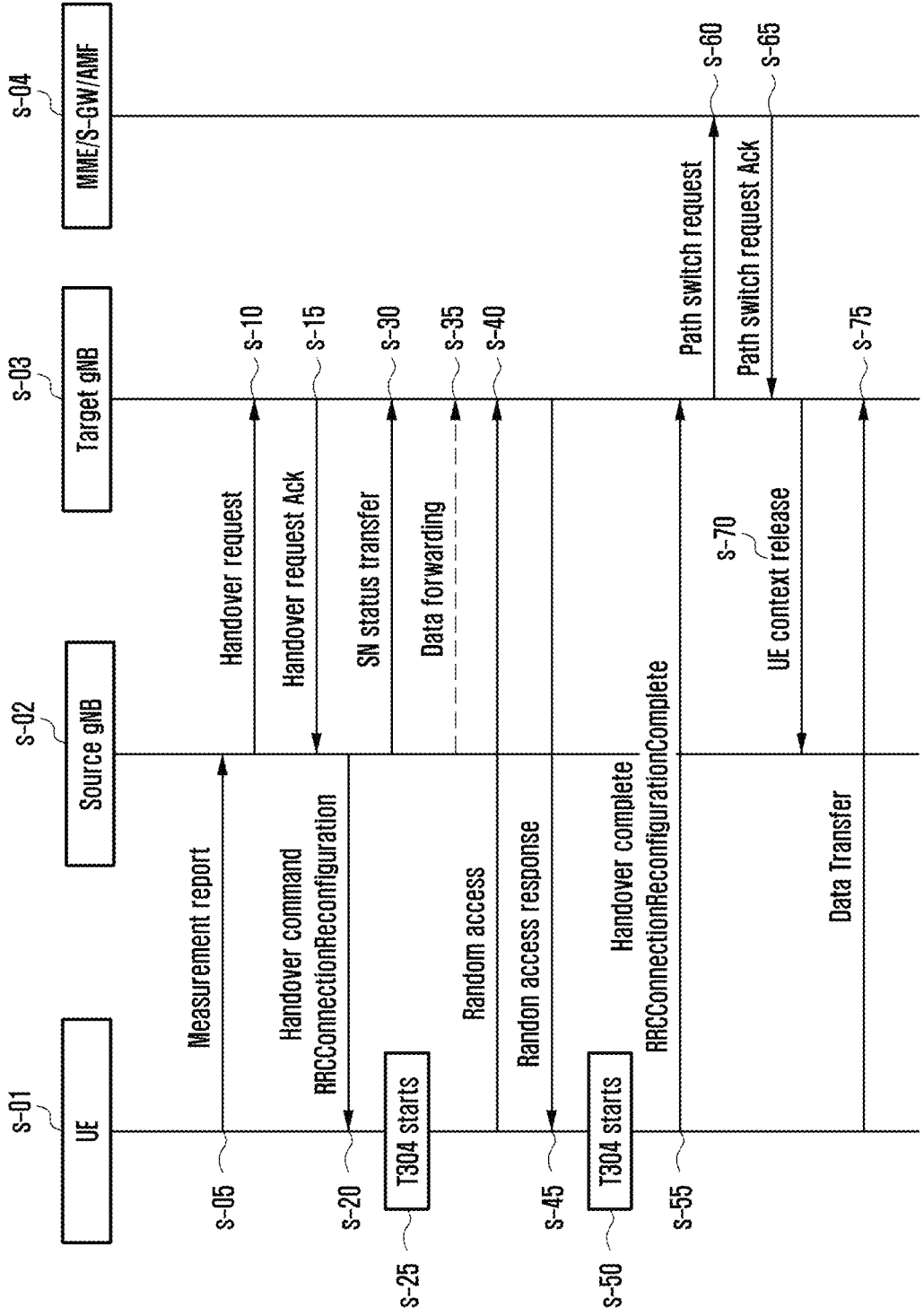
FIG. 19 is a diagram illustrating signaling procedures for performing handover in the next-generation mobile communication system according to various embodiments of the present disclosure.

FIG. 19 is a diagram illustrating signaling procedures for performing handover in the next-generation mobile communication system according to various embodiments of the present disclosure.

FIG. 19 is a diagram illustrating a procedure for extending and supporting the method of supporting the MBS service provided by the disclosure in the handover procedure. The UE s-01 in the RRC connected mode reports the cell measurement information (measurement report) to the current source base station (Source eNB, s-02) when periodic or a specific event is satisfied s-05. The source base station s-02 determines whether the UE performs handover to a neighboring cell based on the measurement information. Handover is a technique for changing a source base station s-02 that provides a service to a UE in a connected mode to another base station (or another cell of the same base station). In a case where the source base station s-02 determines handover, the source base station s-02 may request a handover by sending a handover request message (handover (HO) request) to a new base station that may provide the service to the UE s-01, for example, a target base station (target eNB, s-03) that may provide a service to the UE s-10.

The handover request message may include a handover method supported or preferred by the source base station s-02 or a plurality of handover methods, or may include an indicator for requesting a handover method preferred by the target base station s-03 as another method.

In a case that the target base station s-03 accepts the handover request, a handover request acceptance (HO request Ack) message may be transmitted to the source base station s-02 s-15. In addition, the handover request message may include an indicator for indicating whether the UE s-01 is receiving the MBS service or whether it wants (or is interested in) or supports the MBS service, or identifier information of the MBS service being received, or information for seamless MBS service support (e.g., last data information or serial number information or time information or transmission resource information received by the UE), or MBS service configuration information or transmission resource information supported by the source base station s-02 to the UE s-01.

The handover request accept message may include a handover method included by the source base station s-02 in the handover request message or a handover method supported (or preferred or instructed by) by the target base station s-03 from among a plurality of handover methods, and the source base station s-02 may indicate to the UE the handover method indicated by the target base station in the handover request acceptance message. As another method, the target base station s-03 may configure the handover method supported by the target base station s-03 as an indicator in the handover request acceptance message so that the indicated handover method is performed by the source base station s-02 and the UE s-01. In addition, the handover request acceptance message may include an indicator for indicating to the UE s-01 whether the target base station s-03 supports the MBS service or identifier information of the supported MBS service, or information for seamless MBS service support (e.g., configuration information or reconfiguration information for the MBS service that the UE s-01 is receiving (e.g., transmission resource information or identifier information (logical channel identifier or RNTI identifier or a bearer identifier) used when the target base station supports the IBS service) or time information or transmission resource information), or transmission resource information supported by the target base station s-03 to the UE s-01.

Upon receiving the message, the source base station s-02 may transmit a handover command message (HO command message) to the UE s-01 s-20. The handover command (HO command) message may be transmitted from the source base station s-02 to the UE s-01 using an RRC connection reconfiguration message s-20.

By using an indicator defined for each handover method in the handover command message (e.g., RRCReconfiguration message), the source base station s-02 may set to the UE s-01 which handover method is indicated in consideration of the UE capability. The UE s-01 may perform a handover procedure to the target base station s-03 according to the handover method indicated in the handover command message. The handover command message may include an indicator for indicating to the UE s-01 whether the target base station s-03 supports the MBS service or identifier information of the supported MBS service, or information for seamless MBS service support (e.g., configuration information or reconfiguration information for the IBS service that the UE is receiving (e.g., transmission resource information or identifier information (logical channel identifier or RNTI identifier or a bearer identifier) used when the target base station supports the MBS service) or time information or transmission resource information), or transmission resource information supported by the target base station to the UE.

In the above, the UE s-01 may start or continue to receive the MBS service in order to support the seamless MBS service while performing the handover procedure according to the MBS configuration information indicated or configured in the handover command message or an indicator supporting the multicast MBS service, or even before completing the handover procedure. In another method, the UE s-01 may start to receive or may receive the MBS service when or after completion of the handover procedure according to the MIBS configuration information indicated or configured in the handover command message or an indicator supporting the multicast MBS service or an indicator supporting the unicast MBS service.

In a case of receiving the message, the UE s-01 may stop transmitting and receiving data with the source base station s-02 and start the T304 timer. In T304, in a case where the UE s-01 does not succeed in handover to the target base station s-03 for a predetermined time, the UE may return to the original configuration of the UE and switch to the RRC Idle state. The source base station s-02 may transmit a sequence number (SN) status for uplink/downlink data, and in a case where there is downlink data, the source base station may transmit the same to the target base station s-03 s-30 and s-35. The UE s-01 may attempt random access to the target base station s-03 indicated by the source base station s-02 s-40. The random access may be for notifying the target base station s-03 that the UE s-01 is moving through handover and synchronizing uplink. For the random access, the UE s-01 transmits a preamble ID provided from the source base station s-02 or a preamble corresponding to a randomly selected preamble ID to the target base station s-03.

After the preamble is transmitted, after a specific number of subframes have elapsed, the UE s-01 may monitor whether a random access response message (RAR) is transmitted from the target base station s-03. The monitoring time period may be referred to as a random access response window (RAR window). During the specific time, when a random access response (RAR) is received s-45, the UE s-01 may transmit a handover complete (HO complete) message to the target base station s-03 as an RRC reconfiguration complete message s-55. In a case where the random access response is successfully received from the target base station s-03 as described above, the UE s-01 may end the T304 timer s-50. The target base station s-03 may request a path modification to modify the paths of bearers configured as the source base station s-02 s-60 and s-65 and notify the source base station s-02 to delete the UE context of the UE s-01 s-70. Accordingly, the UE s-01 may attempt to receive data from the start of the RAR window with respect to the target base station s-03, and after receiving the RAR, start transmitting and receiving data with the target base station s-03 while transmitting an RRC Reconfiguration Complete message.

In the disclosure, when supporting a handover procedure for a UE s-01 receiving an MBS service with an MBS bearer, the bearer structure provided in FIG. 7 of the disclosure may be configured or applied to support a handover with no data loss or a small data loss.

For example, the fourth bearer structure g-04*a*, g-04*b*, or g-04*c* provided in the disclosure may be efficiently used to support an MBS service with no data loss or less data loss even in the handover procedure. For example, when the UE receives the MBS service (multicast service or unicast service) through the MBS bearer in which the fourth bearer structure is configured from the source base station and performs a handover procedure to the target base station s-03 according to the instruction (e.g., a handover command message (RRCReconfiguration)) of the source base station, the UE s-01 may maintain the fourth bearer structure for the MBS bearer, or may be reconfigured or newly established to the fourth bearer structure. For example, in the source base station s-02, the source base station s-02 may receive the MBS service from the source base station with the MBS bearer configured in the reference numerals g-04*a*, g-04*b*, or g-04*c* structure as described above, and then reconfigure the MBS bearer to the reference numerals g-04*a*, g-04*b*, or g-04*c* structure or establish a new MBS bearer in order to continue receiving the MBS service based on the handover command message.

As described above, when the MBS bearer is reconfigured or newly established due to the handover procedure, the UE may perform the following procedures.

In one example, in a case where the UE receives a handover command message (RRCReconfiguration message, for example, an RRC message including a reconfigurationWithsync indicator) from the source base station, and the message includes configuration information for configuring or reconfiguring the MBS bearer, or in a case where a PDCP layer reestablishment indicator (reestablishPDCP) for the MBS bearer is included, or in a case where a PDCP layer recovery indicator (recoverPDCP) for the MBS bearer is included, or in a case where it is instructed to reconfigure the PDCP layer for the MBS bearer, or in a case where an instruction to re-establish or release any RLC layer for the MBS bearer is included, the UE may perform the following procedures for the MBS bearer in order to continuously receive the MBS service without error or data loss or to prevent a problem in the reception window operation.

In such example, in the fourth bearer structure, the UE may use the PDCP reordering timer as it is without performing an initialization procedure or without initialization for window variables (e.g., RX_NEXT (variable indicating the COUNT value of data expected to be received next (PDCP SDU)), or RX_DELIV (a variable indicating the COUNT value of the first data not delivered to the upper layer (PDCP SDU) or data still waiting to be received), or RX_REORD (a variable indicating the next COUNT value of the COUNT value of the data (PDCP data PDU) that triggered the PDCP reordering timer (or the COUNT value increased by 1)). This is because, in a case where the window variables are not initialized or the PDCP reordering timer is not initialized (if the PDCP reordering timer is running, keep the same running) as described above and used as it is, the COUNT value (or PDCP serial number) of the data by the window variables is maintained, data loss may be minimized by transmitting information about data that has not been retransmitted or received to recover from data loss (e.g., a PDCP status report) to the base station.

In another method, the UE may perform a PDCP re-establishment procedure or a PDCP data recovery procedure in the PDCP layer, or initialize the window variables or stop (or initialize) the PDCP reordering timer, or perform data processing on the stored (or received) data and transmit it to an upper layer, in order to facilitate synchronization of the base station and window variables and to reduce data transmission delay. In the above, the window variables may be initialized to a value of 0, or the window variables may be initialized based on received data in order to facilitate management of the base station window variables (e.g., so that the UE may synchronize the window variable based on the data received by itself even in a case where the base station does not initialize the window variable).

For example, the RX_NEXT variable may be initialized with a PDCP serial number of data (PDCP data PDU or PDCP SDU) received for the first time after the above indication or a combination of an HFN value initialized to 0 (or the previously used HFN value or the HFN value determined by the UE implementation or the HFN value included in the indication), or the RX_DELIV variable may be initialized with the RX_NEXT value initialized above or a combination of the PDCP serial number+1 or the HFN value (or the previously used HFN value or the HFN value determined by the UE implementation or the indication) initialized to 0 of the data (PDCP data PDU or PDCP SDU) first received after the instruction, or the RX_REORD value may be initialized with a combination of the RX_NEXT value initialized above or an HFN value (or the previously used HFN value or the HFN value determined by the UE implementation or the HFN value included in the indication) initialized to the PDCP serial number+1 or 0 of the data (PDCP data PDU or PDCP SDU) first received after the indication (as another method, initialization of the variable of RX_REORD may be omitted so that the reordering timer is started).

As another method, RX_DELIV may be initialized to a value obtained by subtracting the reception window size (or half of the reception window size) from the RX_NEXT value and adding one. In another method, the window variables may initialize each window variable with respective initialization values (reference values or initial values) for the variables included in the indication information (RRC message or system information or MAC control information or PDCP control data) indicated by the base station.

In such example, upon receiving the indication, the UE may report whether data is successfully received to the base station and configure the PDCP status report so that the base station may perform retransmission to reduce loss, and may transmit to an RLC layer for a unicast service (or an RLC layer configured with a logical channel identifier corresponding to a unicast service). Upon receiving the PDCP status report, the base station may retransmit data through the RLC layer for unicast service based on the received. As described above, in a case where the UE transmits the PDCP status report through the RLC layer for the unicast service, the base station may easily distinguish the PDCP status report which UE the PDCP status report is for. Alternatively, upon performing retransmission through the RLC layer for the unicast service, the base station may prevent wastage of transmission resources by performing retransmission through individual transmission resources (as another method, in the above, the UE may transmit a PDCP status report from the RLC layer for multicast).

In another method, upon receiving the indication, the UE may report successful data reception to the base station to configure the PDCP status report so that the base station may perform retransmission to reduce loss, and may transmit to an RLC layer for a multicast service (or an RLC layer configured with a logical channel identifier corresponding to the multicast service). Upon receiving the PDCP status report, the base station may retransmit data through the RLC layer for the multicast service or the unicast service based on the reception. As described above, in a case where the UE transmits the PDCP status report through the RLC layer for the multicast service, the base station may easily understand the PDCP status report of all UEs.

In such example, upon receiving the indication, the UE may still receive data from the RLC layer for the unicast service or the RLC layer for the multicast service in the fourth bearer structure. This is because the UE may receive data transmitted late. In another method, the RLC layer may be released or re-established (window variable initialization or discarded stored divided data) to facilitate window variable synchronization of the RLC layer of the base station and to discard unnecessary data quickly.

In such example, upon receiving the indication, the UE may, in the RLC layer for the multicast service or the RLC layer for the unicast service (or the RLC layer set to the logical channel identifier corresponding to the unicast service) in the above, use the Window variables (e.g., in UM mode, RX_Next_Reassembly (a variable indicating the value of the smallest (or earliest) RLC serial number still under consideration for reassembly) or RX_Timer_Trigger (RLC serial number that triggered the RLC reassembly timer) variable indicating the RLC serial number greater than or equal to 1) or RX_Next_Highest (a variable indicating the RLC serial number that is greater than 1 or the next RLC serial number among the received data (UMD PDUs)), or, for example, in the AM mode, RX_Next (a variable indicating the value of the RLC serial number greater than or next to the RLC serial number of the last data (RLC SDU) completely received in order) or RX_Next_Status_Trigger (a variable indicating the RLC serial number that is greater than 1 or the next RLC serial number that triggered the RLC rebuild timer) or RX_Highest_Status (a variable indicating the RLC serial number of the next data (RLC SDU) that has not been reported as lost in the RLC status report or has not yet been received) in the RLC status report indicates the highest RLC serial number variable)) without performing an initialization procedure or without initializing the RLC reassembly timer.

This is because, in a case where the window variables are not initialized or the RLC reassembly timer is not initialized (if the RLC reassembly timer is running, keep the same running) as described above, and the RLC serial number of the data is maintained by the window variables, it is easy to implement a UE or a base station (e.g., no additional procedures required). In another method, the UE may initialize the RLC re-establishment (or establishment) procedure or the window variables in the RLC layer, or stop (or initialize) the RLC re-assembly timer in order to facilitate synchronization of window variables with the base station. In the above, the window variables may be initialized to a value of 0, or the window variables may be initialized, based on received data in order to facilitate management of the base station window variable (e.g., even if the base station does not initialize the window variable, the UE may synchronize the window variable based on the data received by itself).

For example, in the UM mode, because the RLC serial number is included only for the divided data, for the complete data that does not include the RLC serial number, the data may be directly processed and delivered to the upper layer, and the window variable may be updated based on the RLC serial number of the received segmented data. For example, RX_Next_Reassembly may be initialized with an RLC serial number of data (RLC SDU or UMD PDU or RLC SDU segment) that is first received after the above instruction and includes an RLC serial number, or RX_Next_Highest may be initialized with the RLC serial number of data (RLC SDU or UMD PDU or RLC SDU segment) received first after the above indication and including the RLC serial number, or RX_Timer_Trigger may be initialized with the RLC serial number of data (RLC SDU or UMD PDU or RLC SDU segment) that is received for the first time after the indication and includes the RLC serial number ((in the above, because the variable of RX_Timer_Trigger does not significantly affect window operation (because it causes unnecessary processing), initialization of the variable may be omitted). Alternatively, for example, in the AM mode, because the RLC serial number is included for all data (RLC data PDU or RLC SDU), RX_Next or RX_Next_Status_Trigger or RX_Highest_Status may be initialized with the RLC serial number of the first received data (RLC SDU or UMD PDU or RLC SDU segment) after the above indication (In the above, variables of RX_Next_Status_Trigger or RX_Highest_Status do not significantly affect window operation (because they cause unnecessary processing), so variable initialization may be omitted).

In another method, the window variables may initialize each window variable with reference values or initial values for the variables included in the indication information (RRC message or system information or MAC control information or PDCP control data) indicated by the base station in order to facilitate base station implementation. As another method, the RLC re-establishment procedure may be performed for the RLC layer configured in the RLC AM mode in order to minimize the complexity of the ARQ operation.

In such example, then, the UE may start receiving data from the RLC layer for the multicast service or the RLC layer for the unicast service (or the RLC layer configured as the logical channel identifier corresponding to the unicast service).

In the disclosure, in a case where the MBS bearer through which the UE receives the MBS service has a fourth bearer structure as suggested in FIG. 7 of the disclosure, the COUNT value used in the PDCP layer configured for the MBS bearer of the UE and the COUNT value used by the base station in the PDCP layer corresponding to the MBS bearer may not be synchronized or may not match. In the above, the COUNT value is composed of a hyper frame number (HFN) and a PDCP serial number, the meaning that the COUNT values are synchronized or identical may mean that the HFN value used in the UE and the HFN value used in the base station are the same, or that the HFN value used by the UE and the HFN value used by the base station are the same, and the difference between the highest PDCP serial number received from the UE and the highest PDCP serial number transmitted from the base station is less than or equal to a certain size of the window.

In the above, the reason why the COUNT value used in the PDCP layer configured for the MBS bearer of the UE and the PDCP serial number value (or RLC serial number value) or the COUNT value used by the base station in the PDCP layer (or RLC layer) corresponding to the MBS bearer are not synchronized or do not match is because the UE may start to receive the MBS service in the middle of the MBS service already being serviced by the base station, so the PDCP serial number (or RLC serial number) or the window variable value or COUNT value was not initialized at the same time, or because the value was not incremented from 0 at the same time.

Therefore, in the disclosure suggest a method of configuring a PDCP serial number value (or RLC a serial number value), a COUNT value, or a window variable value) to be used as a reference value or initialization value in the PDCP layer (or RLC layer) of the MBS bearer in the RRC message (or PDCP control data or RLC control data or MAC control information) when the base station configures the MBS bearer for the UE, or when switching or switching the MBS service type for the MBS bearer configured for the UE, or when instructing a handover to the UE receiving the MBS service. For example, when the UE in RRC idle mode or RRC inactive mode or RRC connected mode establishes the MBS bearer, the base station may configure the RRC message (e.g., RRCSetup message or RRCResume message or RRCRelease message or RRCReconfiguration message, etc.) by including a PDCP serial number value (or RLC serial number value), a COUNT value, or a window variable value to be used as a reference value or an initialization value in the PDCP layer (or RLC layer) of the MBS bearer. For example, when switching or changing the MBS service type for the MBS bearer having the fourth bearer structure provided in FIG. 7 to the UE in the disclosure or when instructing the UE receiving the MBS service to handover, the methods of initializing window variables in the PDCP layer or the RLC layer of the MBS bearer may be applied. As another method, as suggested above of the disclosure, the UE may initialize or update the window variables, based on the PDCP serial number (or RLC serial number) of the received data.

In addition, a procedure for configuring, sharing, or transferring the values including the PDCP serial number value (or RLC serial number value), COUNT value, or window variable value for each MBS service in the message between the base stations may be introduced in order to synchronize the PDCP serial number value (or RLC serial number value), COUNT value, or window variable value used by PDCP layers (or RLC layers) of different MBS bearers configured by different base stations (e.g., a source base station or a target base station in a handover procedure) for the same MBS service. For example, a message requesting the information or a response message including the information corresponding thereto may be introduced.

Figure 20:
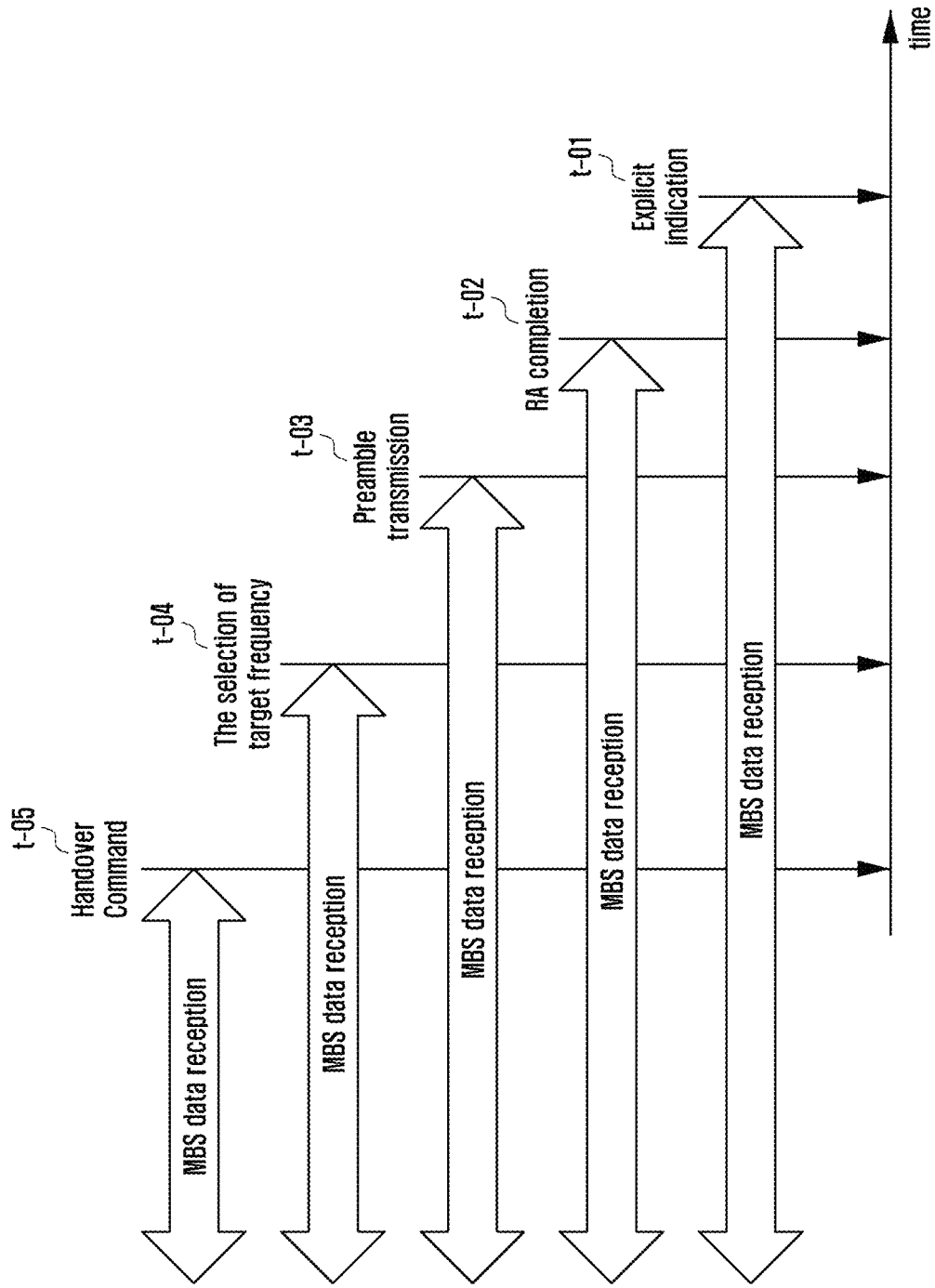
FIG. 20 is a diagram illustrating a time and method of releasing an MBS bearer or stopping an MBS service when a UE with an MBS bearer configured performs a handover procedure according to various embodiments of the present disclosure.

FIG. 20 is a diagram illustrating a time and method of releasing an MBS bearer or stopping an MBS service when a UE with an MBS bearer configured performs a handover procedure according to various embodiments of the present disclosure.

The UE receiving the MBS service through the MBS bearer by receiving the configuration information for the MBS bearer (multicast bearer or unicast bearer) from the source base station may affect the quality of the MBS service according to how the MBS bearer is handled when the handover command message is received (e.g., RRCReconfiguration message or RRC message including ReconfigurationWithSync indicator). Therefore, methods for the UE to process the MBS bearer in the handover procedure are provided as follows.

The following different methods may be applied according to the indicator configured in the message, or different following methods may be applied depending on whether the MBS bearer configured in the UE is a multicast bearer or a unicast bearer.

In one embodiment of first method, it may be characterized in that the UE in which the MBS bearer is configured (which is receiving the MBS service) receives the handover command message from the above, and continues to receive the MBS service through the MBS bearer even when performing the handover procedure. For example, the MBS service may be continuously received through the MBS bearer in an existing frequency or cell or a bandwidth part (or at the newly established frequency or cell or bandwidth part in the RRC message) regardless of the handover procedure or the RRC connection state of the UE (e.g., RRC INACTIVE mode or RRC Connected mode or RRC IDLE mode). Therefore, even if the handover procedure is performed, the MBS service may be continuously received without interruption.

In one embodiment of second method t-01, it may be characterized in that the UE in which the MBS bearer is established (which is receiving the MBS service) receives the handover command message from the above, and continues to receive the MBS service through the MBS bearer even when performing the handover procedure. For example, UE may continue to receive the MBS service through the MBS bearer at the existing frequency or cell or bandwidth part (or at the frequency or cell or bandwidth part newly set in the RRC message) regardless of the handover procedure or the RRC connection state of the UE (e.g., RRC INACTIVE mode or RRC Connected mode or RRC IDLE mode). After completing the handover procedure to the target base station, the UE may establish an MBS bearer to receive the MBS service from the target base station, and in a case where the UE receives an instruction to release the MBS service received from the source base station (or an instruction to release the connection with the source base station) from the target base station, the UE may release the MBS service received from the source base station (e.g., a dual active protocol stack (DAPS) handover method may be applied to the MBS bearer).

In the above, the indication from the target base station may be transmitted to the UE including the indicator in MAC control information, RRC message, or PDCP control data to be indicated. For example, the DAPS handover procedure may be indicated in the handover command message for the MBS bearer that has received the MBS service from the source base station. Then, the PDCP layer of the MBS bearer may be reconfigured to the PDCP layer of the DAPS bearer, the RLC layer for the source base station and the RLC layer for the target base station may be connected to one PDCP layer to configure, MBS service data may be received from the source base station even during the handover procedure (e.g., during the cell selection procedure or random access procedure), and MBS service data may also be received from the target base station after the random access procedure to the target base station is completed. In a case where an instruction to release the MBS service received from the source base station (or an instruction to release the connection with the source base station) is received from the target base station, the MBS service received from the source base station may be released (e.g., the DAPS may be released in the PDCP layer in which the DAPS is configured, or the RLC layer configured in the source base station may be re-established or released).

In the above, reconfiguring the DAPS to the PDCP layer may indicate that a security key or ciphering function (or algorithm) or integrity protection function (or algorithm) or header compression protocol for the target base station is additionally set, and in the above, releasing DAPS from the PDCP layer may indicate releasing a security key or ciphering function (or algorithm) or integrity protection function (or algorithm) or header compression protocol for the source base station. Therefore, even in a case where the handover procedure is performed, the MBS service may be continuously received without interruption.

In one embodiment of third method t-02, it may be characterized in that the UE in which the MBS bearer is established (receiving the MBS service) receives the handover command message from the above, and continues to receive the MBS service through the MBS bearer configured for the source base station even when performing a handover procedure (e.g., a cell selection procedure or a random access procedure). However, in a case where the random access procedure is completed with the target base station, the UE may release receiving the MBS service from the source base station and start receiving the MBS service from the target base station. For example, even in a case where the UE receives the handover command message in the above, the UE may maintain the connection from the source base station, or may maintain the MBS bearer configured for the source base station and receive the MBS service. However, in a case where the random access procedure is completed with the target base station, the MBS bearer configured for the source base station may be reconfigured as an MBS bearer for the target base station according to the bearer configuration information configured in the handover command message (e.g., PDCP re-establishment procedure or RLC re-establishment procedure or MAC initialization procedure), or the MBS service may start to be received from the target base station by newly establishing an MBS bearer for the target base station (or releasing the MBS bearer for the source base station). In this way, it is possible to reduce the interruption of the MBS service in the handover procedure.

In one embodiment of fourth method t-03, it may be characterized in that the UE with an MBS bearer configured (receiving the MBS service) receives the handover command message from the above, and continues to receive the MBS service through the MBS bearer configured for the source base station even when performing a handover procedure (e.g., a cell selection procedure). However, in a case where the preamble is transmitted by performing the cell selection procedure or starting the random access procedure, after releasing the MBS service from the source base station and completing the random access procedure to the target base station, the UE may start receiving the MBS service from the target base station. For example, even in a case where the UE receives the handover command message in the above, the UE may maintain the connection from the source base station, or may maintain the MBS bearer configured for the source base station and receive the MBS service.

However, in a case where the preamble is transmitted by performing the cell selection procedure or starting the random access procedure, for the MBS bearer configured for the source base station, according to the bearer configuration information configured in the handover command message, the MBS bearer may be reconfigured to the MBS bearer for the target base station (e.g., PDCP re-establishment procedure or RLC re-establishment procedure or MAC initialization procedure), or an MBS bearer is newly established for the target base station (or releasing the MBS bearer for the source base station), and after completing the random access procedure to the target base station, the MBS service may start to be received from the target base station. In this way, it is possible to reduce the interruption of the MBS service in the handover procedure.

In one embodiment of fifth method t-04, it may be characterized in that the UE with an MBS bearer configured (receiving the MBS service) receives the handover command message from the above, and continues to receive the MBS service through the MBS bearer configured for the source base station even when performing a handover procedure (e.g., cell selection procedure). However, in a case where the cell selection procedure is performed or a suitable cell is selected (or found), after releasing the MBS service from the source base station and completing the random access procedure to the target base station, the UE may start receiving the MBS service from the target base station. For example, even in a case where the UE receives the handover command message in the above, the UE may maintain the connection from the source base station, or may maintain the MBS bearer configured for the source base station and receive the MBS service. However, in a case where the cell selection procedure is performed or a suitable cell is selected (or found), for the MBS bearer configured for the source base station, the MBS bearer may be reconfigured as an MBS bearer for the target base station (e.g., PDCP re-establishment procedure or RLC re-establishment procedure or MAC initialization procedure) according to the bearer configuration information configured in the handover command message. Alternatively, after newly establishing the MBS bearer for the target base station (or releasing the MBS bearer for the source base station) and completing the random access procedure to the target base station, it is possible to start receiving the MBS service from the target base station.

In one embodiment of sixth method t-05, it may be characterized in that Upon receiving the handover command message in the above, the UE with an MBS bearer configured (receiving the MBS service) may reconfigure the MBS bearer configured for the source base station to the MBS bearer for the target base station according to the bearer configuration information configured in the handover command message (e.g., PDCP re-establishment procedure or RLC re-establishment procedure or MAC initialization procedure), or newly establish an MBS bearer for the target base station (or releases the MBS bearer for the source base station), complete the random access procedure to the target base station, and then, start receiving the MBS service from the target base station. In the same manner as described above, implementation of the UE may be simplified by processing the DRBs for transmitting or receiving the general data service in the same way.

The disclosure provides in the following a procedure for establishing an MBS bearer and performing retransmission on MBS data that a UE receiving an MBS service through the MBS bearer has not received, or in which the UE configures and transmits a PDCP status report to check the reliability of the wireless connection or the quality of the MBS service based on the degree of data loss.

The disclosure provides in the following a method of generating and configuring the conditions for triggering the PDCP status report and the triggered PDCP status report by the LTE or NR PDCP layer connected to the MBS bearer (multicast bearer or unicast bearer) or AM DRB (RLC layer operating in AM mode) or the LTE or NR PDCP layer connected to the MBS bearer (multicast bearer or unicast bearer) or UM DRB (RLC layer operating in UM mode).

When the PDCP layer for each bearer or MBS bearer satisfies one of the following plurality of conditions, the PDCP layer may trigger, generate, configure, and transmit a PDCP status report to a lower layer to perform transmission. The operations provided below may be applied to a PDCP layer apparatus of a UE or a base station.

In one example, 1> In a case where a PDCP layer connected to an RLC layer operating in AM mode or an RLC layer operating in UM mode is configured to trigger or send PDCP status reporting by an upper layer (RLC layer) (or configure whether to trigger PDCP status reporting with an indicator (e.g., status Report Required) in an RRC message):
    2> in a case where the UE receives an RRC message (e.g., a handover command message) from the base station and includes an indicator (reestablishPDCP) for instructing the PDCP layer to re-establish PDCP, or if the upper layer (e.g., RRC layer) of the UE instructs the PDCP layer;
    3> the PDCP layer may trigger and configure PDCP state reporting to perform transmission to a base station (target base station or source base station).

In one example, 1> in a case where a PDCP layer connected to an RLC layer operating in AM mode or an RLC layer operating in UM mode is configured to trigger or send PDCP status reporting by an upper layer (RRC layer) (or configure whether to trigger PDCP status reporting with an indicator (e.g., status Report Required) in an RRC message):
    2> in a case where the UE receives an RRC message (e.g., a handover command message) from the base station and includes an indicator (recoverPDCP) instructing the PDCP layer to recover PDCP data, or if the upper layer (e.g., an RRC layer) of the UE instructs the PDCP layer to recover PDCP data;
    3> the PDCP layer may trigger and configure a PDCP status report to transmit to a base station (a target base station or a source base station).

In one example, 1> in a case where a PDCP layer connected to an RLC layer operating in AM mode or an RLC layer operating in UM mode is configured to trigger or send PDCP status reporting by an upper layer (RRC layer) (or configure whether to trigger PDCP status reporting with an indicator (e.g., status Report Required) in an RRC message), or in a case where the reset of the MBS bearer is instructed in the RRC message or MAC control information received from the base station, or the RLC control data or PDCP control data, or in a case where the MBS bearer is instructed to switch the MBS service type (PTP to PTM or PTM to PTP):
    2> the PDCP layer may trigger and configure PDCP state reporting to perform transmission to a base station (target base station or source base station).

In one example, 1> in a case where a PDCP layer connected to an RLC layer operating in AM mode or an RLC layer operating in UM mode is configured to trigger or send PDCP status reporting by an upper layer (RRC layer) (or configure whether to trigger PDCP status reporting with an indicator (e.g., status Report Required) in an RRC message), or in a case where the timer value set by the base station has expired (a timer for periodically transmitting the PDCP status report, it may be restarted after transmitting the PDCP status report), or in a case where an indicator for triggering (or requesting) a PDCP status report is included in MAC control information, PDCP control data, RLC control data, or PDCP header:
    2> the PDCP layer may trigger and configure a PDCP status report to transmit to a base station (a target base station or a source base station).

In one example, 1> in a case where a PDCP layer connected to an RLC layer operating in AM mode or an RLC layer operating in UM mode is configured to trigger or send PDCP status reporting by an upper layer (RRC layer) (or configure whether to trigger PDCP status reporting with an indicator (e.g., status Report Required) in an RRC message), or in a case of receiving an indication that the random access procedure to the target base station has been successfully completed in the handover procedure, or in a case where the preamble is transmitted (or is about to be transmitted) in the random access procedure, or in a case where a target cell for the target base station is selected as a suitable cell, or in a case of receiving an instruction to release the MBS bearer (for the source base station) from the base station (e.g., the target base station):
    2> the PDCP layer may trigger and configure a PDCP status report to transmit to a base station (a target base station or a source base station).

In one example, 1> in a case where a PDCP layer connected to an RLC layer operating in AM mode or an RLC layer operating in UM mode is configured to trigger or send PDCP status reporting by an upper layer (RRC layer) (or configure whether to trigger PDCP status reporting with an indicator (e.g., status Report Required) in an RRC message), or in a case of receiving an instruction to trigger a PDCP status report from an upper layer or when receiving an instruction to release the MBS bearer:
    2> the PDCP layer may trigger and configure a PDCP status report to transmit to a base station (a target base station or a source base station).

According to the triggering condition of the PDCP status report provided in the disclosure, in a case where the PDCP status report is triggered in the LTE or NR PDCP layer connected to the AM DRB (RLC layer operating in AM mode) or the LTE or NR PDCP layer connected to the UM DRB (RLC layer operating in UM mode) or the PDCP layer connected to the MBS bearer, methods for configuring PDCP status report may be applied as follows.

Alternatively, the PDCP status report may be configured differently according to the type of the bearer for which the PDCP status report is triggered.

In one example, in a case where the NR PDCP layer connected to the AM DRB or UM DRB or if the PDCP status report is triggered, the PDCP status report may be configured as follows:
    the first missing COUNT (FMC) value of the PDCP status report may be configured to the value of the RX_DELIV variable (the COUNT value of the first data not delivered to the upper layer); and
    in a case where the RX_DELIV value (the COUNT value of the first data not delivered to the upper layer) is less than the RX_NEXT value (the COUNT value of the data expected to be received next),
- the length of the bitmap field may be configured from the COUNT value not including the first lost PDCP SDU to a multiple of 8 including the COUNT value of the last data out of order, or the length of the bitmap field may be configured from the COUNT value that does not include the first lost PDCP SDU to the COUNT value of the PDCP SDU that causes the size of the PDCP control data (PDCP status report) to be 9000 bytes, the length may be configured according to the first satisfying case among the above two cases,
- In a case where the PDCP SDUs corresponding to the bitmap field are not successfully received, or header decompression failure occurs, the bitmap field corresponding to the PDCP SDU may be configured to 0, and
- In a case where the PDCP SDUs corresponding to the bitmap field are successfully received, the bitmap field corresponding to the PDCP SDU may be set to 1.

In one example, in a case where the NR PDCP layer connected to the AM DRB or UM DRB or if the PDCP status report is triggered, when the PDCP status report configured as described above is transmitted to the lower layer, it may be sent to the lower layer as the first PDCP PDU of the transmitting PDCP layer. That is, in a case where the highest priority is given to the PDCP status report and the PDCP status report is generated, it is transmitted to a lower layer first so that transmission may be fast.

In a case where the PDCP status report is triggered from the PDCP layer connected to the MBS bearer, the PDCP status report may be configured as following examples:

In one example, the FMC (First Missing COUNT) value of the PDCP status report may be configured to the value of the RX_DELIV variable (the COUNT value of the first data not delivered to the upper layer). As another method, in a case where the base station configures the COUNT value (or the HFN value) or the window variables that are the criteria for PDCP status report with RRC message, PDCP control data, MAC control information, or system information, the FMC value may be configured, based on the set value and the RX_DELIV value. For example, the FMC value may be configured to the COUNT value configured above and configure PDCP status reporting, or the HFN value of the COUNT value (or HFN value) may be configured as the upper HFN value of the FMC, and the lower PDCP serial number value of the FMC may be configured as the lower PDCP serial number value of the RX_DELIV value. In another method, in a case where the base station does not configure the COUNT value (or HFN value) or the window variables that are the criteria for PDCP status report with RRC message or PDCP control data or MAC control information (or not), or for example, in a case where the COUNT value (or window variable values or HFN value) used by the base station and the COUNT value used by the UE are not synchronized or there is a difference (more than a certain size), the base station may interpret the lost data, based on the PDCP serial number when interpreting the PDCP status report configured, based on the FMC set by the UE as the value of the RX_DELIV variable in the above.

In one example, in a case where the RX_DELIV value (the COUNT value of the first data not delivered to the upper layer) is less than the RX_NEXT value (the COUNT value of the data expected to be received next):
- the length of the bitmap field may be configured from the COUNT value not including the first lost PDCP SDU to a multiple of 8 including the COUNT value of the last data out of order, or the length of the bitmap field may be configured from the COUNT value that does not include the first lost PDCP SDU to the COUNT value of the PDCP SDU that makes the size of the PDCP control data (PDCP status report) 9000 bytes, and the length may be set according to the first satisfying case among the above two cases;
- In a case where the PDCP SDUs corresponding to the bitmap field are not successfully received or header decompression failure occurs, the bitmap field corresponding to the PDCP SDU may be configured to 0; and
- In a case where the PDCP SDUs corresponding to the bitmap field are successfully received, the bitmap field corresponding to the PDCP SDU may be configured to 1.

In one example, When the PDCP status report configured as described above is transmitted to the lower layer, it may be sent to the lower layer as the first PDCP PDU of the transmitting PDCP layer. That is, in a case where the highest priority is given to the PDCP status report and the PDCP status report is generated, it is transmitted to a lower layer first so that transmission may be fast.

In a case where the PDCP status report is triggered from the PDCP layer connected to the MBS bearer, in order to prevent asynchronous problems that may occur when the COUNT value (or window variable values or HFN value) used by the base station and the COUNT value used by the UE are not synchronized or there is a difference (over a certain size), the PDCP status report for the MBS bearer (or MBS service) based on the PDCP serial number may be newly introduced and configured as following examples.

In one example, the first missing PDCP sequence number (FMS) value of the PDCP status report may be configured to a value incremented by 1 from the serial number of the first lost PDCP SDU or the PDCP serial number of the first data not forwarded to the upper layer or the PDCP serial number of the last data delivered to the upper layer, or lower values having a PDCP serial number size of RX_DELIV or to a lower PDCP serial number value of RX_DELIV In one example, in an case that the RX_DELIV value (COUNT value of first data not delivered to upper layer) (or lower PDCP serial number value of RX_DELIV) is less than the RX_NEXT value (COUNT value of data expected to be received next) (or PDCP serial number value of data expected to be received negatively):
- the length of the bitmap field may be configured from the COUNT value (or PDCP serial number) not including the first lost PDCP SDU to a multiple of 8 including the COUNT value (or PDCP serial number) of the last data out of order, the length of the bitmap field may be configured from the COUNT value (or PDCP serial number) that does not include the first lost PDCP SDU to a length up to the COUNT value (or PDCP serial number) of the PDCP SDU that makes the size of the PDCP control data (PDCP status report) 9000 bytes, and the length may be configured according to the first satisfying case among the above two cases;
- In a case where the PDCP SDUs corresponding to the bitmap field are not successfully received or header decompression failure occurs, the bitmap field corresponding to the PDCP SDU may be configured to 0; and/or In a case where the PDCP SDUs corresponding to the bitmap field are successfully received, the bitmap field corresponding to the PDCP SDU may be set to 1.

In a case where the PDCP status report is triggered from the PDCP layer connected to the MBS bearer, when the PDCP status report configured as described above is transmitted to the lower layer, it may be sent to the lower layer as the first PDCP PDU of the transmitting PDCP layer. That is, in a case where the highest priority is given to the PDCP status report and the PDCP status report is generated, it is transmitted to a lower layer first so that transmission may be fast.

As described above of the disclosure, the UE may configure and transmit a PDCP status report so that the UE reports whether the data has been successfully received to the eNB so that the eNB may perform retransmission to reduce loss.

In the above, when the UE transmits the PDCP status report, the PDCP status report may be configured and transmitted as a unicast bearer or an RLC layer for a unicast service (or an RLC layer configured with a logical channel identifier corresponding to a unicast service). In addition, in a case where the base station receives the PDCP status report, the base station may retransmit data through the RLC layer for unicast service based on the received. As described above, if the UE transmits the PDCP status report through the RLC layer for the unicast service, the base station may easily identify the PDCP status report which UE the PDCP status report is for. Alternatively, in a case where retransmission is performed through the RLC layer for unicast service, it is possible to prevent wastage of transmission resources by performing retransmission through individual transmission resources (as another method, in the above, the UE may transmit a PDCP status report from the RLC layer for multicast).

As another method, the UE may report whether the data reception is successful to the base station and configure the PDCP status report so that the base station may perform retransmission to reduce loss and transmit the same to the RLC layer for the multicast service. In the above, when the base station receives the PDCP status report, the base station may retransmit data through the RLC layer for the multicast service or the unicast service based on the received. As described above, in a case where the UE transmits the PDCP status report through the RLC layer for the multicast service, the base station may easily understand the PDCP status report of all UEs.

In the following, the disclosure provides a UE operation, as in FIGS. 11, 12, 13, 19, when the UE receives an RRC message (e.g., an RRCRelease message or an RRCReconfiguration message or a new RRC message for MBS service) from a base station or a network, or when the upper layer (e.g., RRC layer) receives an indication that the data deactivation timer has expired from the lower layer (e.g., MAC layer), or when the upper layer (for example, RRC layer) receives an indication that the data deactivation timer has expired from the lower layer (for example, the MAC layer) and transitions to the RRC idle mode. The UE may perform one or a combination of the following methods as an operation of the UE.

First Method in a case where an indicator indicating handover is included in the RRC message received above, or an indicator for transitioning to RRC inactive mode or RRC idle mode to the RRC connected mode UE, or the UE is supporting the MBS service as an MBS bearer, or the UE is receiving the MBS service through the MBS bearer (or if the UE does not instruct the MBS service to stop), or the MBS bearer is a unicast bearer or a multicast bearer, or an indicator (e.g., a new indicator or PDCP re-establishment indicator or bearer (or PDCP) stop or release procedure indicator indicating the UE operation provided in the disclosure, or indicator indicating the first switching method or the second switching method or bearer release) is included in the RRC message:

the UE may not perform the MAC layer reset procedure. This is because, when the MAC layer is initialized, when the UE is receiving MBS data, the MBS data service may be interrupted or data transmission delay may occur;

As another method, the MAC layer partial rest procedure provided in the disclosure may be performed. The partial initialization procedure of the MAC layer may prevent an MBS data service interruption or data transmission delay from occurring in a case where the UE is receiving MBS data, and may prevent unnecessary retransmission. As another method, in a case where an indicator indicating partial initialization of the MAC layer is included in the RRC message, or an upper layer indicates partial initialization of the MAC layer, a partial initialization procedure of the MAC layer may be performed;

Alternatively, when releasing configuration information (configuration information related to MAC layer or RLC layer or PDCP layer or SDAP layer) or transmission resources for all bearers configured for the UE, the configuration information for the MBS bearer (MAC layer, RLC layer, PDCP layer, or SDAP layer related configuration information) may be excluded. In another method, in a case of being indicated by the indicator in the RRC message, the configuration information (MAC layer or RLC layer or PDCP layer or SDAP layer related configuration information) for the MBS bearer may be maintained and applied, or may not be released. Alternatively, in a case of being indicated by the indicator in the RRC message, the configuration information for the MBS bearer (configuration information related to the MAC layer or the RLC layer or the PDCP layer or the SDAP layer) may be released;

Alternatively, all SRBs or all DRBs except for SRB0 or MBS bearers (unicast bearer or multicast bearer) configured in the UE may be suspended. This is because in a case where the MBS bearer is stopped in the above, when the UE is receiving MBS data, the MBS data service disconnection or data transmission delay may occur; and/or Alternatively, the PDCP suspend procedure (PDCP suspend) may be instructed to a lower layer (e.g., a PDCP layer) of all DRBs configured in the UE or except for MBS bearers (unicast bearer or multicast bearer).

In a case that an indicator indicating handover is included in the RRC message received above, or an indicator for transitioning to RRC inactive mode or RRC idle mode is included in the RRC connected mode UE:

the UE may perform a MAC layer reset procedure. This is because, when the UE is not receiving MBS data in the above, unnecessary retransmission may be prevented by initializing the MAC layer;

Alternatively, configuration information (configuration information related to MAC layer or RLC layer or PDCP layer or SDAP layer) or transmission resources for all bearers configured for the UE may be released;

Alternatively, all SRBs or all DRBs except for SRB0 configured in the UE may be suspended; and/or Alternatively, a PDCP suspend procedure (PDCP suspend) may be instructed to a lower layer (e.g., a PDCP layer) of all DRBs configured in the UE. As another method, a PDCP suspend procedure (PDCP suspend) may be instructed to a lower layer (e.g., a PDCP layer) of MBS bearers configured in the UE to perform the procedure provided in the disclosure.

Second Method in a case where the RRC message received above includes an indicator indicating handover, or an indicator for transitioning to RRC inactive mode or RRC idle mode to RRC connected mode UE is included, or the UE does not support the MBS service as an MBS bearer, or the UE is not receiving MBS service through the MBS bearer, or the MBS bearer is not a unicast bearer or a multicast bearer, or an indicator (e.g., a new indicator indicating the operation of the UE provided in the disclosure, PDCP re-establishment indicator, or bearer (or PDCP) stop or release procedure indicator, or indicator indicating the first switching method or the second switching method or bearer release) is not included in the RRC message:

- the UE may perform a MAC layer reset procedure. This is because, in a case where the UE is not receiving MBS data in the above, unnecessary retransmission may be prevented by initializing the MAC layer;
- Alternatively, configuration information (configuration information related to MAC layer or RLC layer or PDCP layer or SDAP layer) or transmission resources for all bearers configured for the UE may be released;
- Alternatively, all SRBs or all DRBs except for SRB0 configured in the UE may be suspended; and/or
- Alternatively, a PDCP suspend procedure (PDCP suspend) may be instructed to a lower layer (e.g., a PDCP layer) of all DRBs configured in the UE.

In a case where the RRC message received above includes an indicator indicating handover, or the RRC connected mode UE includes an indicator for transitioning to the RRC inactive mode or RRC idle mode, or the UE is supporting the MBS service as an MBS bearer, or the UE is receiving the MBS service through the MBS bearer (or the UE does not instruct the MBS service to stop), or the MBS bearer is a unicast bearer or a multicast bearer, or an indicator (e.g., a new indicator or PDCP re-establishment indicator or bearer (or PDCP) stop or release procedure indicator for indicating the operation of the UE provided in the disclosure, or an indicator for instructing a 1 switching method or a second switching method or bearer release) is included in the RRC message:

- the UE may not perform the MAC layer reset procedure. This is because, when the MAC layer is initialized, when the UE is receiving MBS data, the MBS data service may be interrupted or data transmission delay may occur;
- As another method, the MAC layer partial rest procedure provided in the disclosure may be performed. The partial initialization procedure of the MAC layer may prevent an MBS data service interruption or data transmission delay from occurring in a case where the UE is receiving MBS data, and may prevent unnecessary retransmission. As another method, in a case where an indicator indicating partial initialization of the MAC layer is included in the RRC message, or the upper layer instructs partial initialization of the MAC layer, the partial initialization procedure of the MAC layer may be performed;
- Alternatively, when releasing the configuration information or transmission resources for all bearers configured for the UE, configuration information (MAC layer or RLC layer or PDCP layer or SDAP layer related configuration information) for the MBS bearer may be released except for the configuration information for the MBS bearer (MAC layer or RLC layer or PDCP layer or SDAP layer related configuration information). In another method, in a case of being indicated by the indicator in the RRC message, configuration information (configuration information related to MAC layer or RLC layer or PDCP layer or SDAP layer) for the MBS bearer may be maintained and applied, or may not be released. Alternatively, in a case of being indicated by the indicator in the RRC message, configuration information (MAC layer, RLC layer, PDCP layer, or SDAP layer related configuration information) for the MBS bearer may be released;
- Alternatively, all SRBs or all DRBs except for SRB0 or MBS bearers (unicast bearer or multicast bearer) configured in the UE may be suspended. This is because, in a case where the MBS bearer is stopped in the above, when the UE is receiving MBS data, a disconnection of the MBS data service or data transmission delay may occur; and/or
- Alternatively, the PDCP suspend procedure (PDCP suspend) may be instructed to a lower layer (e.g., a PDCP layer) of all DRBs configured in the UE or except for MBS bearers (unicast bearer or multicast bearer). As another method, a PDCP suspend procedure (PDCP suspend) may be instructed to a lower layer (e.g., a PDCP layer) of MBS bearers configured in the UE to perform the procedure provided in the disclosure.

The partial reset of the MAC layer provided in the disclosure may include one or a plurality of UE operations among the following procedures:

- The UE may perform an operation of flushing the remaining HARQ processes (i.e., general HARQ process or HARQ process for system information, etc.) except for the HARQ process for MBS among the HARQ processes set in the serving cell, and perform an operation of flushing, releasing, or initializing the HARQ process for MBS after handover completion or after RRC state mode transition (with RRC disabled mode or RRC idle mode), or omitting flushing;
- In the case of flush operation, after handover completion or after RRC state mode transition (to RRC inactive mode or RRC idle mode), data of HARQ process related to MBS may be flushed at the time when MBS service reception becomes possible in the target base station or at the time when G-RNTI monitoring starts. Alternatively, data reception through the G-RNTI may be continued until the handover is completed or the RRC state mode transition (to RRC disabled mode or RRC idle mode) is completed, and in a case of handover, the target base station may perform an operation of monitoring the C-RNTI in the target allocated through the RRC message. As another method, data reception through the G-RNTI may be continued even before random access from the target base station is completed;
- In a case there is a random access procedure being performed, it may be stopped;
- In a case there is a specifically set or indicated preamble identifier or preamble configuration information or PRACH (random access configuration related information) configuration information, it may be discarded;
- In a case there is a temporary cell identifier (temporary C-RNTI), it may be released;

The buffer for sending message 3 may be flushed;
All of the New data indicator indicators for the HARQ process for the uplink may be configured to 0;
In a case where the uplink DRX retransmission timer running for uplink is running, it may be stopped; and
In a case where all uplink HARQ related timers are running, it may be stopped.

However, in a case where the initialization procedure of the MAC layer is performed or the partial initialization procedure indicator of the MAC layer is not included or is not indicated, the UE may perform the initialization procedure of the entire MAC layer, and accordingly, the UE may flush all the configured general HARQ process, MBS HARQ process, or HARQ process for system information.

In a case where the UE provided in the disclosure receives the MBS service in the RRC inactive mode, the UE may transition from the RRC inactive mode to the RRC idle mode when one of the following conditions is satisfied:

First condition: In a case where in the disclosure, a paging message is received according to the third DRX configuration information, and the identifier included in the paging message is not an identifier for RRC connection resumption (I-RNTI) but a UE unique identifier (5G-S-TMSI);

Second condition: In a case where the UE transmits an RRCResumeRequest message in the RRC connection resumption procedure and receives RRCSetup in response thereto;

Third condition: In a case where the UE does not find a suitable cell in the cell selection or reselection procedure in the RRC inactive mode, and camps in an acceptable cell;

Fourth condition: In a case where the UE transmits the RRCResumeRequest message in the RRC connection resumption procedure and receives the RRCResume message in response thereto, but an error occurs;

Fifth condition: In a case where the UE performs Inter-RAT reselection in the cell selection or reselection procedure in the RRC inactive mode, or selects a cell supporting another radio access technology;

Sixth condition: In a case where the timer (T319 timer, timer for checking whether the RRC connection resumption procedure fails (or succeeds)) has expired, the UE triggers the RRC connection resumption procedure; and Seventh condition: In a case where the UE transmits an RRCResumeRequest message in the RRC connection resumption procedure and receives an RRCReject message in response thereto.

In a case where RRC inactive mode UE receives the MBS service, the disclosure provides that the UE continues to perform MBS service reception even when the first condition, the second condition, the third condition, the fourth condition, the fifth condition, the sixth condition, or the seventh condition is satisfied and the UE transitions to the RRC idle mode. For example, it is characterized in that the UE may continue to receive the MBS service according to the system information configuration information, the configuration information set in the RRC message, or the configuration information configured in the MBS control message without interruption, regardless of the RRC inactive mode or RRC idle mode.

As another method, in a case where the RRC inactive mode UE receives the MBS service, when the UE transitions to the RRC idle mode by satisfying the third or fifth condition, the UE determines that it may not continue receiving MBS services or suggests stopping or releasing MBS bearer or MBS service-related configuration information configured on the UE in order to verify that newly accessed cells or cells supporting other wireless access technologies support MBS services. Alternatively, it is provided to perform a procedure (e.g., a system information reception procedure or an RRC connection establishment procedure) for allowing the UE to receive system information configuration information, RRC message configuration information, or MBS control message configuration information again in order to resume, reconfiguration, or receive a new configuration of the MBS service.

As another method, in the disclosure, in a case where the RRC inactive mode UE receives the MBS service, when the UE transitions to the RRC idle mode by satisfying the first condition, the second condition, the third condition, the fourth condition, the fifth condition, the sixth condition, or the seventh condition, the UE may determine that it may not continue receiving MBS services, and may stop or release the MBS bearer or MBS service-related configuration information configured on the UE. Alternatively, the UE may perform a procedure (e.g., a system information reception procedure or an RRC connection establishment procedure) for receiving again system information configuration information, RRC message configuration information, or MBS control message configuration information in order to resume, reconfiguration, or receive a new configuration of the MBS service.

In the following of the disclosure, the first method of extending the method (data inactivity monitoring) for notifying that data transmission or reception between the UE and the network continues by driving and maintaining a timer depending on whether the UE transmits or receives data, to the MBS data service is provided as follows.

1> When the UE is in the RRC connected mode, the data inactivity monitoring function may be configured by the RRC layer or the RRC message. The RRC layer of the UE may operate a data inactivity monitoring method by setting a timer (data inactivity timer or dataInactivityTimer); and 1> If the data inactivity timer is set, the UE performs the following operation:

2> If a MAC layer receives a MAC SDU for data traffic channel (DTCH), downlink control channel (DCCH), common control channel (CCCH), MBS control channel (MBCCH or channel for MBS service control data), or MBS traffic channel (MBTCH or channel for MBS service data or user data);

2> If a MAC layer transmits a MAC SDU for data traffic channel (DTCH), downlink control channel (DCCH), MBS control channel (MBCCH or channel for MBS service control data), or MBS traffic channel (MBTCH or channel for MBS service data or user data):

3> The data inactivity timer may start or restart, and

2> If the data inactivity timer expires:

3> Instruct the upper layer to expire the data deactivation timer. In the above, when the upper layer (e.g., RRC layer) is instructed to expire the data deactivation timer, it may perform a procedure for transitioning the UE to the RRC idle mode and perform the procedure provided in the disclosure.

In the following of the disclosure, the second method of extending the method (data inactivity monitoring) for notifying that data transmission or reception between the UE and the network continues by driving and maintaining a timer depending on whether the UE transmits or receives data, to the MBS data service is provided as follows.

1> When the UE is in the RRC connected mode, the data inactivity monitoring function may be configured by the RRC layer or the RRC message. The RRC layer of the UE may operate a data inactivity monitoring method by setting a timer (data inactivity timer or dataInactivityTimer); and
1> If the data inactivity timer is set, the UE performs the following operation:
   2> If a MAC layer receives a MAC SDU for data traffic channel (DTCH), downlink control channel (DCCH), common control channel (CCCH), MBS control channel (MBCCH or channel for MBS service control data), or MBS traffic channel (MBTCH or channel for MBS service data or user data);
   2> If a MAC layer transmits a MAC SDU for data traffic channel (DTCH), downlink control channel (DCCH):
      3> The data inactivity timer may start or restart; and
   2> If the data inactivity timer expires:
      3> Instruct the upper layer to expire the data deactivation timer. In the above, when the upper layer (e.g., RRC layer) is instructed to expire the data deactivation timer, it may perform a procedure for transitioning the UE to the RRC idle mode and perform the procedure provided in the disclosure.

In the following of the disclosure, a method for enabling a UE receiving an MBS service to identify that MBS service-related configuration information, MBS service control information, or system information has been changed is provided. In the above, the base station or the network may perform one or a combination of the following methods as an operation of the UE.

In one embodiment of first method, in the paging message, by including and transmitting the UE identifier, MBS service identifier, MBS service related configuration information change indicator, or system information change indicator, the UE receiving the paging message may confirm that the MBS service related configuration information, MBS service control information, or system information has been changed.

In one embodiment of second method, by including and transmitting the RRC message, MAC control information, MBS control information message (or MBS control data channel), UE identifier, MBS service identifier, MBS service related configuration information change indicator, or system information change indicators, the UE receiving the RRC message, MAC control information, or MBS control information message (or MBS control data channel) may confirm that the MBS service related configuration information, MBS service control information, or system information has been changed.

In one embodiment of third method, in the PDCCH message (e.g., short message), by including and transmitting the UE identifier, MBS service identifier, MBS service related configuration information change indicator, system information change indicator, or bitmap information, the UE receiving the PDCCH may confirm that the MBS service related configuration information, MBS service control information, or system information has been changed.

In one embodiment of fourth method, by scrambling the PDCCH by the RNTI identifier instructing change of MBS service-related configuration information or system information and transmitting when transmitting the PDCCH to the UE, the UE receiving the PDCCH may confirm that the MBS service related configuration information, MBS service control information, or system information has been changed.

In a case where the UE confirms that MBS service related configuration information, MBS service control information, or system information has been changed by one or a combination of the above methods, the UE may perform a procedure of obtaining system information again, may request or receive MBS control information again in the MBS control data channel, or may request or receive the changed information from the base station by establishing an RRC connection procedure.

In the disclosure, the base station or the network may configure the security configuration to the MBS bearer (unicast bearer or multicast bearer) of the UE that receives the MBS service with the RRC message, and may configure the ciphering procedure or the integrity protection procedure. In the above, the security key information for performing the ciphering procedure or the integrity protection procedure may be configured in the RRC message, or may be transmitted and configured by being included in the header of the protocol layer (MAC layer, RLC layer, or PDCP layer). As another method, in the above, the security configuration information may be configured in the unicast bearer for the MBS service and may not be configured in the multicast bearer for the MBS service. This is because, security is weakened when security configuration information is configured for an unspecified majority.

In addition, with respect to the bearer for the MBS service, it is possible to restrict the configuration of a PDCP re-establishment indicator (reestablishPDCP) or a PDCP data recovery indicator (recoverPDCP). This is because the above procedures are not suitable for the MBS bearer, or retransmission of uplink data is unnecessary for the MBS bearer.

Figure 21:
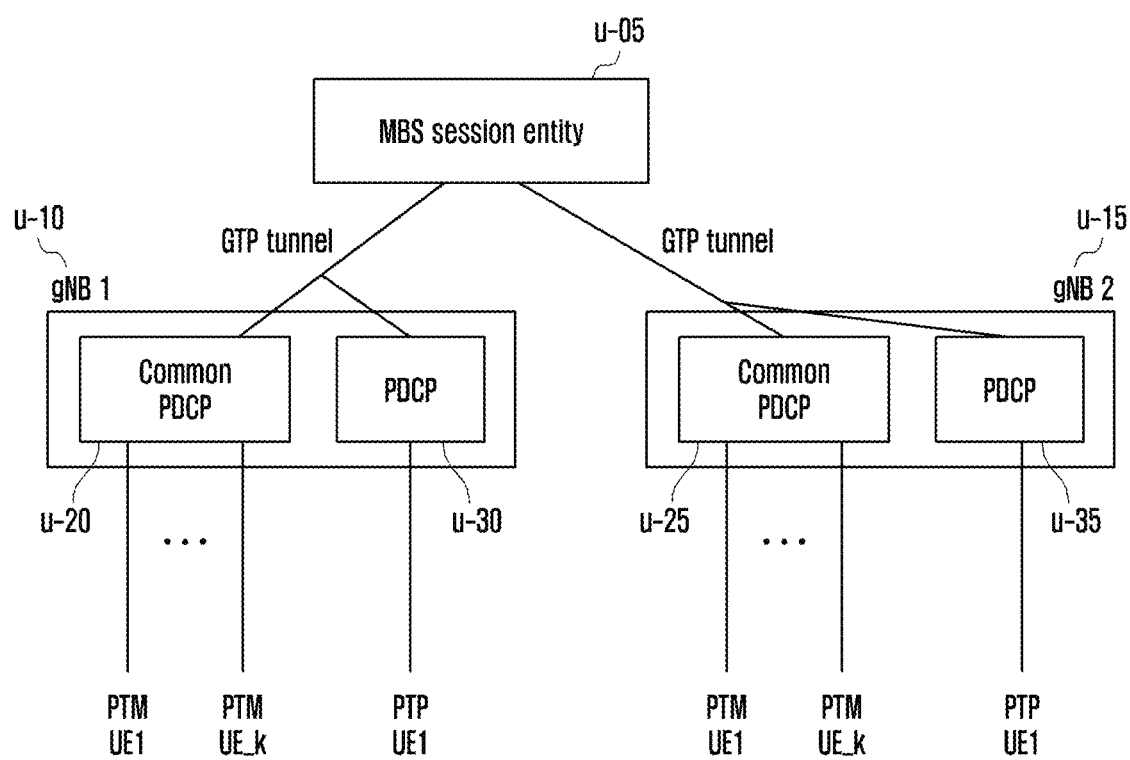
FIG. 21 is a diagram illustrating a first embodiment of a method for synchronizing a COUNT value (or HFN value) or a PDCP serial number in PDCP layers for supporting an MBS service in a base station according to various embodiments of the present disclosure.

FIG. 21 is a diagram illustrating a first embodiment of a method for synchronizing a COUNT value (or HFN value) or a PDCP serial number in PDCP layers for supporting an MBS service in a base station according to various embodiments of the present disclosure.

In FIG. 21, when a first base station u-10 and a second base station u-15 support the MBS service, the base stations may be connected to the same PDU session to receive MBS service data from the same MBS session device u-05. The MBS session device u-05 may transmit MBS service data through a protocol for transmitting data to each base station (e.g., a GTP protocol (general packet radio system (GPRS) tunneling protocol)). Each base station may receive MBS service data from the MBS session device, and may support the MBS service to each UE connected to each base station and receiving the service. Each base station may support the MBS service to each UE in different MBS service types (e.g., multicast service, PTM or unicast service, PTP).

In FIG. 21, when each base station belonging to the same PDU session or connected to the same MBS session device receives data received from the MBS session device and processes the data in the PDCP layers u-20 and u-25, the base stations may allocate the same COUNT value or PDCP serial number to each data, based on the information included in the data. The information may indicate header information or serial number information of the protocol. The PDCP layers u-20 and u-25 of each base station may be applied to MBS bearers supporting a multicast service. Accordingly, UEs receiving the MBS service from the first base station or the second base station may be implemented to have a common PDCP serial number value or a COUNT value for each MBS service data for the same MBS service.

However, for the MBS bearer supporting the unicast service, it is implemented so that each UE of each base station uses individual PDCP layers u-30 and u-35 so that UEs receiving the same MBS service have different PDCP serial number values or COUNT values for each MBS service data. In a case where the MBS bearer supporting the multicast service is also implemented as u-30 and u-35 as described above, different base stations may introduce a new inter-BS message to share the PDCP serial number value or the COUNT value to synchronize the PDCP serial number value or the COUNT value.

In a case of being implemented by the method of the first embodiment as illustrated in FIG. 21, the UE receiving the multicast bearer service from the first base station may apply the method of setting (or initializing) a window variable of the PDCP layer or the RLC layer provided in the disclosure when establishing the MBS bearer for the first time. In a case where the UE performs a handover procedure to the second base station and continues to receive the MBS service as a multicast bearer from the second base station, the window variable configuration (or initialization) method of the PDCP layer or the RLC layer provided in the disclosure may be applied, and the MBS service data forwarding procedure from the first base station to the second base station may not be necessary. This is because the COUNT value or the PDCP serial number value is synchronized, and the second base station may already have the same data (the second base station may continuously support (e.g., transmit or retransmit) MBS service data based on the PDCP status report transmitted by the UE).

In a case of being implemented by the method of the first embodiment as illustrated in FIG. 21, the UE receiving the service as the unicast bearer from the first base station may apply the method of configuring (or initializing) the window variable of the PDCP layer or the RLC layer provided in the disclosure when establishing the MBS bearer for the first time. In a case where the UE performs the handover procedure to the second base station and continues to receive the MBS service as a unicast bearer from the second base station, the window variable setting (or initialization) method of the PDCP layer or the RLC layer provided in the disclosure may be applied, and MBS service data forwarding procedure from the first base station to the second base station may be required. This is because the COUNT value or the PDCP serial number value is not synchronized.

In a case of being implemented by the method of the first embodiment as illustrated in FIG. 21, the UE receiving the service as the unicast bearer from the first base station may apply the method of configuring (or initializing) the window variable of the PDCP layer or the RLC layer provided in the disclosure when establishing the MBS bearer for the first time. In a case where the UE performs a handover procedure to the second base station and continues to receive the MBS service as a multicast bearer from the second base station, the window variable configuration (or initialization) method of the PDCP layer or the RLC layer provided in the disclosure may be applied, and MBS service data forwarding procedure from the first base station to the second base station may be required. This is because the COUNT value or the PDCP serial number value is not synchronized. In another method, a procedure for synchronizing the COUNT value or the PDCP serial number value (e.g., the base station informs the UE of the COUNT value or the PDCP serial number value or the window variable value as suggested above of the disclosure, or shares between the base stations) may be performed and the data forwarding procedure may be omitted.

In a case of being implemented by the method of the first embodiment as illustrated in FIG. 21, the UE receiving the multicast bearer service from the first base station may apply the method of configuring (or initializing) a window variable of the PDCP layer or the RLC layer provided in the disclosure when establishing the MBS bearer for the first time. In a case where the UE performs the handover procedure to the second base station and continues to receive the MBS service as a unicast bearer from the second base station, the window variable setting (or initialization) method of the PDCP layer or the RLC layer provided in the disclosure may be applied, and MBS service data forwarding procedure from the first base station to the second base station may be required. This is because the COUNT value or the PDCP serial number value is not synchronized. In another method, a procedure for synchronizing the COUNT value or the PDCP serial number value (e.g., the base station informs the UE of the COUNT value, the PDCP serial number value, or the window variable value as suggested above of the disclosure, or shares it between the base stations) may be performed and the data forwarding procedure may be omitted.

Figure 22:
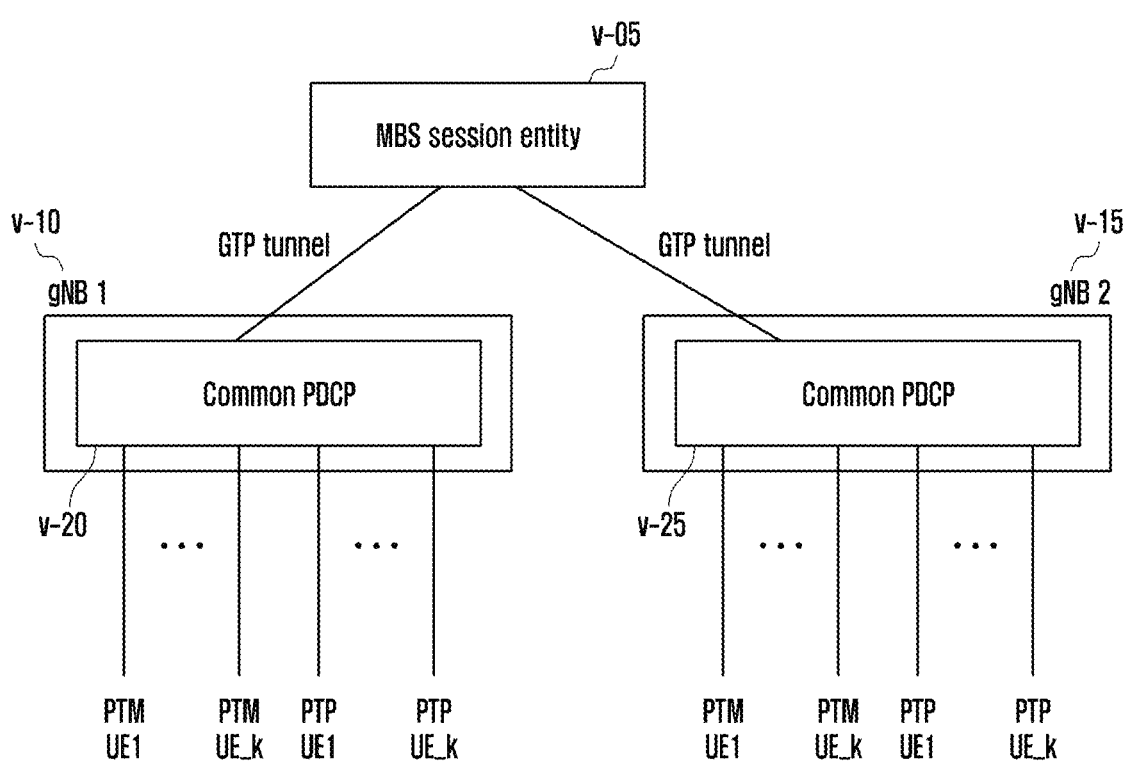
FIG. 22 is a diagram illustrating a second embodiment of a method for synchronizing a COUNT value (or HFN value) or a PDCP serial number in PDCP layers for supporting an MBS service in a base station according to various embodiments of the present disclosure.

FIG. 22 is a diagram illustrating a second embodiment of a method for synchronizing a COUNT value (or HFN value) or a PDCP serial number in PDCP layers for supporting an MBS service in a base station according to various embodiments of the present disclosure.

In FIG. 22, when a first base station v-10 and a second base station v-15 support the MBS service, the base stations may be connected to the same PDU session to receive MBS service data from the same MBS session device v-05. The MBS session device v-05 may transmit MBS service data through a protocol for transmitting data to each base station (e.g., a general packet radio system (GPRS) tunneling protocol (GTP)). Each base station may receive MBS service data from the MBS session device, and may support the MBS service to each UE connected to each base station and receiving the service. Each base station may support the MBS service to each UE in different MBS service types (e.g., multicast service, PTM or unicast service, PTP).

In FIG. 22, when each base station belonging to the same PDU session or connected to the same MBS session device receives data received from the MBS session device and processes the data in the PDCP layer v-20, the base stations may allocate the same COUNT value or PDCP serial number to each data, based on the information included in the data. The information may indicate header information or serial number information of the protocol. The PDCP layers v-20 and v-25 of each base station may be applied to MBS bearers supporting a multicast service or a unicast service. Accordingly, UEs receiving the MBS service from the first base station or the second base station may be implemented to have a common PDCP serial number value or a COUNT value for each MBS service data for the same MBS service.

In a case where different base stations do not have a common PDCP serial number value or COUNT value and there is a difference in values, or if synchronization is not performed, in order for different base stations to synchronize the PDCP serial number value or the COUNT value, a new inter-base station message is introduced to share the PDCP serial number value or the COUNT value, or the synchronization procedure provided above of the disclosure may be performed, and may be applied to a UE.

In a case of being implemented in the method of the second embodiment as illustrated in FIG. 22, the UE receiving the multicast bearer or unicast bearer service from the first base station may apply the method of setting (or initializing) the window variable of the PDCP layer or the RLC layer provided in the disclosure when establishing the MBS bearer for the first time. In a case where the UE performs the handover procedure to the second base station and continues to receive the MBS service as a multicast bearer or unicast bearer from the second base station, the method of configuring (or initializing) a window variable of the PDCP layer or the RLC layer provided in the disclosure may be applied, and the MBS service data forwarding procedure from the first base station to the second base station may not be necessary. This is because the COUNT value or the PDCP serial number value is synchronized, and the second base station may already have the same data (the second base station may continuously support (e.g., transmit or retransmit) MBS service data based on the PDCP status report transmitted by the UE).

In a case where the COUNT value or the PDCP serial number value between the base stations is not synchronized when performing the handover procedure, the MBS service data forwarding procedure from the first base station to the second base station may be required.

In the following, a method of preventing data interruption or transmission delay that occurs unnecessarily when a base station or a network supports an MBS service to a UE is provided in a case where the ciphering procedure or the integrity protection procedure may not be applied or configured for the MBS bearer (UM MRB or AM MRB, unicast service MBS bearer, or multicast service MBS bearer) provided in the disclosure.

The PDCP layer uses a 32-bit COUNT value (from 0 to $2^{(32)}-1$) used in the PDCP layer when applying the ciphering procedure or integrity protection procedure, in a case where an ciphering procedure or integrity protection procedure is applied by applying different COUNT values to the same data, security threats are exposed, so that if the COUNT value is used once for one data, the ciphering procedure or integrity protection procedure may be applied by increasing the value by 1 and applying different COUNT values to different data. If the COUNT value continues to increase by 1, it becomes $2^{(32)}-1$, and if 1 is increased again, a value of 0 (a value in which all 32-bit values are 0) rotates once (COUNT wrap around). As described above, in case that the COUNT value rotates once, the same COUNT value may be applied to other data from 0 again to apply the ciphering procedure or the integrity protection procedure, thereby exposing to security threats. Therefore, in a case where a ciphering procedure or an integrity protection procedure is set for each bearer of the UE, the base station may release the bearer and re-establish (or establish) the security key before the COUNT value wraps around. In the above, the COUNT value may be composed of a Hyper Frame Number (HFN) value and a PDCP serial number value.

However, in a case where the ciphering procedure or the integrity protection procedure may not be applied or set to the MBS bearer (UM MRB or AM MRB, unicast service MBS bearer or multicast service MBS bearer) provided in the disclosure, no security threat may occur even in case that the COUNT value is rotated once for the MBS bearer. That is, no problem occurs even when the COUNT value is reused. However, in a case where the MBS bearer is released and re-established, data interruption time or delay may occur. Therefore, the disclosure provides that the COUNT wrap around is not allowed for the UM DRB or AM DRB or SRB or SLRB, and the COUNT wrap around is allowed for the MBS bearer, thereby prevent unnecessary data downtime or delay due to bearer release or reset.

For example, in the PDCP layer, the COUNT wrap around is not allowed for the UM DRB or AM DRB or SRB, and the COUNT wrap around may be allowed for the MBS bearer (e.g., COUNT does not wrap around for SRB, AM DRB, and UM DRB except MRB).

Another method, the PDCP layer may not allow the COUNT wrap around for UM DRB, AM DRB, SRB, or sidelink radio bearer (SLRB), and may allow COUNT wrap around for the MBS bearer (e.g., COUNT does not wrap around for SRB, AM DRB, UM DRB, and SLRB except MRB).

Another method, the PDCP layer may not allow the COUNT wrap around for UM DRB, AM DRB, SRB, sidelink radio bearer (SLRB), or unicast, and may allow COUNT wrap around for the MBS bearer, SLRB for broadcast (or multicast) (e.g., COUNT does not wrap around for SRB, AM DRB, UM DRB, unicast SLRB except MRB and broadcast (multicast) SLRB).

Figure 23:
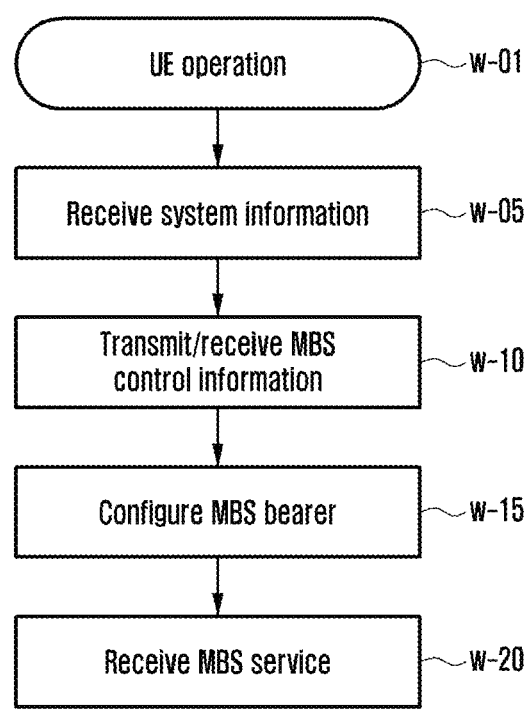
FIG. 23 is a diagram illustrating a UE operation according to various embodiments of the present disclosure.

FIG. 23 is a diagram illustrating a UE operation according to various embodiments of the disclosure.

In FIG. 23, the UE may camp on or access the cell according to a first signaling procedure, a second signaling procedure, a third signaling procedure, or a fourth signaling procedure provided in the disclosure, receive the system information w-10 in the RRC idle mode, RRC inactive mode, or RRC connected mode, and identify the presence or absence of MBS service support or the type or configuration of the supported MBS service. The UE may receive or transmit MBS control information (MBS service related configuration information) from or to the base station (e.g., MBS service request or interest or preference indication) w-10. In a case where the MBS service is supported or the MBS service that the UE is interested in or wants to receive is supported in the above, the UE may establish an MBS bearer according to the method provided in FIG. 7 of the disclosure, and receive MBS data according to the MBS service configuration and receive service support by receiving the MBS data in the method provided in FIG. 8 of the disclosure. In addition, many of the procedures provided in the disclosure may be applied in order for a base station or a network to efficiently operate an MBS service, or for a UE to efficiently or seamlessly receive the MBS service.

Figure 24:
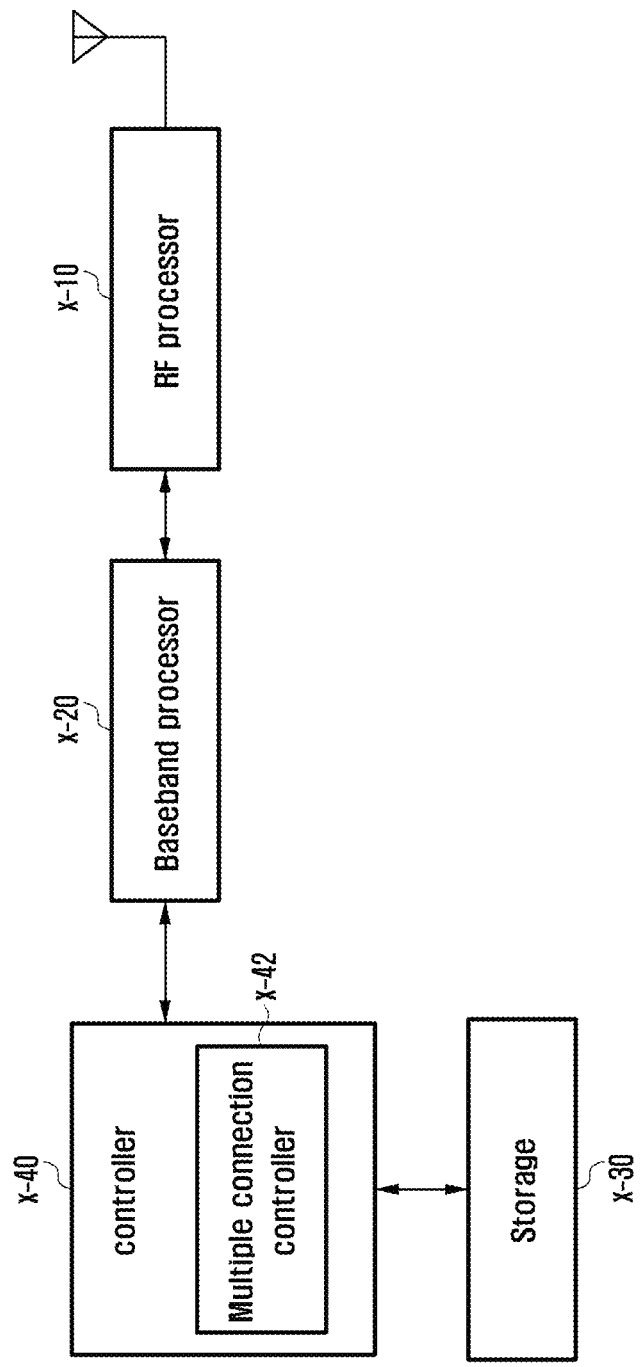
FIG. 24 is a diagram illustrating a UE structure according to various embodiments of the present disclosure.

FIG. 24 is a diagram illustrating a UE structure according to various embodiments of the present disclosure.

Referring to the drawing, the UE may include a radio frequency (RF) processor x-10, a baseband processor x-20, a storage x-30, and a controller x-40.

The RF processor x-10 may perform a function for transmitting and receiving a signal through a wireless channel, such as band conversion and amplification of the signal. That is, the RF processor x-10 may up-convert the baseband signal provided from the baseband processor x-20 into an RF band signal, transmit it through an antenna, and down-convert the RF band signal received through the antenna to the baseband signal. For example, the RF processor x-10 may include a transmit filter, a receive filter, an amplifier, a mixer, an oscillator, a digital to analog converter (DAC), an analog to digital converter (ADC), etc. In the drawing, only one antenna is illustrated, but the UE may include a plurality of antennas. In addition, the RF processor x-10 may include a plurality of RF chains. Furthermore, the RF processor x-10 may perform beamforming. For the beamforming, the RF processor x-10 may adjust the phase and magnitude of each of signals transmitted and received through a plurality of antennas or antenna elements. In addition, the RF processor may perform MIMO, and may receive multiple layers when performing MIMO operation. The RF processor x-10 may perform receive beam sweeping by appropriately configuring a plurality of antennas or antenna elements under the control of the controller, or adjust the direction and beam width of the receive beam so that the receive beam is coordinated with the transmit beam.

The baseband processor x-20 may perform a function of converting between a baseband signal and a bit stream according to a physical layer standard of the system. For example, when transmitting data, the baseband processor x-20 may generate complex symbols by encoding and modulating a transmitted bit stream. In addition, upon data reception, the baseband processor x-20 may restore a received bit stream by demodulating and decoding the baseband signal provided from the RF processor x-10. For example, in a case of according to an orthogonal frequency division multiplexing (OFDM) scheme, when transmitting data, the baseband processor x-20 may generate complex symbols by encoding and modulating a transmitted bit stream, map the complex symbols to subcarriers, and then configure OFDM symbols through an inverse fast Fourier transform (IFFT) operation and cyclic prefix (CP) insertion. In addition, upon data reception, the baseband processor x-20 may divide the baseband signal provided from the RF processing unit x-10 into OFDM symbol units, restore signals mapped to subcarriers through a fast Fourier transform (FFT) operation, and then restore a received bit stream through demodulation and decoding.

The baseband processor x-20 and the RF processor x-10 may transmit and receive signals as described above. Accordingly, the baseband processor x-20 and the RF processor x-10 may be referred to as a transmitter, a receiver, a transceiver, or a communicator. Furthermore, at least one of the baseband processor x-20 and the RF processor x-10 may include a plurality of communication modules to support a plurality of different wireless access technologies. In addition, at least one of the baseband processor x-20 and the RF processor x-10 may include different communication modules to process signals of different frequency bands. For example, the different radio access technologies may include an LTE network, an NR network, and the like. In addition, the different frequency bands may include a super high frequency (SHF) (e.g., 2.5 GHz, 5 GHz) band and a millimeter wave (e.g., 60 GHz) band.

The storage x-30 may store data such as a basic program, an application program, and configuration information for the operation of the UE. The storage x-30 may provide stored data according to the request of the controller x-40.

The controller x-40 may control overall operations of the UE. For example, the controller x-40 may transmit and receive signals through the baseband processor x-20 and the RF processor x-10. In addition, the controller x-40 may write and read data in the storage x-30. To this end, the controller x-40 may include at least one processor. For example, the controller x-40 may include a communication processor (CP) that controls for communication and an application processor (AP) that controls an upper layer such as an application program.

Figure 25:
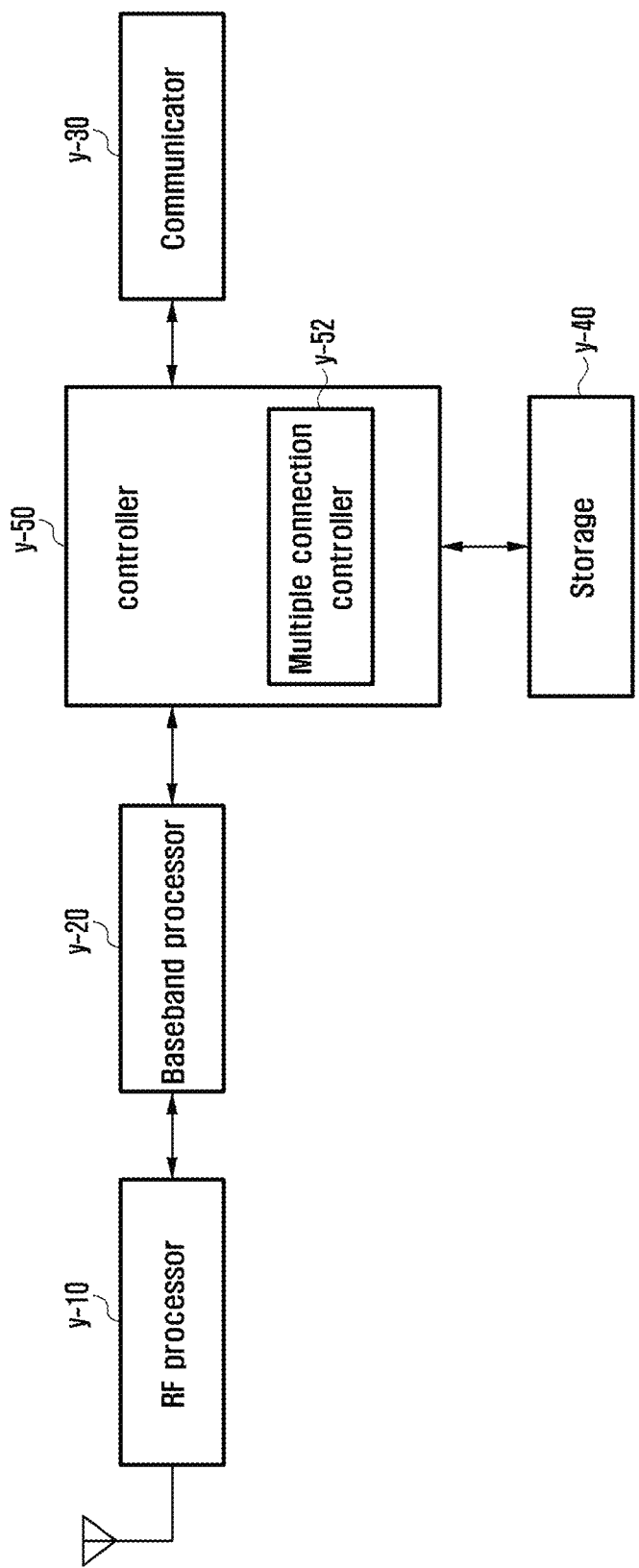
FIG. 25 is a diagram illustrating a TRP (e.g., base station) structure in a wireless communication system according to various embodiments of the present disclosure.

FIG. 25 is a diagram illustrating a TRP structure in a wireless communication system according to various embodiments of the present disclosures.

As illustrated in the figure, the base station may include an RF processor y-10, a baseband processor y-20, a backhaul communicator y-30, a storage y-40, and a controller y-50.

The RF processor y-10 may perform a function for transmitting and receiving a signal through a wireless channel, such as band conversion and amplification of the signal. That is, the RF processor y-10 may up-convert the baseband signal provided from the baseband processor y-20 into an RF band signal, transmit the same through an antenna, and down-convert the RF band signal received through the antenna into a baseband signal. For example, the RF processor y-10 may include a transmit filter, a receive filter, an amplifier, a mixer, an oscillator, a DAC, an ADC, and the like. Although only one antenna is illustrated in the drawing, the first access node may include a plurality of antennas. In addition, the RF processing unit y-10 may include a plurality of RF chains. Furthermore, the RF processing unit y-10 may perform beamforming. For the beamforming, the RF processor y-10 may adjust the phase and magnitude of each of signals transmitted and received through a plurality of antennas or antenna elements. The RF processor may perform a downlink MIMO operation by transmitting one or more layers.

The baseband processor y-20 may perform a function of converting a baseband signal and a bit stream according to the physical layer standard of the first radio access technology. For example, when transmitting data, the baseband processor y-20 generates complex symbols by encoding and modulating a transmitted bit stream. In addition, when receiving data, the baseband processor y-20 may restore a received bit stream by demodulating and decoding the baseband signal provided from the RF processor y-10. For example, according to the OFDM scheme, when transmitting data, the baseband processor y-20 may generate complex symbols by encoding and modulating a transmission bit stream, map the complex symbols to subcarriers, and then configure OFDM symbols through IFFT operation and CP insertion. In addition, upon data reception, the baseband processor y-20 may divide the baseband signal provided from the RF processing unit y-10 into OFDM symbol units, restore signals mapped to subcarriers through FFT operation, and then restore a received bit stream through demodulation and decoding. The baseband processor y-20 and the RF processor y-10 may transmit and receive signals as described above. Accordingly, the baseband processor y-20 and the RF processor unit y-10 may be referred to as a transmitter, a receiver, a transceiver, a communicator, or a wireless communicator.

The communicator y-30 may provide an interface for performing communication with other nodes in the network.

The storage y-40 may store data such as a basic program, an application program, and configuration information for the operation of the main station. In particular, the storage y-40 may store information on a bearer allocated to an accessed UE, a measurement result reported from the accessed UE, and the like. In addition, the storage y-40 may store information serving as a criterion for determining whether to provide or stop multiple connections to the UE. In addition, the storage y-40 may provide stored data according to the request of the controller y-50.

The controller y-50 may control overall operations of the main station. For example, the controller y-50 may transmit and receive signals through the baseband processing unit y-20 and the RF processing unit y-10 or through the backhaul communicator y-30. In addition, the controller y-50 writes and reads data in the storage y-40. To this end, the controller y-50 may include at least one processor.

The embodiments of the disclosure described and shown in the specification and the drawings are merely specific examples that have been presented to easily explain the technical contents of the disclosure and help understanding of the disclosure, and are not intended to limit the scope of the disclosure. In addition to the embodiments set forth herein, other variants based on the technical idea of the disclosure may be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a radio resource control (RRC) message including an indicator indicating a packet data convergence protocol (PDCP) re-establishment associated with a multicast and broadcast service (MBS) radio bearer (MRB);
based on the indicator indicating the PDCP re-establishment, setting an RX_NEXT to an initial value; and
based on the indicator indicating the PDCP re-establishment, stopping a reordering timer and delivering, to an upper layer, at least one stored PDCP service data unit (SDU),
wherein the initial value is based on a sequence number of a first received PDCP protocol data unit (PDU) increased by one for an unacknowledged mode (UM) MRB.

2. The method of claim 1, further comprising:
for an acknowledged mode (AM) MRB based on the PDCP re-establishment, performing a header decompression using at least one of robust header compression (ROHC) or ethernet header compression (EHC) for at least one stored PDCP SDU.

3. The method of claim 1, further comprising:
receiving, from the base station, information indicating that the MRB is configured to transmit a PDCP status report in an uplink, for the AM MRB;
identifying whether a predetermined condition is satisfied; and
triggering to transmit a PDCP status report, in case that the predetermined condition is satisfied.

4. The method of claim 3, wherein the predetermined condition comprises at least one of:
the PDCP re-establishment is requested from an upper layer to a PDCP entity, or
a PDCP data recovery is requested from the upper layer to the PDCP entity.

5. The method of claim 1, further comprising:
receiving, from the base station, information indicating an RLC re-establishment associated with the MRB; and
resetting state variables to initial values based on the RLC re-establishment.

6. The method of claim 5, further comprising:
setting a state variable associated with a highest SN to an initial value based on an SN of a first received UM data (UMD) PDU containing the SN and the RLC re-establishment for the MRB.

7. A terminal in a wireless communication system, the terminal comprising:
a transceiver; and
at least one processor configured to:
receive, from a base station via the transceiver, a radio resource control (RRC) message including an indicator indicating a packet data convergence protocol (PDCP) re-establishment associated with a multicast and broadcast service (MBS) radio bearer (MRB),
based on the indicator indicating the PDCP re-establishment, set an RX_NEXT to an initial value, and
stop a reordering timer and deliver, to an upper layer, at least one stored PDCP service data unit (SDU),
wherein the initial value is based on a sequence number of a first received PDCP protocol data unit (PDU) increased by one for an unacknowledged mode (UM) MRB.

8. The terminal of claim 7, wherein the at least one processor is further configured to:
for an acknowledged mode (AM) MRB based on the PDCP re-establishment, perform a header decompression using at least one of robust header compression (ROHC) or ethernet header compression (EHC) for at least one stored PDCP SDU.

9. The terminal of claim 7, wherein the at least one processor is further configured to:
receive, from the base station via the transceiver, information indicating that the MRB is configured to transmit a PDCP status report in an uplink, for the AM MRB,
identify whether a predetermined condition is satisfied, and
trigger to transmit a PDCP status report, in case that the predetermined condition is satisfied.

10. The terminal of claim 9, wherein the predetermined condition comprises at least one of:
the PDCP re-establishment is requested from an upper layer to a PDCP entity, or
a PDCP data recovery is requested from the upper layer to the PDCP entity.

11. The terminal of claim 7, wherein the at least one processor is further configured to:
receive, from the base station via the transceiver, information indicating an RLC re-establishment associated with the MRB, and
reset state variables to initial values based on the RLC re-establishment.

12. The terminal of claim 11, wherein the at least one processor is further configured to:
set a state variable associated with a highest SN to an initial value based on an SN of a first received UM data (UMD) PDU containing the SN and the RLC re-establishment for the MRB.

* * * * *